United States Patent
Bertini et al.

(10) Patent No.: US 11,611,201 B2
(45) Date of Patent: *Mar. 21, 2023

(54) FLUID INJECTION SYSTEM WITH SMART INJECTION AND RECEIVER TANKS

(71) Applicant: NOVINIUM, LLC, Kent, WA (US)

(72) Inventors: Glen John Bertini, Fox Island, WA (US); Weston Philips Chapin Ford, Seattle, WA (US); Helaina Hurwitz, Kent, WA (US); Norman E. Keitges, Renton, WA (US); Kevin Laux, Kent, WA (US); James Steele, Kent, WA (US); Jeffrey Andrew Thomas, Kent, WA (US); Rodrigue Tonfack, Kent, WA (US)

(73) Assignee: NOVINIUM, LLC, Wilmington, DE (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/818,928

(22) Filed: Mar. 13, 2020

(65) Prior Publication Data

US 2020/0294694 A1    Sep. 17, 2020

Related U.S. Application Data

(60) Provisional application No. 62/897,065, filed on Sep. 6, 2019, provisional application No. 62/879,263, filed (Continued)

(51) Int. Cl.
*H02G 1/16* (2006.01)
*H01B 3/18* (2006.01)
(Continued)

(52) U.S. Cl.
CPC .............. *H02G 1/16* (2013.01); *G05B 19/042* (2013.01); *G05D 9/02* (2013.01); *G05D 9/12* (2013.01);
(Continued)

(58) Field of Classification Search
CPC .............. H01B 3/18; H02G 1/16; G08B 7/06; G05D 9/02
See application file for complete search history.

(56) References Cited

U.S. PATENT DOCUMENTS

| 3,470,971 A | 10/1969 | Dower |
| 5,279,147 A | 1/1994 | Bertini et al. |
| 6,697,712 B1 | 2/2004 | Bertini et al. |
| 7,565,106 B1 | 7/2009 | Oh et al. |

(Continued)

FOREIGN PATENT DOCUMENTS

| EP | 2869491 | 5/2015 |
| WO | 1988/001046 | 2/1988 |

OTHER PUBLICATIONS

International Search Report and Written Opinion, dated Aug. 4, 2020, received in International Paten Application No. PCT /US2020/022861.

(Continued)

*Primary Examiner* — Mirza F Alam
(74) *Attorney, Agent, or Firm* — Davis Wright Tremaine LLP; George C. Rondeau, Jr.; Heather M. Colburn

(57) ABSTRACT

A tank including a fluid reservoir, a communication module, a controller, and at least one sensor. The fluid reservoir is configured to be in fluid communication with a cable segment. The communication module is configured to communicate with an external device. The sensor is configured to detect an injection parameter value, encode the injection parameter value in a sensor signal, and send the sensor signal to the controller. The controller is configured to automatically instruct the communication module to transmit information to the external device based on the injection parameter value.

33 Claims, 36 Drawing Sheets

Related U.S. Application Data on Jul. 26, 2019, provisional application No. 62/819,303, filed on Mar. 15, 2019.

(51) Int. Cl.
| | |
|---|---|
| *G05B 19/042* | (2006.01) |
| *G05D 9/02* | (2006.01) |
| *G05D 9/12* | (2006.01) |
| *G08B 7/06* | (2006.01) |
| *G08B 21/18* | (2006.01) |
| *H01B 13/14* | (2006.01) |
| *H01B 19/04* | (2006.01) |
| *H04B 1/38* | (2015.01) |

(52) U.S. Cl.
CPC .............. *G08B 7/06* (2013.01); *G08B 21/182* (2013.01); *H01B 3/18* (2013.01); *H01B 13/147* (2013.01); *H01B 19/04* (2013.01); *G05B 2219/25252* (2013.01); *G05B 2219/25425* (2013.01); *H04B 1/38* (2013.01)

(56) References Cited

U.S. PATENT DOCUMENTS

| | | |
|---|---|---|
| 8,656,586 B2 | 2/2014 | Bertini et al. |
| 2002/0187749 A1 | 12/2002 | Beasley et al. |
| 2005/0036843 A1 | 2/2005 | Trichard et al. |
| 2005/0189130 A1 | 9/2005 | Bertini et al. |
| 2006/0000279 A1* | 1/2006 | Jamnia .................... G01F 23/38 73/313 |
| 2008/0099704 A1 | 1/2008 | Lauber et al. |
| 2011/0140913 A1 | 6/2011 | Montenero |
| 2013/0299001 A1* | 11/2013 | Gillette .................... F02D 45/00 206/459.1 |
| 2013/0304385 A1* | 11/2013 | Gillette, II ............ H02J 7/0042 702/6 |
| 2014/0069514 A1 | 3/2014 | Peng |
| 2014/0246567 A1 | 9/2014 | Goyal et al. |
| 2015/0293536 A1* | 10/2015 | Mills .................... G05D 7/0617 700/282 |
| 2016/0097668 A1 | 4/2016 | Vilag et al. |
| 2017/0284689 A1 | 10/2017 | Steele et al. |
| 2017/0317478 A1 | 11/2017 | Bertini et al. |
| 2018/0298746 A1* | 10/2018 | Short ..................... E21B 41/00 |

\* cited by examiner

FLUID INJECTION SYSTEM WITH SMART INJECTION AND RECEIVER TANKS

CROSS REFERENCE TO RELATED APPLICATION(S)

This application claims the benefit of U.S. Provisional Application No. 62/819,303, filed on Mar. 15, 2019, U.S. Provisional Application No. 62/879,263, filed on Jul. 26, 2019, and U.S. Provisional Application No. 62/897,065, filed on Sep. 6, 2019, each of which is incorporated herein by reference in its entirety.

BACKGROUND OF THE INVENTION

Field of the Invention

The present invention is directed generally to systems and methods for injecting electrical cables with a fluid (e.g., rejuvenation fluid).

Description of the Related Art

FIG. 1 shows a typical setup commonly used to rejuvenate a cable segment extending between two underground residential distribution ("URD") transformers A and B. As shown above left, a first injection termination, a feed or injection tank, a pressure regulator, and a tank of charge gas are positioned inside the transformer A. The injection tank is connected to the first injection termination, which is connected to a first feed end of the cable segment. The pressure regulator is connected between the injection tank and the tank of charge gas. The injection tank housing an injection fluid (e.g., cable dielectric enhancement fluid) is typically placed inside the transformer case of the transformer A for the duration of the injection process when the injection process is left unattended and the cable segment is energized. The tank of charge gas and the pressure regulator are used to maintain controlled fluid pressure as the injection tank injects the injection fluid into the cable segment. As shown above right, a second injection termination and a receiver tank are positioned inside the transformer B. The receiver tank is connected to the second injection termination, which is connected to a second receiving end of the cable segment. At the second receiving end, the receiver tank receives a portion of the injection fluid and any other material(s) pushed through the cable segment by the injection fluid as it travels along the cable segment. The first and second injection terminations remain on the cable segment after the injection process has completed.

The cable segment may be an electrical distribution cable. The injection fluid may be a life-extending silicone-based fluid injected through the interstitial void space(s) defined between conductor strands of the electrical distribution cable. As mentioned above, the injection fluid may be injected by the pressurized injection tank that supplies the injection fluid to the first injection termination at the first feed end of the electrical distribution cable. The injection fluid flows through the electrical distribution cable and is received by the receiver tank at the second receiving end of the electrical distribution cable. The receiver tank is generally near or below atmospheric pressure. The pressure of the injection tank is maintained using the tank of charge gas (e.g., a bottle of high-pressure gas) and the pressure regulator, which is set manually at the start of the injection process. The high-pressure charge gas may be carbon dioxide and/or another inert gas (referred to hereafter "inert gas").

Two major injection methods are commonly used: iUPR and SPR. The pressure used during iUPR does not typically exceed 30 pounds per square in gauge ("psig") on the injection side. iUPR is used when it is desired for the injection fluid to flow through cable components that are not capable of withstanding higher pressure. SPR uses pressures up to 350 psig and typically results in more thorough treatment of the cable segment if circuit conditions allow its use. SPR is typically completed with the cable segment de-energized and the operation attended or supervised. On the other hand, iUPR is typically performed with the cable segment energized and typically left unattended while the injection process completes. Injection times for iUPR can be several days. Crews performing iUPR will often come back to the job site multiple times to check the status of the injection and remove the injection equipment when the injection fluid has arrived at the second receiving end of the cable segment. Unnecessary visits result in loss of crew productivity. Further, flow-issues, such as blocked cable segments or equipment failure, may not be recognized for days. Other aspects of both iUPR and SPR injection are manually controlled and hence are prone to human error and bias. Additionally, the pressure used for SPR injections must be set well below the burst pressure of the cable segment to avoid costly and time-consuming cable failures due to overpressure, even though most cables could be treated more thoroughly and quickly by using a higher pressure.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
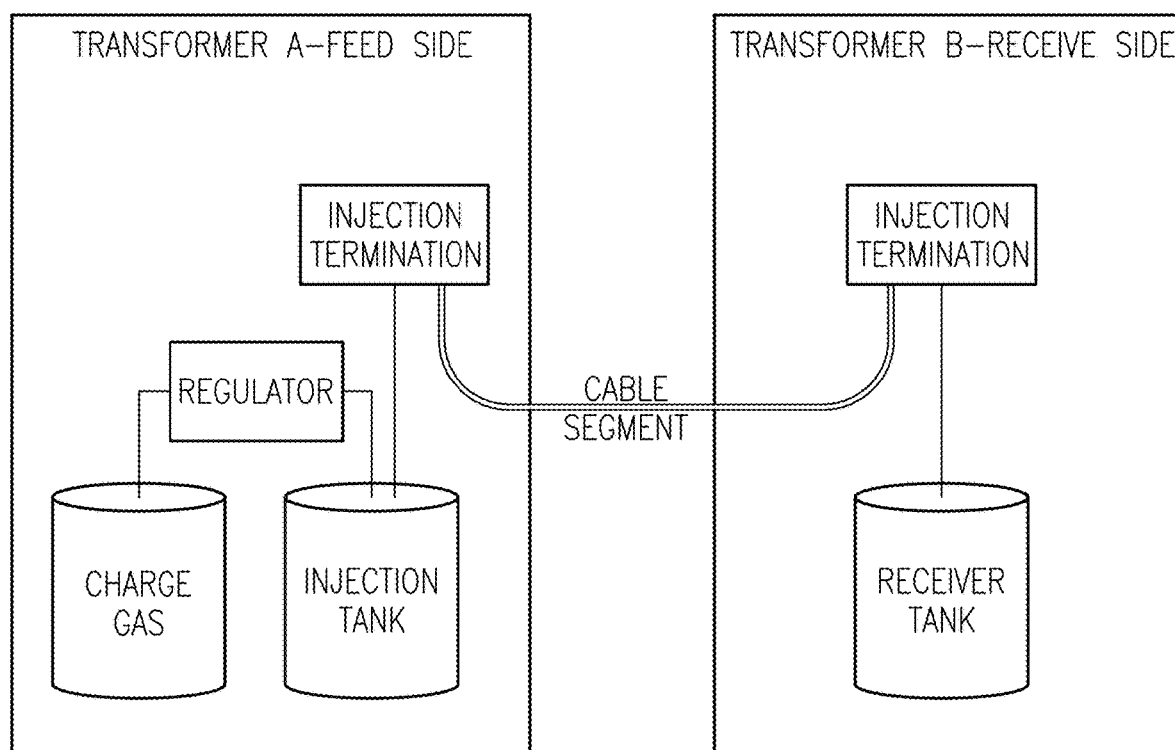
FIG. 1 is a block diagram illustrating a typical setup commonly used to rejuvenate a cable segment extending between two underground residential distribution transformers.
Figure 2:
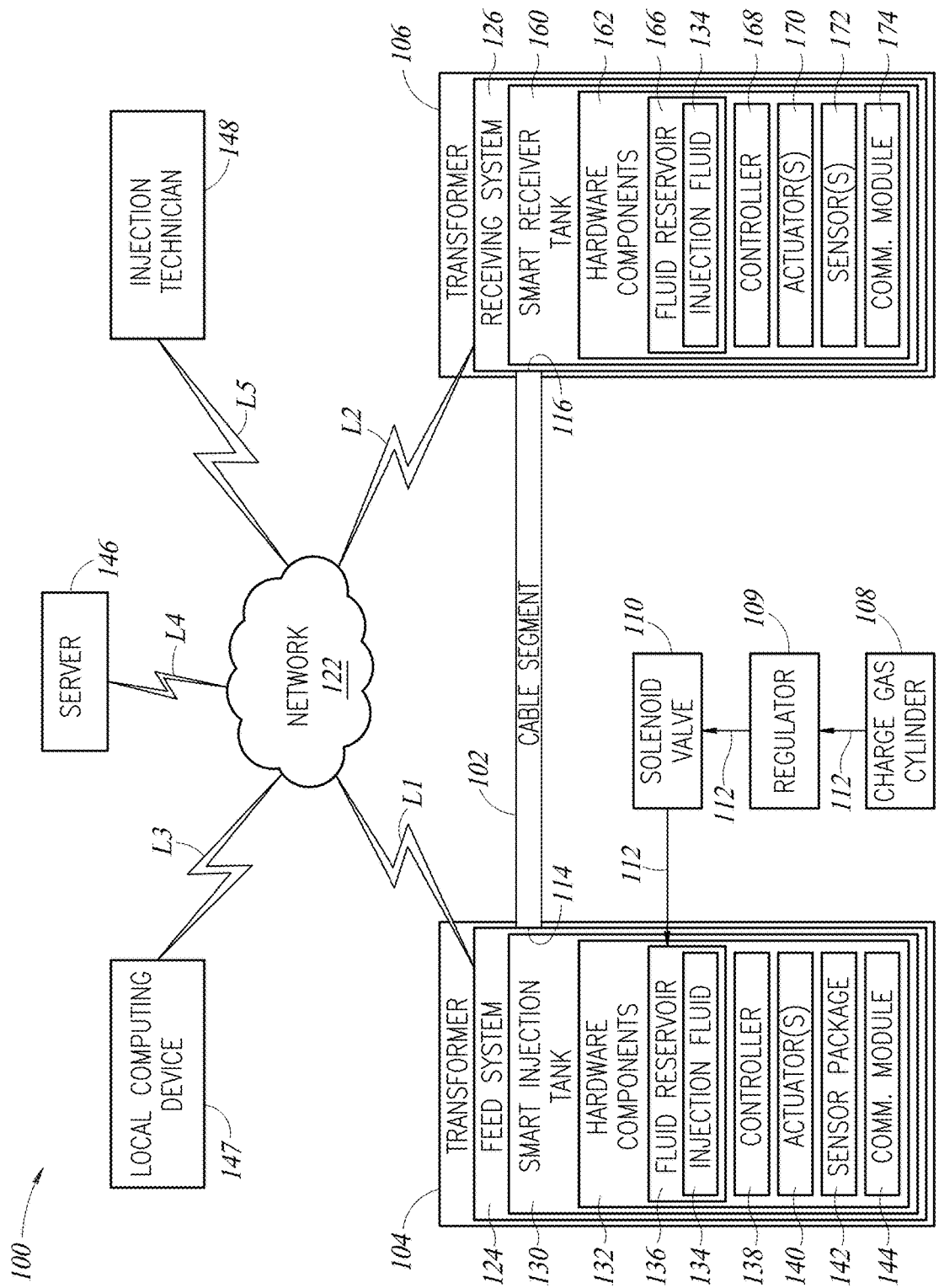
FIG. 2 is a block diagram illustrating a smart fluid injection system that includes a smart injection tank and a smart receiver tank.

FIG. 2 is a block diagram illustrating a smart fluid injection system 100 used to rejuvenate a cable segment 102 extending between two underground transformers 104 and 106 (e.g., URD transformers). Like in the typical setup illustrated in FIG. 1, a feed end 114 of the cable segment 102 is connected to a feed system 124 installed inside the transformer 104. Also, like in the typical setup illustrated in FIG. 1, a receiving end 116 of the cable segment 102 is connected to a receiving system 126 installed inside the transformer 106. But, in the receiving system 126, the conventional injection tank may be replaced with a smart feed or injection tank 130 and/or the conventional receiver tank may be replaced with a smart receiver tank 160. For ease of illustration, in FIG. 2, the conventional injection and receiver tanks have been replaced with the smart injection and receiver tanks 130 and 160, respectively.

As will be described below, the smart injection tank 130 may be configured to communicate with the smart receiver tank 160, a local computing device 147, a server 146, and/or an injection technician 148 via a network 122. Similarly, the smart receiver tank 160 may be configured to communicate with the smart injection tank 130, the local computing device 147, the server 146, and/or the injection technician 148 via the network 122. In the example illustrated in FIG. 2, the smart injection tank 130 is configured to communicate with the network 122 via a communication link "L1" and the smart receiver tank 160 is configured to communicate with the network 122 via a communication link "L2." The local computing device 147, the server 146, and the injection technician 148 (e.g., via a mobile computing device) are configured to communicate with the network 122 via communication links "L3," "L4," and "L5," respectively. The communication links "L1"-"L5" may be implemented as wired or wireless communication links.

Alternatively, the smart injection tank 130 and/or the smart receiver tank 160 may be configured to communicate directly the local computing device 147, the server 146, and/or the injection technician 148 without using the network 122. By way of another example, the smart injection tank 130 and the smart receiver tank 160 may be configured to communicate directly with each other. By way of yet another example, the smart injection tank 130 and/or the smart receiver tank 160 may be configured to communicate directly with other components. Further, as will be described below, the smart injection tank 130 and/or the smart receiver tank 160 may be configured to communicate with like components present in other smart cable injection systems, each like the smart fluid injection system 100.

The network 122 may be implemented as the Internet, a cellular telephone network, the plain old telephone system ("POTS"), a local area network ("LAN"), a wide area network ("WAN"), a peer-to-peer network, a WI-FI network, a combination thereof, and the like.

Smart Injection Tank

Figure 3:
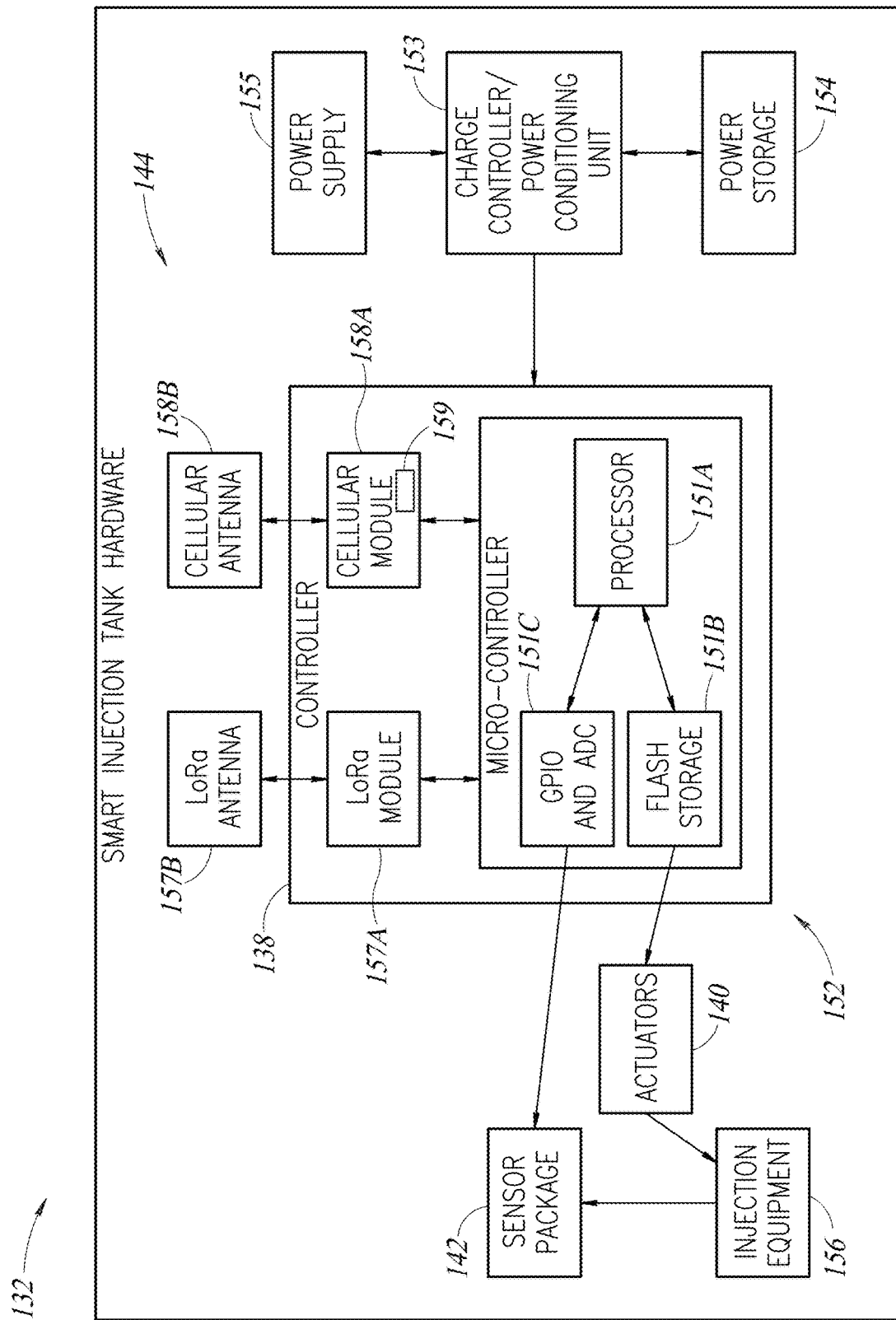
FIG. 3 is a block diagram illustrating hardware components of the smart injection tank.

FIG. 3 is a block diagram illustrating hardware components 132 of the smart injection tank 130 (see FIGS. 2, 5, 7-11, 14, and 15). The hardware components 132 may be used to implement iUPR and/or SPR injections. These hardware components 132 may be characterized as implementing an internet-connected rejuvenation fluid delivery system. Referring to FIG. 2, the smart injection tank 130 is configured to improve how an injection fluid 134 is introduced into the interstitial void volume of electrical cable segments (e.g., the cable segment 102) by automating several aspects of the injection process that are currently performed manually and, as a result, are prone to human error. The hardware components 132 illustrated in FIG. 3 may be configured to improve process repeatability and improve the accuracy and scope of data collection. Improved data collection may be used to drive future process improvements. The hardware components 132 may include one or more fluid reservoirs 136 (see FIG. 2), each instrumented with a controller 138, one or more actuators 140, a sensor package 142, and a communication module 144.

Each of the fluid reservoir(s) 136 is configured to store the injection fluid 134 under pressure. The injection fluid 134 may be implemented as a life-extending fluid (e.g., a cable dielectric enhancement fluid) configured to extend the life of the cable segment 102. Each of the fluid reservoir(s) 136 is connected to a charge gas cylinder 108 configured to supply a charge gas 112 that pressurizes injection fluid 134. Each of the fluid reservoir(s) 136 may be connected to the charge gas cylinder 108 by a regulator 109 and a solenoid valve 110 through which the charge gas 112 passes on its way to the fluid reservoir(s) 136.

The controller 138 may include a microcontroller 150, which may include a processor 151A, a flash storage device 151B, and a communication module 151C (e.g., a general-purpose input/output ("GPIO") and analog-to-digital converter ("ADC") module). The controller 138 receives sensor signals from the sensor package 142 and uses those signals to optionally actuate the actuator(s) 140, which control injection equipment 156. The injection equipment 156 refers to tanks (e.g., the smart injection tank 130), pumps, valves, and other equipment used to inject the injection fluid 134 through the interstitial volume between conductor strands or in other open areas within the plastic insulating material of an electrical conductor. The controller 138 may send or receive messages over the communication module 144. For example, the controller 138 may receive an instruction to adjust at least one injection parameter (e.g., a pressure at which the injection fluid 134 is injected into the cable segment 102) from an external device (e.g., the server 146, the local computing device 147, a mobile computing device operated by the injection technician 148, and the like) via the communication module 144. The controller 146 is configured to adjust the injection parameter(s) in response to such an instruction.

The actuator(s) 140 may include one or more of the following exemplary actuators:
  a. Fluid/gas flow solenoid valve;
  b. Charge gas vent solenoid valve;
  c. Inert gas tank vent solenoid valve;
  d. Gas charge fill solenoid valve;
  e. Speaker; and
  f. Pressure regulator.

The following list contains exemplary types of sensors (e.g., included in the sensor package 142) that may be used at the smart injection tank 130 (see FIGS. 2, 5, 7-11, 14, and 15):
  a. Tank pressure;
  b. Cable pressure;
  c. Tank temperature;
  d. Fluid flow rate;
  e. Inert gas flow rate;
  f. Fluid level;
  g. Cable diameter;
  h. Load cell;
  i. Accelerometer;
  j. Line voltage sensor;
  k. Battery voltage sensor;
  l. Measurement CT;
  m. GPS;
  n. Barometric pressure; and
  o. Audio.

The communication module 144 may be configured to communicate with other like communication modules, a remote server 146, and/or with injection technicians (e.g., an injection technician 148). By way of non-limiting examples, the communication module 144 may be configured to transmit alerts, notifications, and/or process control messages.

Referring to FIG. 3, the communication module 144 may include a Long Range ("LoRa") module 157A, a LoRa antenna 157B, a cellular module 158A, and a cellular antenna 158B. By way of non-limiting examples, the cellular module 158A may be implemented as a Long-Term Evolution Machine Type Communication ("LTE-M") module and/or a NB-IoT module. The cellular antenna 158B is configured to receive cellular signals from a cellular network (e.g., the network 122 of FIG. 2) and communicate the received cellular signals with the cellular module 158A. The cellular antenna 158B is also configured to receive cellular signals from the cellular module 158A and communicate those cellular signals over the cellular network (e.g., the network 122 of FIG. 2). Together, the LoRa module 157A and the LoRa antenna 157B may implement communication with the server 146. The LoRa module 157A and the LoRa antenna 157B are configured to communicate over a low-power wide-area network using long range wide-area network ("LoRaWAN") protocol. Together, the LoRa module 157A and the LoRa antenna 157B may implement communication with the smart receiver tank 160. The cellular module 158A and the cellular antenna 158B may be configured to communicate over a Long-Term Evolution ("LTE") cellular network. The cellular module 158A may include a cellular modem 159, a cellular transceiver, and the like. Together, the cellular module 158A and the cellular antenna 158B may implement communication with the server 146.

The communication module 144 may communicate the status of the injection or any alerts or notifications to the injection technician 148, saving time over manually checking on the unit in the field. Such a system may send near real-time data to a server 146 (see FIGS. 2, 5, 6, 23, and 31) for automatic entry into memory 302 (e.g., in a database) for reliable record keeping. The memory 302 may be implemented as a system memory 22 illustrated in FIG. 32. The means of communication (e.g., the communication module 144) may include a cellular or satellite modem (e.g., like the cellular modem 159 illustrated in FIG. 3), wireline carrier, etc. As mentioned above, the controller 138 may send or receive messages over the communication module 144.

Referring to FIG. 3, together, the controller 138, the sensor package 142 (e.g., including one or more sensors), and the communication module 144 (e.g., including one or more transceivers) define a system 152. An electrical power storage 154 supplies the system 152 with electrical power for as many as several days while the injection process completes. The electrical power storage 154 may utilize one or more of the following:

1. One or more internal rechargeable batteries that each may be permanently attached to the equipment and easily recharged by the injection technician using a plug and power supply;
2. One or more batteries (e.g., one or more external batteries) that may be implemented as standard size alkaline, lithium, and/or rechargeable batteries which may each have a standard size and/or may be easily replaceable in the field; and
3. One or more capacitors, each of which may be implemented as an internal large capacity capacitor.

A capacitor may be recharged more quickly than a rechargeable battery, which would enable recharging in the field just before use. If the energy storage methods described above are not sufficient to power the system 152, the following sources of electrical power may be used. Some of these sources are intermittent and would benefit from one or more of the energy storage methods described above.

1. Secondary connection—The system 152 may be connected directly to the secondaries in the transformer which are typically exposed and would provide reliable 120 vac power and no practical current draw limit.
2. Current Transformer—A split core current transformer may be attached to a secondary or primary cable and harvest power from the magnetic field generated by the flow of current through the cable. This method may be non-invasive and generate on the order of 1 W with a transformer of realistic size and weight for the application.
3. Ambient Radio Frequency ("RF")—In implementations in which the electronics are sufficiently low power, a large coil may be used to harvest electrical power from stray field in the vicinity of the transformer.
4. Thermoelectric generator ("TEG")—A solid-state thermoelectric generator may be used to harvest power from any significant temperature gradient present around the equipment, such as that between cold carbon dioxide from the smart injection tank and the warm transformer. Excellent thermal contact between the TEG and the heat sources and sinks is necessary.
5. Photovoltaic—Power may be generated from sunlight if a photovoltaic panel were placed outside the transformer.
6. Piezo or magnetostriction generator—A very small amount of power may be generated from the 60 Hz mechanical vibration of the transformer panels using a device which produces an electrical current from such vibrations such a piezo element or a generator based on the principle of magnetostriction.
7. Turbine in gas flow—Power may be harvested from the flow of the inert gas out of the compressed inert gas cylinder using a miniature turbine or positive displacement pump driving a generator.

The system 152 may be connected to the electrical power storage 154 by a charge controller/power conditioning unit 153. The charge controller/power conditioning unit 153 may be configured to be connected to a power supply 155 and to receive power therefrom.

Smart Receiver Tank

Referring to FIG. 2, hardware components 162 of the smart receiver tank 160 may include one or more fluid reservoirs 166 each instrumented with a controller 168, one or more actuators 170, one or more sensors 172, and a communication module 174. These hardware components 162 may be characterized as implementing an internet-connected rejuvenation fluid receiving system.

Each of the fluid reservoir(s) 166 is configured to store the injection fluid 134 after it has traveled through the cable segment 102.

The controller 168 may include a controller 902 (see FIG. 22) that may be implemented as a microcontroller. The controller 168 receives sensor signals from the sensor(s) 172 and uses those signals to optionally actuate the actuator(s) 170, which may be configured to shut off the flow of the charge gas 112 and/or the flow of the injection fluid 134. The controller 168 may send or receive messages over the communication module 174.

The actuator(s) 170 may include one or more of the following exemplary actuators:
a. Fluid/gas shut off solenoid; and
b. Speaker.

The following list contains exemplary types of sensors (e.g., included in the sensor(s) 172) that may be used at the smart receiver tank 160:
a. Tank pressure;
b. Tank temperature;
c. Fluid flow rate;
d. Gas flow rate;
e. Fluid arrival;
f. Water in fluid;
g. Load cell;
h. Accelerometer;
i. Measurement CT;
j. GPS;
k. Battery voltage;
l. Inert gas concentration; and
m. Audio.

The communication module 174 may be substantially identical to the communication module 144.

Figure 16A:
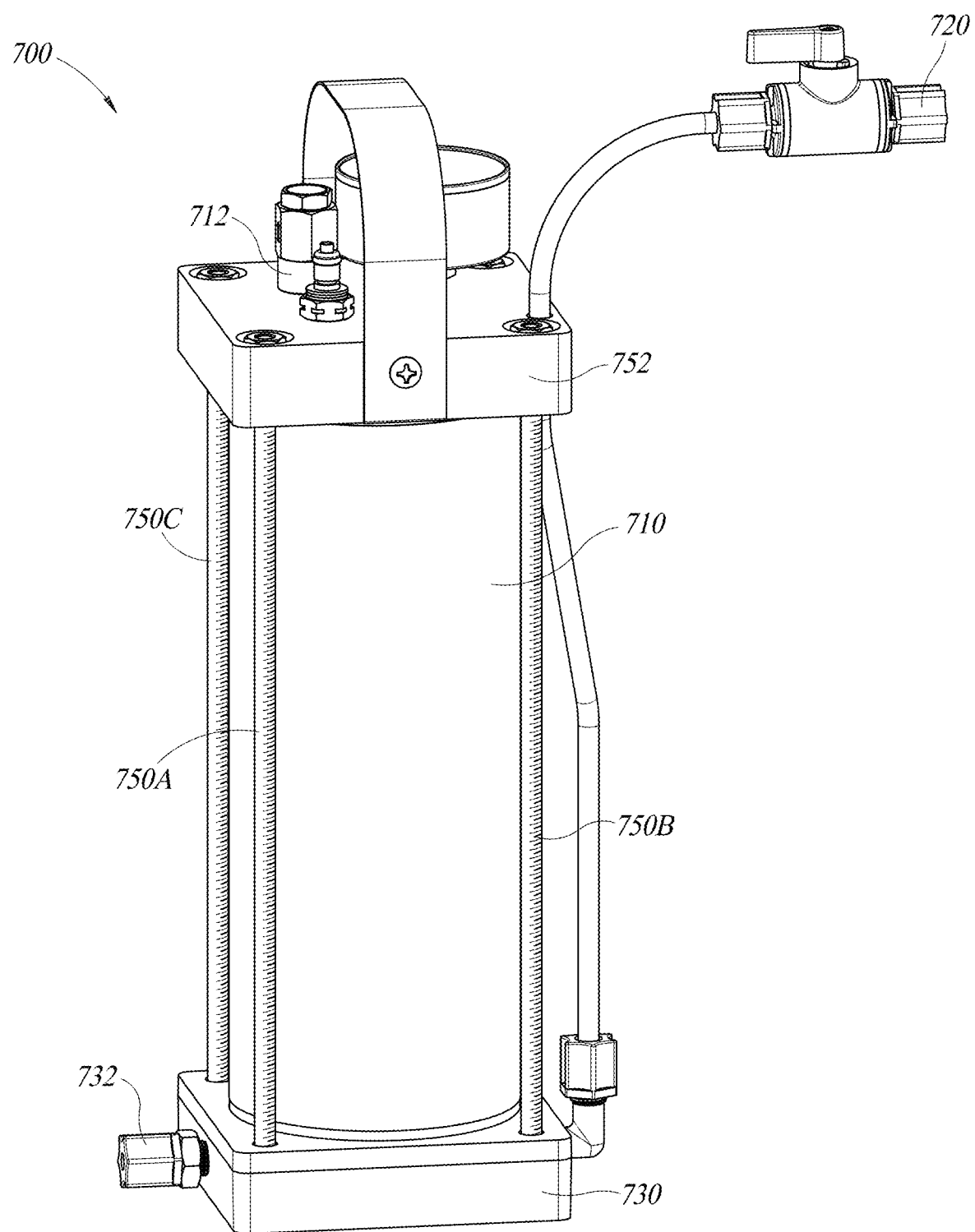
FIG. 16A is a perspective view of a prior art receiver tank.
Figure 16B:
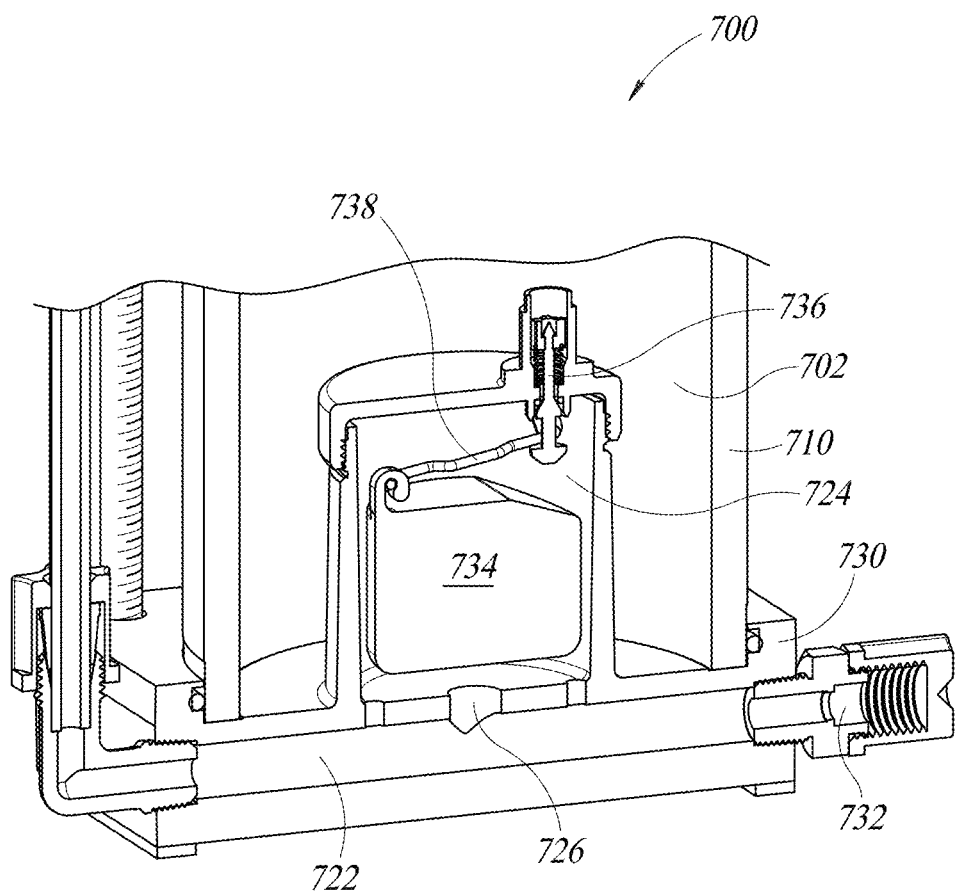
FIG. 16B is a cross-sectional view of the receiver tank of FIG. 16A.

Referring to FIG. 16B, in current practice, a receiver tank 700 (also see FIG. 16A) includes a mechanical float valve 736 that closes when injection fluid has filled a fluid reservoir 724 and stops any further flow of injection fluid from the cable into the fluid reservoir 724. The receiver tank 700 may be implemented as an iUPR receiver tank. Unfortunately, the technician must visit the receiver tank 700 and observe that the fluid reservoir 724 is full and/or the float valve 736 is closed.

Figure 4:
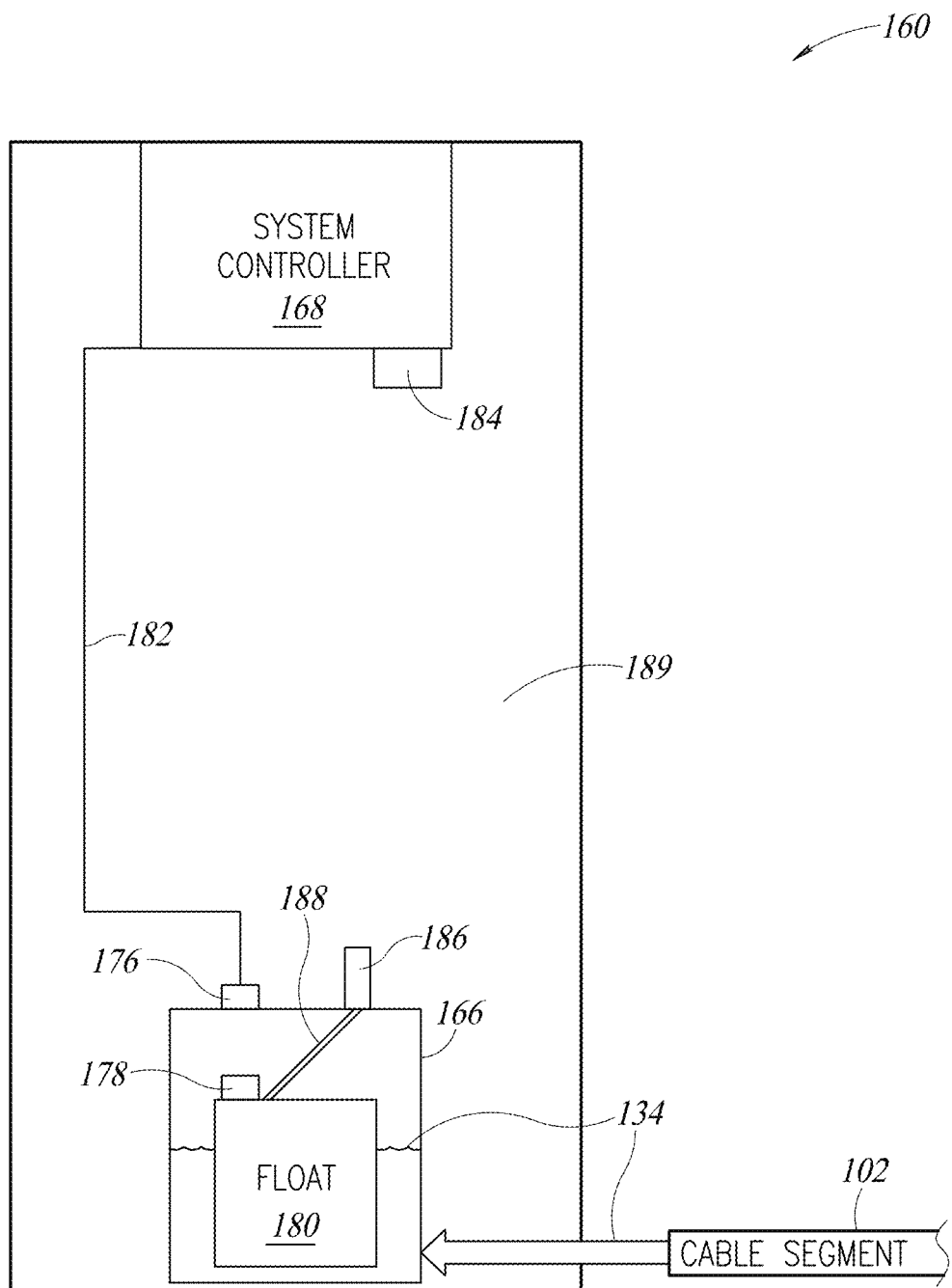
FIG. 4 is a block diagram illustrating example components of the smart receiver tank of FIG. 2.

In contrast, referring to FIG. 4, the smart receiver tank 160 includes a sensor 176 (implemented as a "Hall Effect Sensor" in FIG. 4) configured to detect the arrival of the injection fluid 134 at the smart receiver tank 160. A float 180 is positioned inside the fluid reservoir 166. The float 180 is configured to float in the injection fluid 134 such that the float 180 floats upwardly when the injection fluid 134 is received by the fluid reservoir 166. The float 180 is connected to a float valve 186 by a linkage 188. When the float 180 floats upwardly, the linkage 188 translates this upward motion to the float valve 186, which moves a movable component inside the float valve 186. The movable component of the float valve 186 stops the flow of the injection fluid 134 from the cable segment 102 into the fluid reservoir 166. In the embodiment illustrated in FIG. 4, a permanent magnet 178 may be mounted on a top side of the float 180 and the sensor 176 may be mounted on a top outside surface of the fluid reservoir 166. The sensor 176 may be connected to the controller 168 wirelessly or by one or more wires 182. The controller 168 uses a sensor signal received from the sensor 176 to determine when the smart receiver tank 160 has received a sufficient amount of the injection fluid 134 (e.g., the fluid reservoir 166 is full) and notify the injection technician 148 that the iUPR injection is complete.

FIG. 4 illustrates an exemplary implementation of the smart receiver tank 160 configured for fluid monitoring, but other methods of sensing the injection fluid 134 are possible and may be used. Two major classes of fluid sensors have been explored experimentally: those that detect some aspect of the injection fluid 134, and those that detect the motion of the float 180 or the float valve 186. By way of non-limiting examples, some alternate methods of sensing the injection fluid 134 may include an optical bubble sensor, a resistance sensor, a capacitive sensor, a magnet sensor (e.g., a Hall sensor), an inductive sensor, and an optical sensor. Some potential benefits and drawbacks of such sensors are summarized in Table 1 below.

An optical bubble sensor is configured to detect air bubbles in a fluid (e.g., the injection fluid 134). Therefore, when the fluid reservoir 166 is filled with air, the optical bubble sensor will detect a bubble. On the other hand, the optical bubble sensor will detect fluid when the fluid reservoir 166 is filled with the injection fluid 134. Thus, the optical bubble sensor may be used to detect when the fluid reservoir 166 transitions from being filled with air to being filled with the injection fluid 134. The optical bubble sensor may encode an indicator of what the optical bubble sensor is sensing in a sensor signal and transmit the sensor signal to the controller 168. The controller 168 is configured to detect when the injection fluid 134 has been received by the smart receiver tank 160 based at least in part on the indicator encoded in the sensor signal.

A resistance sensor measures electrical resistance between two electrodes and generates a sensor signal that indicates when the injection fluid 134 has been received. The electrodes of the resistance sensor are separated by a space. When the injection fluid 134 fills that space, resistance between the electrodes changes. The resistance sensor may encode the resistance in a sensor signal and transmit the sensor signal to the controller 168. The controller 168 is configured to detect when the injection fluid 134 has been received by the smart receiver tank 160 based at least in part on the resistance encoded in the sensor signal.

A capacitive sensor may include a parallel plate capacitor positioned in the fluid reservoir 166. The capacitive sensor senses when the injection fluid 134, which is dielectric, fills the space between the plates and changes the capacitance of the parallel plate capacitor. By way of another non-limiting example, the capacitive sensor may include a first capacitor plate positioned on the float 180 and a second capacitor plate positioned on the bottom of or outside the bottom of the fluid reservoir 166. As the float 180 moves with respect to the fluid reservoir 166, capacitance between the first and second plates changes. The capacitive sensor may encode the capacitance in a sensor signal and transmit the sensor signal to the controller 168. The controller 168 is configured to detect when the injection fluid 134 has been received by the smart receiver tank 160 based at least in part on the capacitance encoded in the sensor signal.

Referring to FIG. 4, a magnet sensor (e.g., the sensor 176) is configured to sense the strength of a magnetic field generated by a magnet (e.g., the magnet 178). By way of non-limiting examples, the magnet may be positioned on the float 180 or a movable portion of the float valve 186. The distance between the magnet and the magnet sensor determines the strength of a magnetic field measured by the magnet sensor. Thus, as the float 180 or the movable portion of the float valve 186 moves, the magnet moves with respect to the magnet sensor. The magnet sensor may encode the strength of a magnetic field in a sensor signal and transmit the sensor signal to the controller 168. The controller 168 is configured to detect when the injection fluid 134 has been received by the smart receiver tank 160 based at least in part on the strength of the magnetic field encoded in the sensor signal.

An inductive sensor may include an excitation coil that extends circumferentially around the fluid reservoir 166 and a conductive ring positioned on the float 180. The excitation coil may be connected to an alternating current ("AC") power source that induces a current in the conductive ring which can be sensed by the excitation coil. As the float 180 moves with respect to the excitation coil, the current flowing in the excitation coil changes. The inductive sensor may encode these current changes in a sensor signal and transmit the sensor signal to the controller 168. The controller 168 is configured to detect when the injection fluid 134 has been received by the smart receiver tank 160 based at least in part on the current changes encoded in the sensor signal.

An optical sensor may be positioned on a side of the fluid reservoir 166 opposite a light source such that the float 180 blocks light generated by the light source and prevents the light from reaching the optical sensor. When the injection fluid 134 is received by the fluid reservoir 166 and the float 180 floats upwardly such that the float 180 no longer prevents the light from reaching the optical sensor, the optical sensor detects the light. The optical sensor may encode a light property (e.g., an amount of light received by the optical sensor) in a sensor signal and transmit the sensor signal to the controller 168. The controller 168 is configured to detect when the injection fluid 134 has been received by the smart receiver tank 160 based at least in part on the light property encoded in the sensor signal.

TABLE 1

| Fluid Sensing Technologies | | |
|---|---|---|
| Sensor Technology | Benefits | Drawbacks |
| Optical Bubble Sensor | Off the shelf sensor Reliable operation with clear tubing Low cost Reduced chance of electromagnetic interference ("EMI") compared to inductive methods | Must be mounted outside the smart receiver tank 160 Ambient light shade likely required Longevity uncertain Fluid compatibility |
| a resistance sensor | Low cost High reliability Less fluid compatibility concern No moving parts | Probe must touch the injection fluid 134 directly so requires float valve assembly modification. |

TABLE 1-continued

Fluid Sensing Technologies

| Sensor Technology | Benefits | Drawbacks |
| --- | --- | --- |
| Capacitive sensor positioned in the injection fluid 134 | Trivial measurement circuit<br>High reliability<br>Less fluid compatibility concern<br>No moving parts | Probe must touch fluid directly so requires float valve assembly modification. |
| Magnet sensor for use with a magnet positioned on the movable portion of the float valve 186 | Off the shelf parts<br>Cheap<br>Trivial measurement circuit | Some fluid compatibility concern;<br>Potentially tedious installation<br>May fail if the float valve 186 fails |
| Magnet sensor for use with a magnet positioned on the float 180 | No fluid contact required<br>No additional moving parts<br>Cheap hardware cost<br>Easy installation | Adds weight to float<br>Proof of concept required |
| Inductive sensor for use with a ring positioned on the float 180 | No fluid contact required<br>No additional moving parts<br>Easy measurement circuit<br>Cheap materials<br>Limited fluid compatibility concern<br>Trivial installation | Sourcing off the shelf coils<br>May fail if the float valve 186 fails<br>Higher risk of RF interference - will require testing |
| Capacitive sensor with a first capacitor plate positioned on the float 180 and a second capacitor plate positioned on or outside the fluid reservoir 166 | No fluid contact required<br>No additional moving parts<br>Cheap materials<br>Limited fluid compatibility concerns<br>Trivial installation<br>Easy construction | Measurement circuit requires frequency close to 1 MHz<br>Signal to Noise Ratio ("SNR") is poor<br>Unlikely to be practical |
| Inductive sensor with an excitation coil having a low number of turns (~5) | No fluid contact required<br>No additional moving parts<br>Easy measurement circuit<br>Cheap materials<br>Limited fluid compatibility concern<br>Sensor could be wrapped by hand in seconds during installation | Measurement circuit may require frequency > 100 kHz<br>May fail if the float valve 186 fails<br>Some risk of RF interference - will require testing |
| Optical sensor | No fluid contact required<br>Easy measurement circuit<br>Low cost<br>Reduced chance of EMI compared to inductive methods | Optical elements possible prone to fouling with fluid<br>May required ambient light shade for reliable operation<br>Longevity uncertain |

In this embodiment, the sensor(s) 172 (see FIG. 2) include the sensor 176 and a barometer 184. The barometer 184 is configured to measure an internal pressure inside an interior portion 189 of the smart receiver tank 160, which may have a low atmospheric pressure (e.g., a vacuum or partial vacuum). The barometer 184 may be positioned inside the interior portion 189 of the smart receiver tank 160 and connected (e.g., wirelessly or by one or more wires) to the controller 168. The fluid reservoir 166 is also positioned inside the interior portion 189 and may be sealed to prevent the injection fluid 134 from escaping from the fluid reservoir 166 and entering the interior portion 189.

Fluid Injection System

Figure 5:
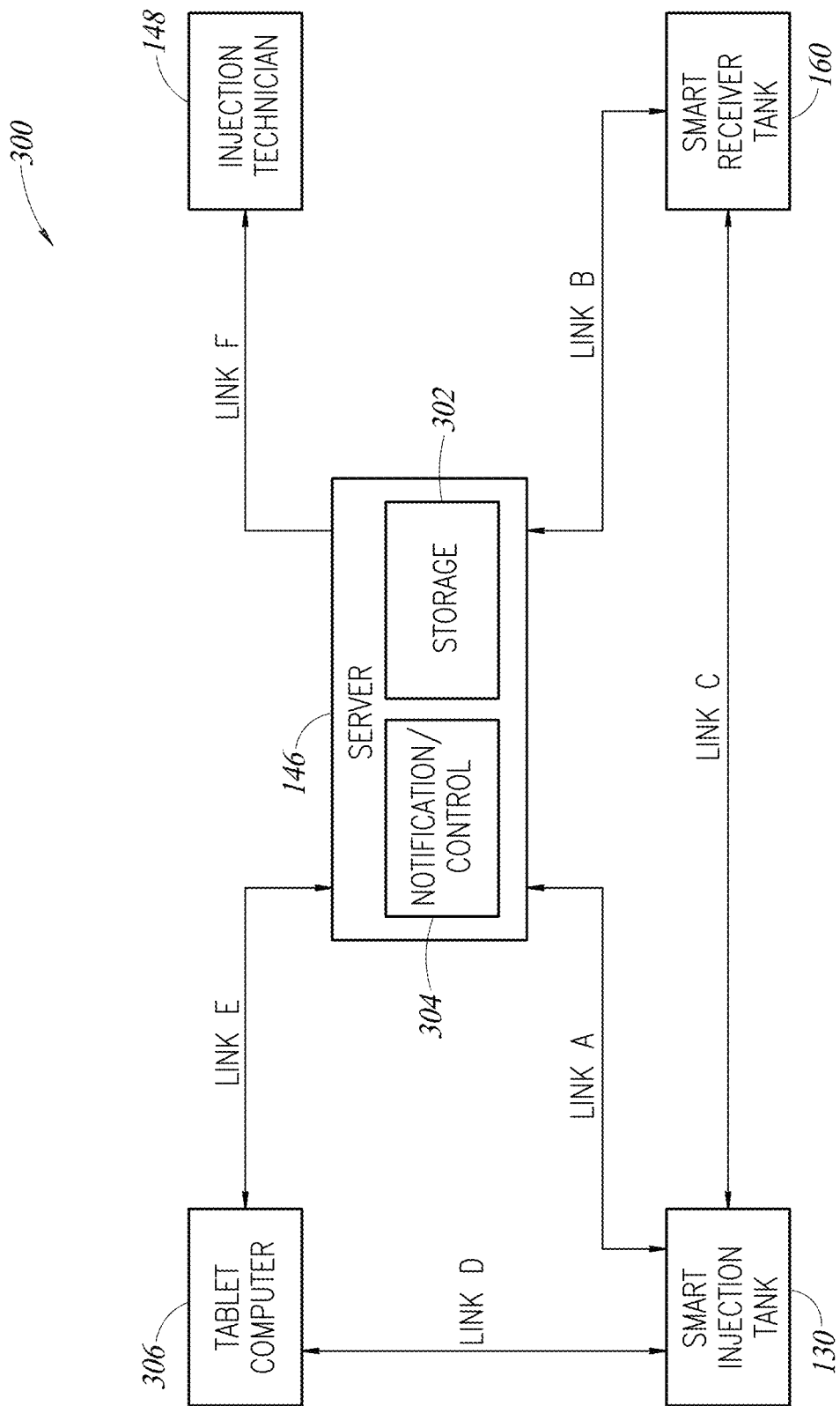
FIG. 5 is a block diagram of an embodiment of the smart fluid injection system of FIG. 2.
Figure 14:
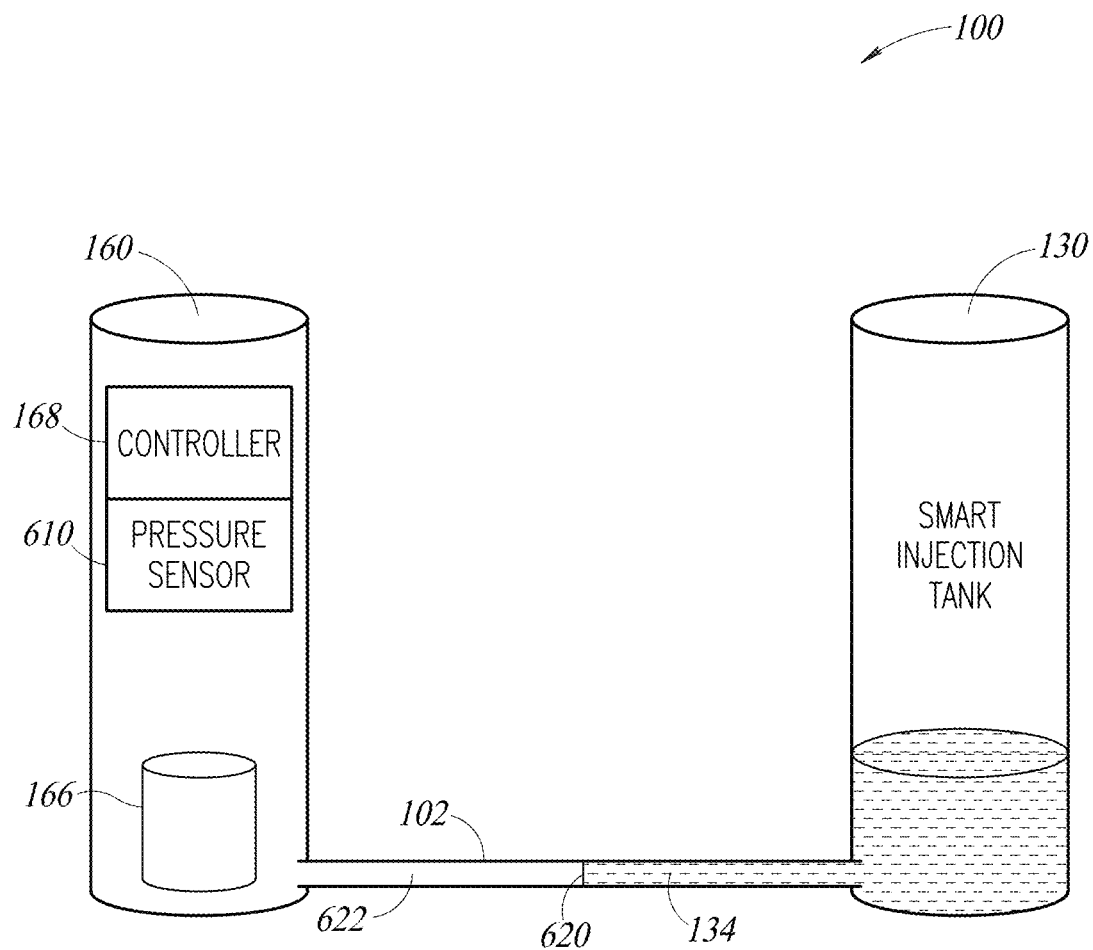
FIG. 14 is a block diagram of the smart receiver tank of FIG. 2 configured to estimate a duration of an injection.

FIG. 5 is a block diagram of a smart fluid injection system 300 that is an embodiment of the smart fluid injection system 100 (see FIGS. 2 and 14). Like the smart fluid injection system 100, the smart fluid injection system 300 includes the smart injection tank 130, the smart receiver tank 160, and the server 146. The smart fluid injection system 300 is configured to communicate with the injection technician 148 (e.g., a remote computing device operated by the injection technician 148). The block diagram of FIG. 5 includes communication links A-F.

The link A provides communication between the smart injection tank 130 and the server 146. As shown in FIG. 5, the link A may be implemented as a cellular communication link and/or a satellite communication link. The link B provides communication between the smart receiver tank 160 and the server 146. As shown in FIG. 5, the link B may be implemented as a cellular communication link and/or a satellite communication link. The links A and B may be implemented over the network 122 (see FIG. 2). When the network 122 is implemented as the Internet, the smart fluid injection system 300 enables tank-to-internet communication.

The link C provides communication between the smart injection and receiver tanks 130 and 160 (e.g., enabling tank-to-tank communication). As shown in FIG. 5, the link C may be implemented as a powerline carrier ("PLC") communication link and/or a short range wireless communication link.

The link D provides communication between the smart injection tank 130 and the local computing device 147 (see FIG. 2). In FIG. 5, the local computing device 147 has been illustrated as a tablet computer 306. By way of another non-limiting example, the local computing device 147 may be implemented as a smartphone, laptop computer, desktop computer, and the like. As shown in FIG. 5, the link D may be implemented as a communication link configured to communicate in accordance with a wireless standard, such as Wi-Fi, Bluetooth, and the like.

The link E provides communication between the local computing device 147 (see FIG. 2) and the server 146. As shown in FIG. 5, the link E may be implemented as a cellular communication link.

The link F provides communication between the server 146 and the injection technician 148 (e.g., the remote computing device operated by the injection technician 148). As shown in FIG. 5, the link F may be configured to transmit emails, SMS messages, and web communications.

As explained above, the smart fluid injection system 300 provides notification of the arrival of the injection fluid 134 (see FIGS. 2, 4, 7-11, 14, and 15) at the receiving end 116 (see FIGS. 2 and 7-11) of an unattended injection (which is standard practice for Novinium's iUPR process). For example, both the smart injection and receiver tanks 130 and 160 may have cellular or satellite transceivers, which can transmit data collected from the injection process and relay status information to the injection supervisor (e.g., the injection technician 148). Alternatively, only one of the smart injection and receiver tanks 130 and 160 may include a transceiver (not shown) and the other tank may not be instrumented with communication equipment. It is also possible that the instrumented injection tank could notify a nearby crew member using either an audio or visual signal without using any wireless or wired communication.

Referring to FIG. 5, possible communication configurations include the following:
1. Link C+Link A or Link C+Link B—Dual ended with one cell link
2. Link C+Link A+Link F or Link C+Link B+Link F—Dual ended with one server link and remote notification and control
3. Link C—Dual ended no remote communication
4. Link C+Link D+Link E—Dual ended with tablet communication to server
5. Link A+Link B—Dual ended with independent server links
6. Link A+Link B+Link F—Dual ended with independent server links and remote communication Communication technologies that may be used to implement one or more of the communication links A and B include cellular and/or satellite communication technologies. Examples of cellular communication technologies that may be used include LTE-M, Narrowband Internet of Things "NB-IoT" technologies, and the like. Both LTE-M and NB-IoT use standard 4G LTE networks and are designed for Internet of Things ("IoT") devices, which have relatively minimal data bandwidth and latency requirements. Basic LTE-M or NB-IoT service may be inexpensive and well suited to the application, if cellular service is available at the jobsites. Alternatively, 3G or SigFox technology may be used in the same way. Cellular communication technologies may use HyperText Transfer Protocol ("HTTP") to communicate between the cellular modem (e.g., the cellular modem 159 illustrated in FIG. 3) and the server 146 through a tower or cellular base station (not shown). However, lower data packet sizes than may be provided by HTTP are advantageous, especially for NB-IoT due to its reduced bandwidth. Other protocols such as MQ Telemetry Transport ("MQTT") or Constrained Application Protocol ("CoAP") can be used to transfer data from the cellular modem to an intermediate device, such as an MQTT broker (not shown) where the transferred data may be converted to one or more HTTP packets for communication to the server 146.

Examples of satellite communication technologies that may be used to implement the communication links A and B include Iridium satellite modems and service. In special applications, where the smart injection tank 130 and/or the smart receiver tank 160 is/are performing a long injection in a remote area that is difficult to reach and is without cellular service, the expense of the satellite hardware could be justified or offset by the expense of checking on the injection equipment and/or the risk of not knowing for a long period of time that the injection equipment has failed.

If both the smart injection tank 130 and the smart receiver tank 160 are used to inject the cable segment 102 (see FIGS. 2, 4, 7-11, 14, and 15), it may be advantageous for them to communicate with one another. This communication (e.g., implemented by the link C) may be achieved using PLC and/or short-range wireless communication. With regard to PLC, a carrier frequency on the order of 100 kHz may be superimposed onto the cable segment 102 to which the injection equipment of the smart fluid injection system 300 is attached and used to transmit a bi-directional data signal. The carrier signal, modulated with transmitted data, may be applied to an energized cable using a capacitive coupler because of the large difference between the carrier signal frequency (which is near 100 kHz) and the power line frequency (which is at 60 Hz). A coupling capacitor may provide a high impedance path for the 60 Hz power to ground, and a low impedance path configured to allow the carrier frequency to easily pass through. With regard to short-range wireless, several short-range wireless protocols exist that may be suitable for tank-to-tank communication, such as LoRa, ZigBee, Bluetooth, or Wi-Fi. The LoRa protocol is well suited because it uses a low carrier frequency that penetrates solid objects, like transformer boxes, more effectively than a higher frequency.

These two sets of technologies, tank-to-tank communication (e.g., the link C) and tank-to-internet connection (e.g., the links A and B), can be combined in a hybrid approach where each set of two or more tanks is arranged in a mesh network, which then connects to the Internet using an access point located in the mesh network and serves many tanks. The short range networking technologies could also be used to connect each tank (e.g., via the link D) to the local computing device 147 (e.g., the tablet computer 306) for control, notifications, and as a method to send recorded data to the server 146 (e.g., which may be implemented using cloud computing) using the connected device's Internet connection (e.g., the link E).

Figure 6:
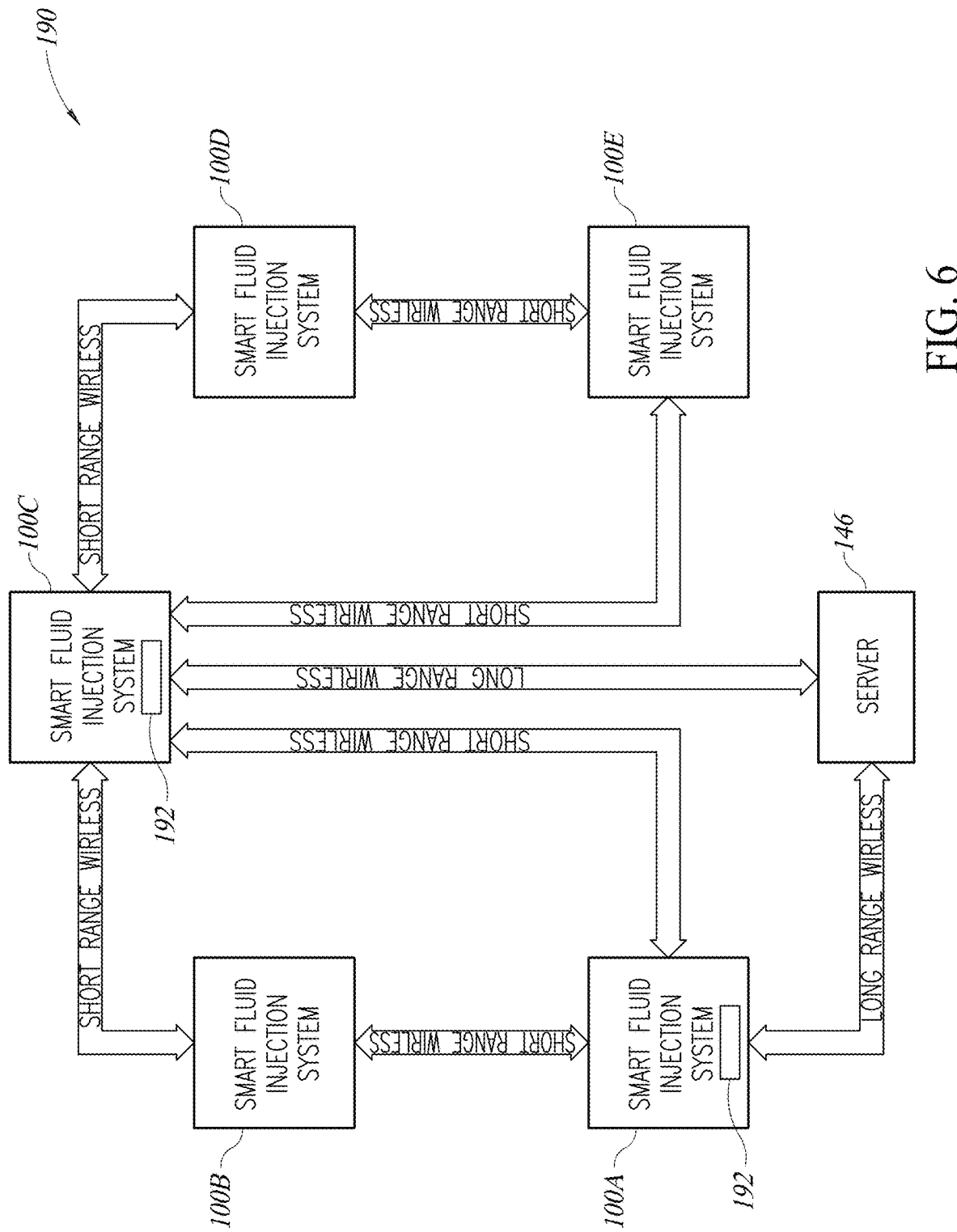
FIG. 6 is a block diagram illustrating an example mesh network of smart fluid injection systems each like the smart fluid injection system of FIG. 2.

FIG. 6 is a block diagram illustrating an example mesh network 190 of smart fluid injection systems 100A-100E each like the smart fluid injection system 100 (see FIGS. 2 and 14). The mesh network 190 may be formed by connecting each of the smart fluid injection systems 100A-100E to one or more of the other the smart fluid injection systems using a short range wireless protocol, such as Wi-Fi, Bluetooth, LoRa, or ZigBee. One or more of the smart fluid injection systems 100A-100E may each be equipped with a long range wireless transceiver 192. The smart fluid injection system(s) equipped with long range wireless transceivers may act as access points for the server 146. In FIG. 6, the smart fluid injection systems 100A and 100C are each equipped with the long range wireless transceiver 192. Thus, the smart fluid injection systems 100A and 100C are configured to act as access points for the server 146. The long range wireless transceivers 192 may use LTE-M, NB-IoT, similar technology, and the like. Referring to FIG. 2, the access point(s) may not be required by any of the sensors (e.g., in the sensor package 142 or included in the sensor(s) 172) and may function as the bridge between the short range wireless communication used in the mesh network 190 and the long range communication used to communicate with the external server 146.

Additionally, the smart injection and/or receiver tanks 130 and 160 may be configured to communicate with the injection technician 148 using audio or visual means. For example, injection status information may be relayed through a speaker (not shown) on the smart injection tank 130 that is triggered by a tap on the case (not shown) of the transformer 104 housing the smart injection tank 130 in a predefined pattern and recognized by a microphone (not shown) on the smart injection tank 130. Similarly, injection status information may be relayed through a speaker (not shown) on the smart receiver tank 160 that is triggered by a tap on the case (not shown) of the transformer 106 housing the smart receiver tank 160 in a predefined pattern and recognized by a microphone (not shown) on the smart receiver tank 160. These methods of communication with the smart injection tank 130 and the smart receiver tank 160 save injection technicians' time and are safer because the injection technicians would not be required to open the transformers 104 and 106, respectively.

Automated Air Test

Referring to FIG. 1, in current practice, an "air test" is often performed before iUPR or SPR injections to help ensure that the cable segment is free of major blockages and can withstand the pressures using during the planned injection. During an air test, compressed carbon dioxide is injected into the injection termination located at the first feed end of the cable segment and the flow of carbon dioxide is measured at at least one end of the cable segment. If the carbon dioxide flows cleanly through the cable segment, a carbon dioxide flow exiting from the second receiving end should be evident, and a carbon dioxide flow into the first feed end should be relatively constant. No flow at the second receiving end is indicative of a blocked segment and a rapid increase in flow at the first feed end is indicative of a leak, usually caused by an unexpected splice in the cable segment.

Figure 7:
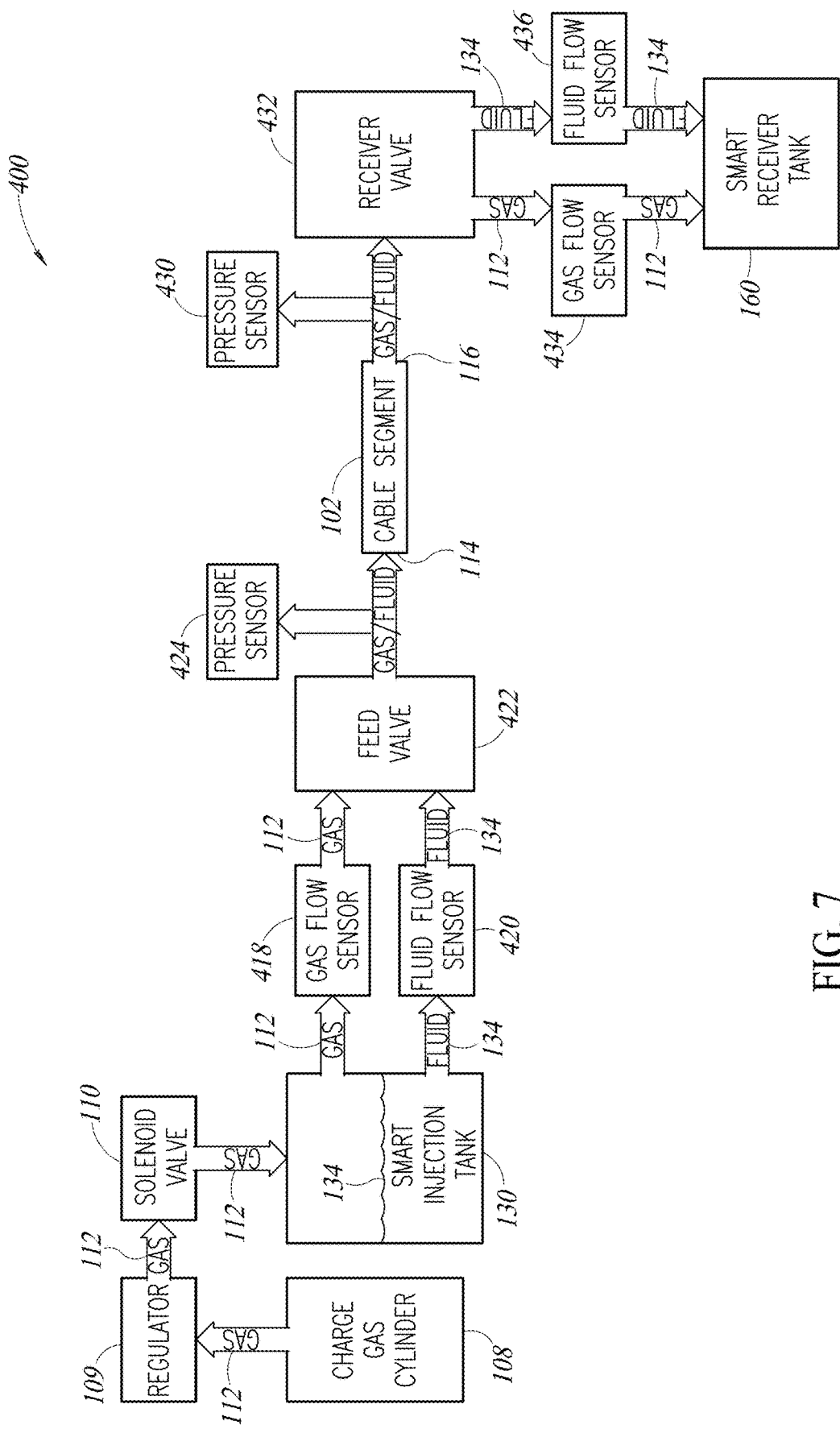
FIG. 7 is a block diagram of a smart fluid injection system configured to perform an automated air test.

FIG. 7 is a block diagram of a smart fluid injection system 400 that is an embodiment of the smart fluid injection system 100 (see FIGS. 2 and 14) configured to perform an air test. In FIG. 7, the smart fluid injection system 400 includes the charge gas cylinder 108 (configured to supply the charge gas 112), the regulator 109, the solenoid valve 110, the smart injection tank 130, a first gas flow sensor 418, a first fluid flow sensor 420, a feed valve 422 (which may be implemented as a "three-way L-port solenoid valve"), a first pressure sensor 424, the cable segment 102, a second pressure sensor 430, a receiver valve 432 (e.g., a three-way L-port solenoid valve), a second gas flow sensor 434, a second fluid flow sensor 436, and the smart receiver tank 160. The charge gas cylinder 108 provides the charge gas 112 to the smart injection tank 130 via the regulator 109 and the solenoid valve 110. The charge gas 112 pressurizes the injection fluid 134 inside the smart injection tank 130. During an air test, a portion of the charge gas 112 is allowed to exit the smart injection tank 130 and flow toward the cable segment 102 through the first gas flow sensor 418, the feed valve 422, and the first pressure sensor 424. The charge gas 112 exiting the cable segment 102 flows toward the smart receiver tank 160 through the second pressure sensor 430, the receiver valve 432, and the second gas flow sensor 434. The injection fluid 134 exiting the smart injection tank 130 flows toward the cable segment 102 through the first fluid flow sensor 420, the feed valve 422, and the first pressure sensor 424. The injection fluid 134 exiting the cable segment 102 flows toward the smart receiver tank 160 through the second pressure sensor 430, the receiver valve 432, and the second fluid flow sensor 436. The feed valve 422 is configured to allow the injection fluid 134 and the charge gas 112 to flow therethrough and enter the cable segment 102 one at a time.

U.S. Pat. No. 5,279,147 is incorporated herein by reference in its entirety. U.S. Pat. No. 5,279,147 describes an "air test" that may be used to locate disruptions in an electrical cable. The air test described by U.S. Pat. No. 5,279,147 may be automated and quantified so that the air test can be performed by the smart fluid injection system 400 more quickly and with a higher degree of certainty than is possible with the subjective methods currently used. The smart injection and receiver tanks 130 and 160 can communicate with one another, as well as sensors (e.g., the first gas flow sensor 418) and actuators (e.g., the feed valve 422), which can control and measure the flow of the compressed charge gas 112 through the cable segment 102. By way of another non-limiting example, the sensors may be installed only on the smart receiver tank 160, which may communicate (e.g., via the communication module 174) with the actuator(s) 140 installed at the smart injection tank 130. By way of yet another non-limiting example, the air test can be completed using only one end of the cable segment 102, provided the opposite termination provides an unrestricted path to atmosphere. A flow rate of the charge gas 112, measured at the feed end 114 by the first gas flow sensor 418, which drops to or is close to zero may be indicative of a blocked segment. A flow rate which rapidly increases may be indicative of a leak.

As shown in FIG. 7, the air test equipment may be integrated with the injection equipment such that the charge gas 112 from the smart injection tank 130 may be used for the air test and the feed valve 422 automatically opened following detection of sufficient flow in the cable segment 102 by the first gas flow sensor 418. The controller 138 may be connected to the first gas flow sensor 418 and configured to detect when the cable segment 102 is exhibiting sufficient flow and to instruct the feed valve 422 to stop the flow of the charge gas 112 and instead allow the injection fluid 134 to flow therethrough and into the cable segment 102. The receiver valve 432 could be used to divert the charge gas 112 or the injection fluid 134 flowing through the cable segment 102 into the appropriate flow meter. For example, the second gas flow sensor 434 may be used to measure a flow of the charge gas 412 into the smart receiver tank 160, and the second fluid flow sensor 436 may be used to measure a flow of the injection fluid 134 into the smart receiver tank 160.

Closed-Loop Fluid Pressure Control

Figure 12:
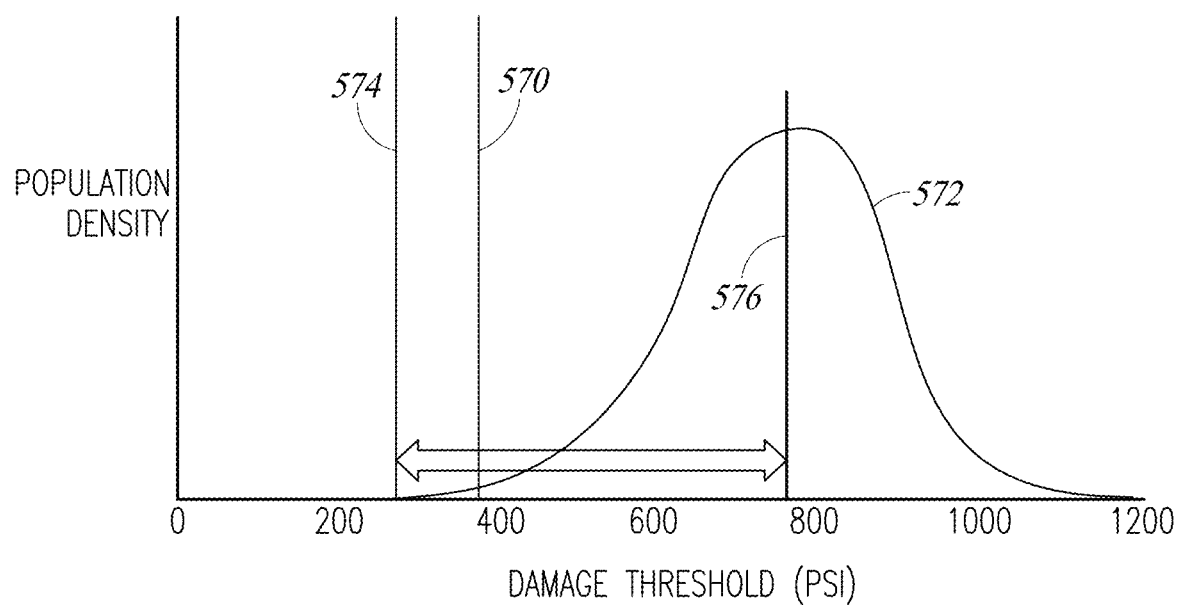
FIG. 12 is a graph of a distribution of cables with the y-axis being population density and the x-axis being a pressure at which the cables ruptured.
Figure 13A:
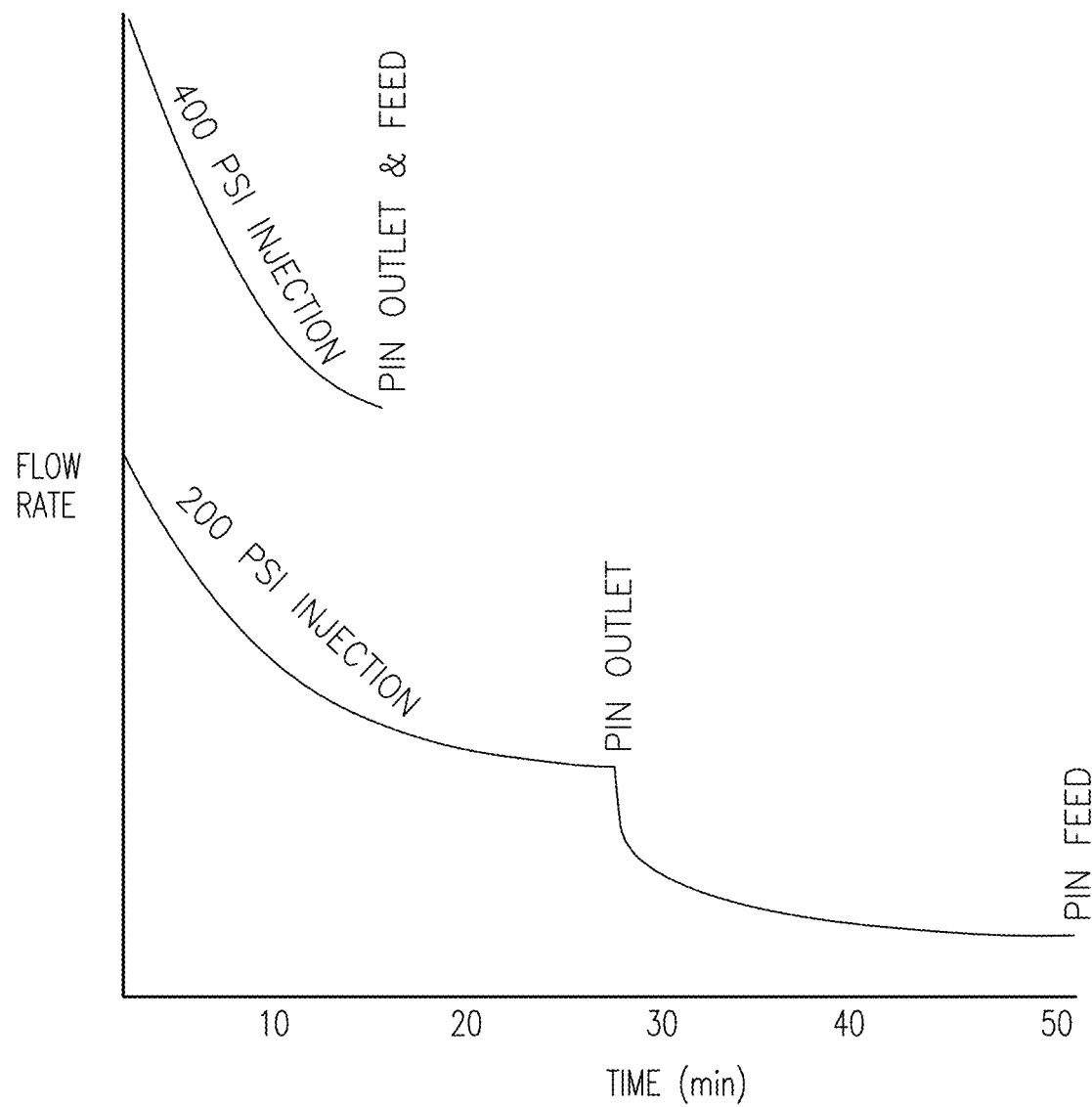
FIG. 13A is a graph illustrating flow rates and their durations when two different injection pressures are used.
Figure 13B:
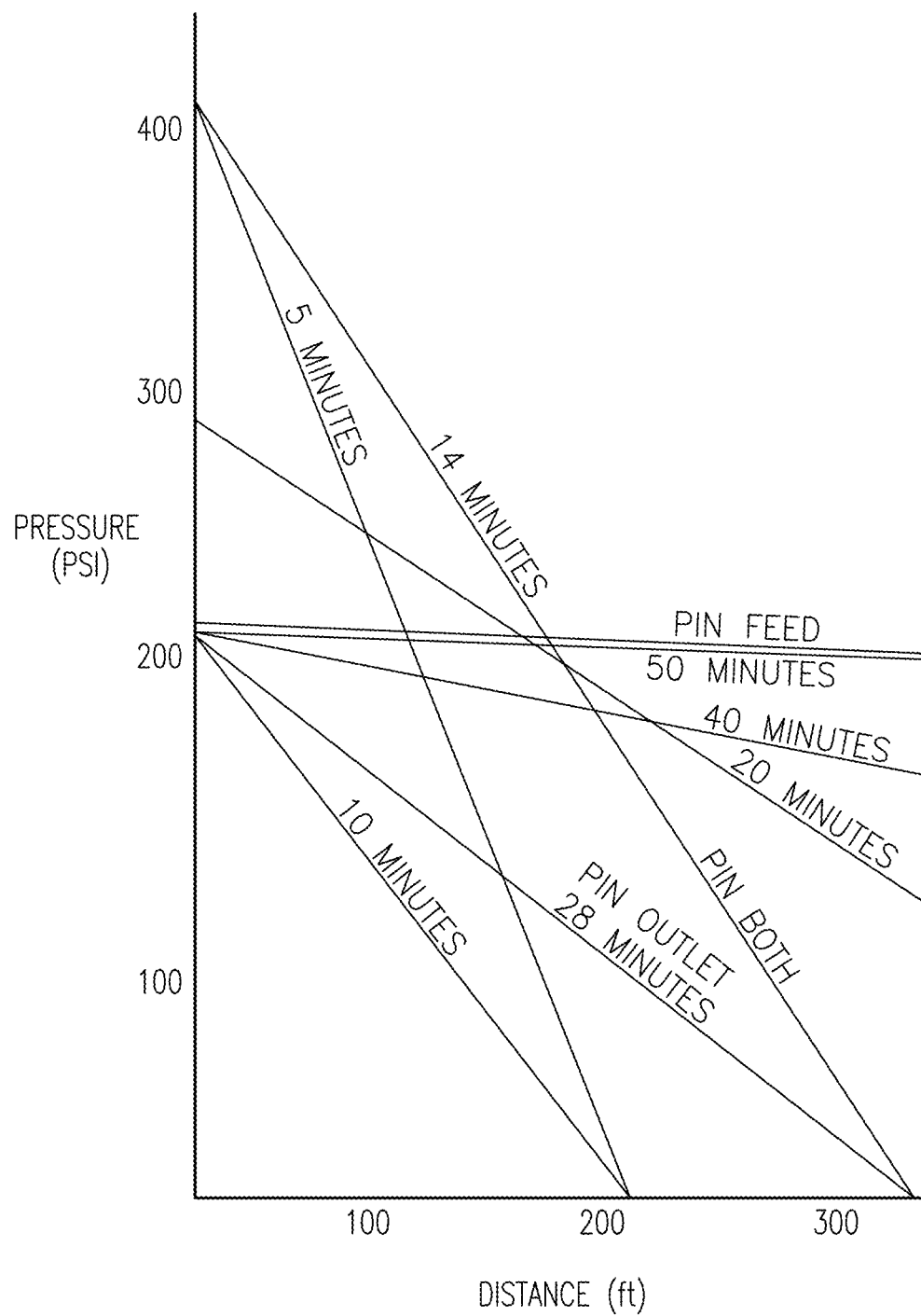
FIG. 13B is a graph illustrating pressures inside a cable at different distances from an injection location and at times after injection.

Referring to FIG. 12, development of the SPR method, which is described in U.S. Pat. No. 8,656,586, began using injection pressures (illustrated by a line 570) at about half the rupture pressure of a typical electrical cable. A curved line 572 illustrates a distribution of cables that burst at each pressure shown. As illustrated in FIG. 12, the mean pressure at which the cables burst is about 800 pounds per square inch ("psi") and the initial injection pressures were about 400 psi (illustrated as the line 570). Among other things, U.S. Pat. No. 8,656,586 describes the benefits of using higher injection pressures. Early injections utilizing the SPR method experienced bursting cables during injection due to rupture at points in the cable insulation weakened by manufacturing, environmental, and/or thermal defects. As a precaution, to avoid bursting, injection pressures for the SPR method were dropped to about a quarter of typical rupture pressure (illustrated by a line 574). This pressure reduction eliminated the possibility of rupture during injection. The automated smart fluid injection system 100 illustrated in FIG. 2 allows for an increase in injection pressure without the hazard of rupture through continuous monitoring of cable properties to improve injection time, increase permeation rate of dielectric fluid, and reduce operator error. FIGS. 13A and 13B illustrate the benefits of increasing the injection pressure.

Figure 8:
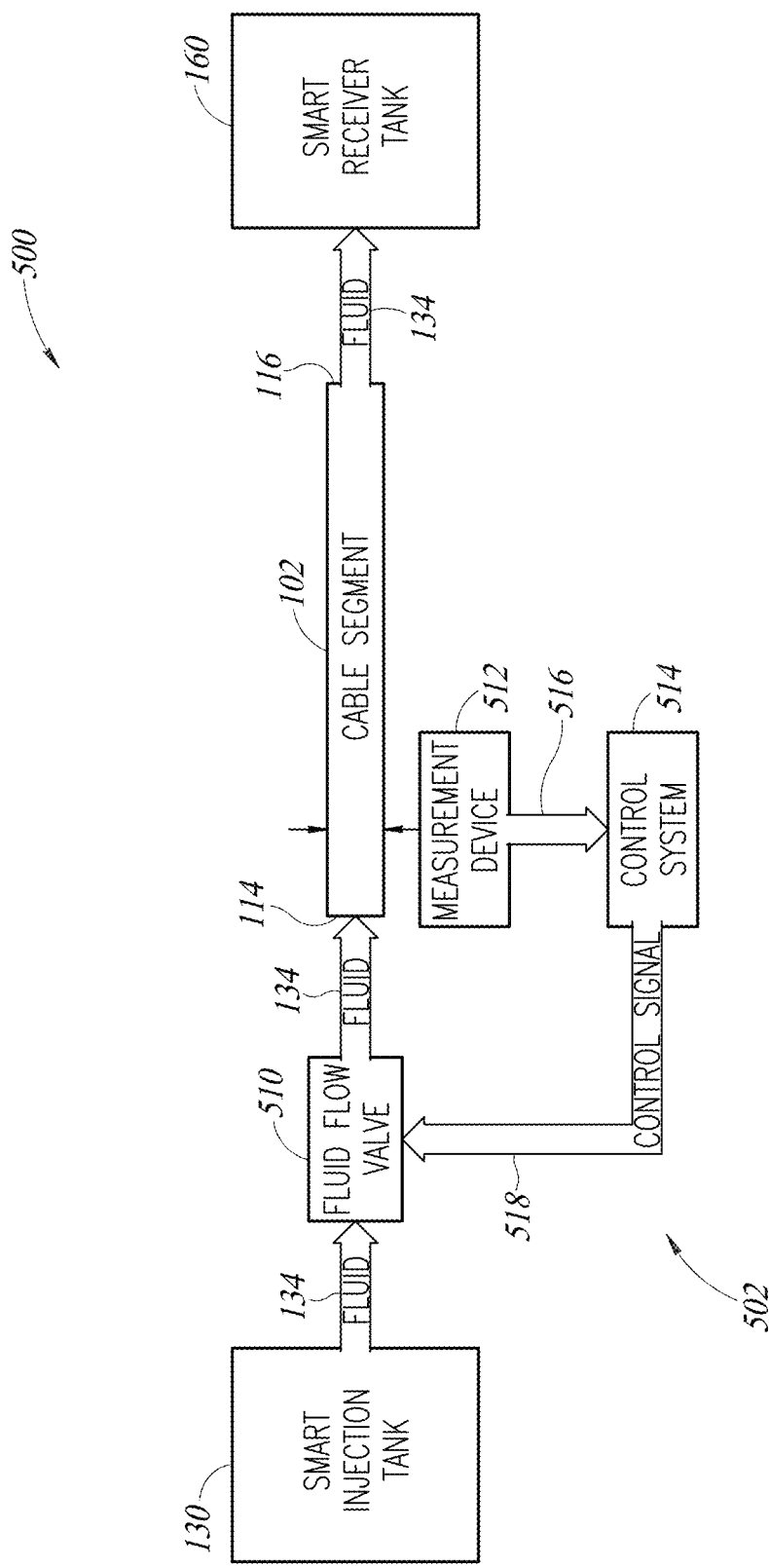
FIG. 8 is a block diagram of a first embodiment of a smart fluid injection system configured to control the pressure at which injection fluid is injected into a cable segment.

FIG. 8 is a block diagram of a smart fluid injection system 500 that is an embodiment of the smart fluid injection system 100 configured to control the pressure at which the injection fluid 134 is injected into the cable segment 102 using a feedback loop 502. Referring to FIG. 8, the smart fluid injection system 500 may include the smart injection tank 130, a fluid flow valve 510, a measurement device 512, a control system 514, the cable segment 102, and the smart receiver tank 160. In the embodiment illustrated in FIG. 2, the smart injection tank 130 is pressurized by the charge gas 112 provided by the charge gas cylinder 108 via the regulator 109 and the solenoid valve 110.

The feedback loop 502 includes the fluid flow valve 510, the measurement device 512, and the control system 514. The measurement device 512 is configured to measure one or more physical properties (e.g., radius, diameter, circumference, and the like) of the cable segment 102 at or near the feed end 114 and send a sensor signal 516 to the control system 514. The control system 514 uses the sensor signal 516 to formulate a control signal 518, which the control system 514 sends to the fluid flow valve 510. The control signal 518 may include one or more instructions to the fluid flow valve 510 that instruct(s) the fluid flow valve 510 to open or close. The fluid flow valve 510 is configured to implement the instruction(s) to thereby adjust the pressure of the injection fluid 134 being introduced into the cable segment 102. Thus, the feedback loop 502 uses one or more physical properties of the cable segment 102 to determine the introduction pressure of the injection fluid 134.

The smart fluid injection system 500 and associated method may be configured to improve the control of the injection pressure to operate closer to the rupture limit of the polymeric insulation and semiconductor shields without inducing unacceptable creep in the polymers of the electrical cable segment 102. Using algorithms based on polymer elasticity and creep, the introduction of the injection fluid 134 may be tailored to the limits of the electrical cable segment 102 based on its physical properties as measured by the measurement device 512. By measuring the cable diameter dynamically (using the measurement device 512), the feedback loop 502 monitors the electrical cable segment 102 for expansion beyond specified limits during the injection process and adjusts the introduction pressure of the injection fluid 134 to maintain the integrity of the insulation and semiconductor layers of the electrical cable segment 102 during and after injection.

Figure 9:
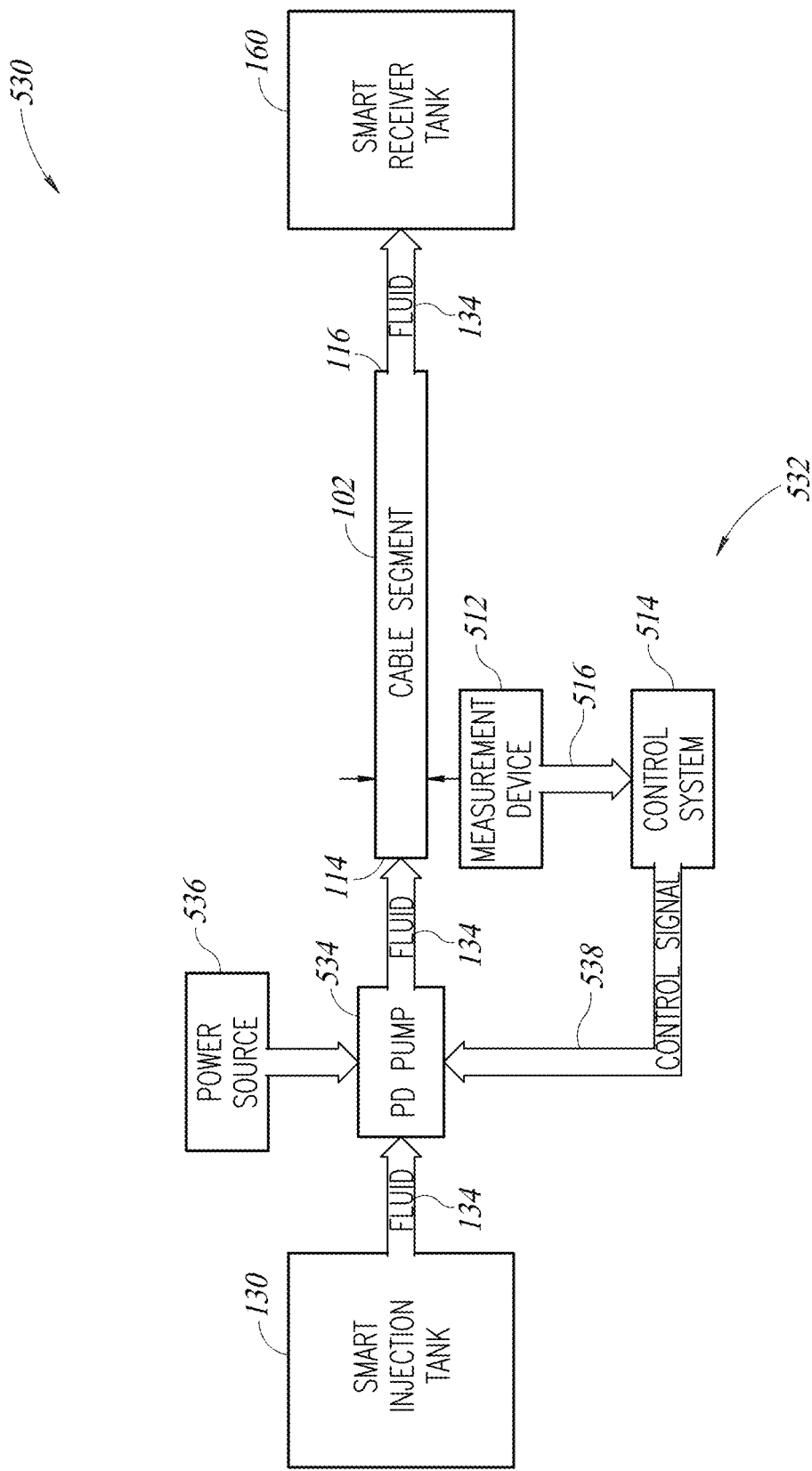
FIG. 9 is a block diagram of a second embodiment of a smart fluid injection system configured to control the pressure at which the injection fluid is injected into the cable segment.

FIG. 9 is a block diagram of a smart fluid injection system 530 that is an embodiment of the smart fluid injection system 100 configured to control the pressure at which the injection fluid 134 is injected into the cable segment 102 using a feedback loop 532. In the embodiment illustrated in FIG. 9, the smart injection tank 130 is not pressurized by the charge gas 112. The feedback loop 532 is substantially similar to the feedback loop 502 (see FIG. 8) but instead of the fluid flow valve 510 (see FIG. 8), the feedback loop 532 includes a positive displacement ("PD") pump 534 powered by a power source 536. The measurement device 512 is configured to measure one or more physical properties (e.g., radius, diameter, circumference, and the like) of the cable segment 102 at or near the feed end 114 and send the sensor signal 516 to the control system 514. The control system 514 uses the sensor signal 516 to formulate a control signal 538, which the control system 514 sends to the PD pump 534. The control signal 538 may include one or more instructions to the PD pump 534 that instruct(s) the PD pump 534 to increase or decrease the introduction pressure of the injection fluid 134. The PD pump 534 is configured to implement the instruction(s) to thereby adjust the pressure of the injection fluid 134 being introduced into the cable segment 102. Thus, the feedback loop 532 uses one or more physical properties of the cable segment 102 to determine the introduction pressure of the injection fluid 134.

Figure 10:
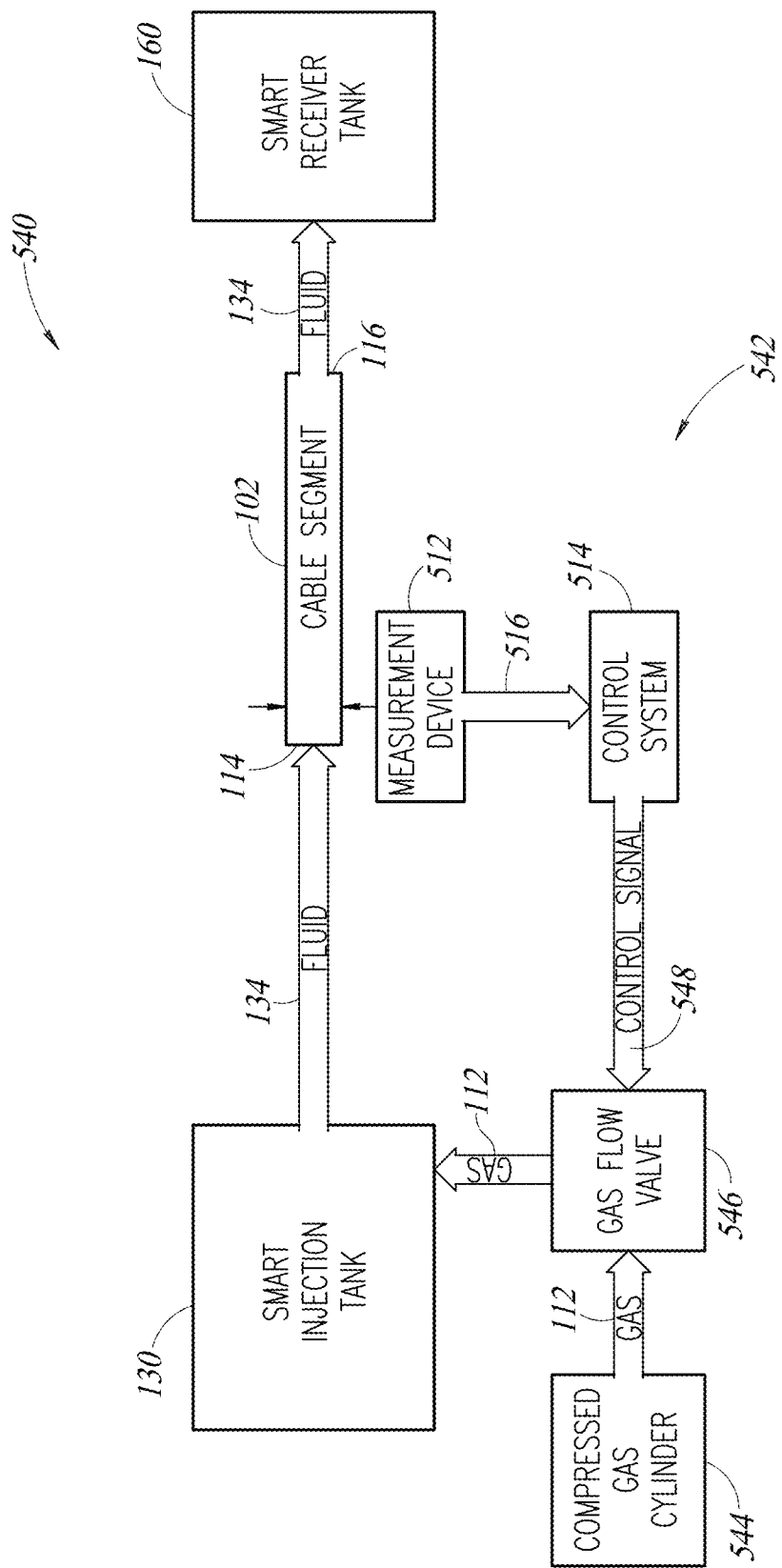
FIG. 10 is a block diagram of a third embodiment of a smart fluid injection system configured to control the pressure at which the injection fluid is injected into the cable segment.
Figure 11:
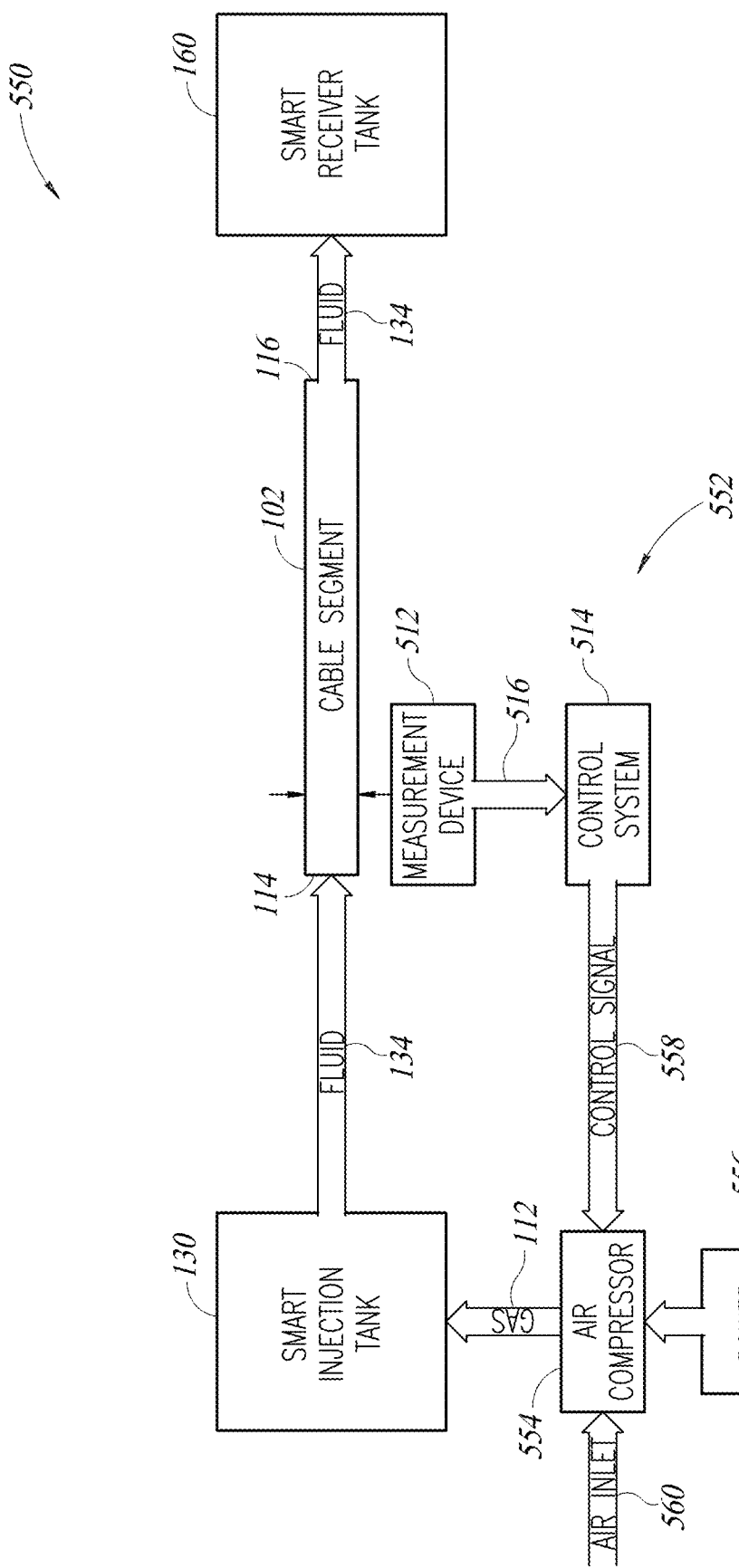
FIG. 11 is a block diagram of a fourth embodiment of a smart fluid injection system configured to control the pressure at which the injection fluid is injected into the cable segment.

FIG. 10 is a block diagram of a smart fluid injection system 540 that is an alternate embodiment of the smart fluid injection system 100 configured to control the pressure at which the injection fluid 134 is injected into the cable segment 102 using a feedback loop 542. In the embodiment illustrated, the smart injection tank 130 is pressurized by the charge gas 112 provided by a compressed gas reservoir 544 (e.g., the charge gas cylinder 108 illustrated in FIGS. 2, 7, and 15). The compressed gas reservoir 544 is connected to the smart injection tank 130 by a gas flow valve 546 (e.g., the regulator 109 and/or the solenoid valve 110 both illustrated in FIGS. 2, 7, and 15). The gas flow valve 546 is configured to control the amount of the charge gas 112 that flows from the compressed gas reservoir 544 into the smart injection tank 130. Thus, the gas flow valve 546 may be used to control the introduction pressure of the injection fluid 134.

The smart fluid injection system 540 is substantially similar to the smart fluid injection system 500 (see FIG. 8) but the smart fluid injection system 540 omits the fluid flow valve 510 (see FIG. 8). Instead, the control system 514 uses the sensor signal 516 to formulate a control signal 548, which the control system 514 sends to the gas flow valve 546. The control signal 518 may include one or more instructions to the gas flow valve 546 that instruct(s) the gas flow valve 546 to open or close. The gas flow valve 546 is configured to implement the instruction(s) to thereby adjust the pressure of the injection fluid 134 being introduced into the cable segment 102. Thus, the feedback loop 542 uses one or more physical properties of the cable segment 102 to determine the introduction pressure of the injection fluid 134.

Three characteristics may be used to determine the quality of an injection. They include (1) deflection in the diameter of the insulation of the cable segment 102, (2) the pressure at which the dielectric injection fluid 134 is being introduced into the interstitial void volume of the conductor, and (3) the mass of dielectric injection fluid 134 introduced into the cable segment 102. As described above, the smart fluid injection systems 500, 530, 540, and 550 each include the measurement device 512, which is configured to measure one or more physical properties (e.g., radius, diameter, circumference, and the like) of the cable segment 102 at or near the feed end 114 and send the sensor signal 516 to the control system 514. The control system 514 uses the sensor signal 516 to formulate the control signals 518, 538, 548, and 558 that control the injection pressure in the smart fluid injection systems 500, 530, 540, and 550, respectively. Thus, the smart fluid injection systems 500, 530, 540, and 550 are configured to control the quality of the injection.

The measurement device 512 may be configured to detect the diametrical deflection of the cable segment 102 and may be implemented as one or more of the following:

1. Pressure cuff (analogous to a blood pressure measurement cuff) may be pressurized with gas and wrapped around the cable segment 102. The pressure increases as the diameter (and circumference) of the cable segment 102 increases since the annular cross-section of the pressure cuff is reduced, thus reducing the volume of the pressure cuff. In other words, the diameter of the cable segment 102 corresponds to the pressure of the gas inside the pressure cuff.
2. Strain gauge tape or a flexible strain gauge may be wrapped around the cable segment 102 and secured. The increase in circumference of the cable segment 102 stretches the tape or gauge and produces a measurable change in resistance, which may be read directly or compared with a reference using a bridge circuit.
3. Optical methods, like a laser interferometer, may be used to measure diametrical deflection of the cable segment 102.
4. Mechanical linear measurement instrument, which is an instrument like a digital micrometer with v-anvil, may be used to measure the diameter of the cable segment 102 directly.

The smart fluid injection systems 500, 530, 540, and 550 may each be used to inject the cable segment 102 at a higher introduction or injection pressure (e.g., illustrated by a line 576 in FIG. 12) than is currently used (e.g., illustrated by the line 574 in FIG. 12). One significant advantage of using a higher injection pressure for SPR treatment is that the cable pressurization time can be reduced or eliminated while still injecting the same amount of the injection fluid 134 into the cable segment 102 as now achieved with a longer pressurization time. In current practice, the pressurization time is required to bring the cable segment 102 up to pressure, allow the viscoelastic insulation to expand slightly, and allow for the recommended volume of the injection fluid 134 to be injected. One method to achieve this requires the flow of the injection fluid 134 to be shut off at the receiving end 116 of the cable segment 102 while the feed end 114 remains open until a flow meter measures a flow rate near zero. If the injection pressure could be increased to well above the final pressure desired, both the flow at the receiving end 116 and at the feed end 114 of the cable segment 102 could be stopped as soon as the injection fluid 134 has arrived at the receiving end 116 as shown in FIG. 12. Over tens of minutes, the pressure gradient in the cable segment 102 will equalize to the final recommended value, which is less than the maximum pressure presented to the feed end 114.

The smart fluid injection systems 500, 530, 540, and 550 may increase the injection pressure to well above the final pressure desired when the control system 514 determines (using the sensor signal 516) that the cable segment 102 has not expanded beyond specified limits during the injection process. Before the cable segment 102 expands beyond the specified limits, the smart fluid injection systems 500, 530, 540, and 550 may adjust the introduction pressure of the injection fluid 134 to prevent the cable segment 102 from expanding beyond the specified limits during and after the injection. Thus, the smart fluid injection systems 500, 530, 540, and 550 each allows for an increase in injection pressure (e.g., to the pressure illustrated by the line 576) without the hazard of rupture through continuous monitoring of the cable properties to improve injection time, increase permeation rate of dielectric fluid, and reduce operator error.

Predictive Injection Time Estimate

The smart receiver tank 160 or the smart injection tank 130 may be used to estimate or predict the duration of an injection and update that prediction based on measurements taken automatically during the injection process. This prediction is a benefit to crew logistics because the prediction allows more advanced planning of equipment collection at the conclusion of the injection. Further, the prediction is a valuable troubleshooting tool capable of early detection of a blocked or leaking segment, or malfunctioning injection equipment. Referring to FIG. 2, the smart fluid injection system 100 may include a cellular or satellite communication link with the injection supervisor (or the injection technician 148) for real-time updates. The time required to inject the cable segment 102 can be predicted or modeled using cable geometry, fluid properties, and applying a Poiseuille flow model. The smart fluid injection system 100 updates this model (or prediction) by using real time measurements to improve the accuracy and allow detection of an anomalous flow rate, which is indicative of an unexpected blockage (e.g., due to craftwork issues), an unexpected splice, a leak, conductor corrosion, or other problems.

When the smart receiver tank 160 is used to predict the duration of an injection and update that prediction, the sensor(s) 172 of the smart receiver tank 160 may include the barometer 184 (see FIG. 4) configured to measure the internal pressure within the interior portion 189 of the smart receiver tank 160. The smart receiver tank 160 may use this internal pressure and other information about cable geometry to estimate progress of the injection. An exemplary method of using internal pressure and cable geometry information to estimate injection progress that may be performed by the smart receiver tank 160 is described below with respect to FIG. 14. For iUPR injections, the internal pressure of the smart receiver tank 160 is a rough or partial vacuum to increase the pressure differential, enabling faster fluid progress without risking a pressure level that could damage splices or injection elbows. The sensor(s) 172 of the smart receiver tank 160 may include a standard barometer module that may be used to measure this internal pressure, provided its range has a suitably low minimum. By way of a non-limiting example, the barometer 184 may be implemented as a TE Connectivity MS5540C series, which measures pressures down to 10 millibar ("mbar"), unlike many others that have a lower limit of 300 mbar, and has a working temperature range from −40° C. to 85° C.

FIG. 14 shows the smart fluid injection system 100 with an injection in progress. In this embodiment, the sensor(s) 172 of the smart receiver tank 160 include a pressure sensor 610 (e.g., the barometer 184 illustrated in FIG. 4). In FIG. 14, the smart injection tank 130 has injected the injection fluid 134 into the cable segment 102 partway. The injected injection fluid 134 terminates inside the cable segment 102 at a fluid front 620. The smart receiver tank 160 may be under vacuum along with a portion 622 of the cable segment 102 that is ahead of the fluid front 620. Since the injection happens slowly, it is assumed that the pressure in the portion 622 of the cable segment 102 ahead of the fluid front 620 is equal to the pressure in the smart receiver tank 160. The location of the fluid front 620 may be calculated using the following inputs:

1. The absolute pressure in the smart receiver tank 160 at the start of the injection;
2. The pressure difference in the smart receiver tank 160 between the start of injection and the current time; and
3. The cable geometry.

One or more of the following corrections may be applied to the calculation of the location of the fluid front 620:

1. Inert gas evolution from the injection fluid 134 that introduces gas into the volume being measured;
2. Viscoelastic effects on the smart receiver tank 160 under pressure causing its volume to change;
3. Viscoelastic effects on the cable segment 102 being injected;
4. Leaks in the smart receiver tank 160 and/or the fluid injection system 100;
5. Temperature, since temperatures of the cable segment 102 and the smart receiver tank 160 are different, and the pressure sensor 610 (e.g., the barometer 184 illustrated in FIG. 4) may not be fully compensated for temperature; and
6. Volume of tubing and connections on the feed end 114 and the receiving end 116.

Calculations

The following methods may be used by the controller 168 of the smart receiver tank 160 to calculate the location of the fluid front 620, which is an estimate of the progress of the injection. Alternatively or additionally, referring to FIG. 2, these methods may be performed by the server 146, the local computing device 147, and/or the controller 138 of the smart injection tank 130.

Referring to FIG. 14, a first method of calculating the location of the fluid front 620 ignores any dissolved inert gas that might be present. The first method uses Equation 1 (the ideal gas law):

$$PV = nRT \quad \text{(Eqn. 1)}$$

In Equation 1 above, the variable "P" represents the internal pressure of the smart receiver tank 160 and the portion 622 of the cable segment 102 ahead of the fluid front 620, the variable "V" represents the sum of a volume of the smart receiver tank 160 (including accessory and tubing volume) and an internal volume of the portion 622 of the cable segment 102 ahead of the fluid front 620, the variable "n" represents the total amount of gas present in this volume in moles, the variable "R" represents the gas constant, and the variable "T" represents temperature which is assumed to be constant.

Using a set of example initial conditions, shown in Table 2, the controller 168 may calculate the pressure as the volume is reduced to represent the approaching fluid front 620. A cable volume of 0.7 cc/ft is typical for #2 URD cable most commonly encountered.

TABLE 2

Initial Conditions

| Parameter | Value | Units | Value2 | Units2 |
|---|---|---|---|---|
| R | 8.31E+04 | cc * mbar/K/mol | | |
| Cable Vol | 0.70 | cc/ft | | |
| Initial Pressure | 50 | mbar | | |
| Vtank | 1500 | cc | | |
| Cable Length | 200 | ft | | |
| T | 20 | C. | 293 | K |
| Cable Vol | 140.00 | cc | | |
| Total Vol | 1640.00 | cc | | |
| Total Moles | 3.37E−03 | mol | | |

The total volume may be expressed in terms of the injection progress using Equation 2 below:

$$V = V_{tank} + V_{cable}(1 - I_{prog}) \quad \text{(Eqn. 2)}$$

In Equation 2 above, the variable "$V_{tank}$" represents a first internal volume of the smart receiver tank 160 (including accessory and tubing volume) and the variable "$V_{cable}$" represents a second internal volume of the cable segment 102. In Equation 2 above, the variable "$I_{prog}$" represents the progress of the injection, typically expressed as a percentage of the second internal volume (represented by the variable "$V_{cable}$"). The first volume is in fluid communication with a third internal volume of the portion 622 of the cable segment 102 that is ahead of the fluid front 620. Thus, by combing Equations 1 and 2, Equation 3 may be derived.

$$I_{prog} = 100 * (1 - ((nRT)/P - V_{tank})/V_{cable}) \quad \text{(Eqn. 3)}$$

In Equation 3 above, the variable "n" represents the total amount of gas in moles present in the first and third internal volumes, the variable "R" represents the gas constant, and the variable "T" represents the temperature which is assumed to be constant. Thus, to solve the Equation 3, the controller 168 obtains the first internal volume (represented by the variable "$V_{tank}$"), the second internal volume (represented by the variable "$V_{cable}$"), the internal pressure inside the first and third internal volumes (represented by the variable "P"), the number of moles of gas in the first and third internal volumes (represented by the variable "n"), the temperature (represented by the variable "T"), and the gas constant (represented by the variable "R"). Then, the controller 168 calculates the location (represented by the variable "$I_{prog}$") of the fluid front using the Equation 3 and may transmit the location to an external computing device for display thereby.

Using the Equation 3 above, the pressure in the smart fluid injection system 100 can be calculated and is shown in Table 3 below. In this example, the pressure sensor 610 is implemented as the barometer 184 (e.g., a MS5540C) illustrated in FIG. 4 and has a minimum measurable pressure of 10 mbar and a 0.1 mbar resolution.

TABLE 3

Pressure vs. Injection Progress

| Inj. Prog. % | Press (mBar) | Resolution steps (0.1 mBar) |
|---|---|---|
| 0 | 50.0 | 0 |
| 0.1 | 50.4 | 4 |
| 0.2 | 50.9 | 9 |
| 0.3 | 51.3 | 13 |
| 0.4 | 51.8 | 18 |
| 0.5 | 52.2 | 22 |
| 0.6 | 52.7 | 27 |
| 0.7 | 53.2 | 32 |

TABLE 3-continued

Pressure vs. Injection Progress

| Inj. Prog. % | Press (mBar) | Resolution steps (0.1 mBar) |
|---|---|---|
| 0.8 | 53.7 | 37 |
| 0.9 | 54.2 | 42 |
| 1 | 54.7 | 47 |

The pressure difference between the initial condition (0%) and completed injection (100%) doubles (doubling sensitivity) if the first internal volume of the interior portion 189 of the smart receiver tank 160 (represented by the variable "$V_{tank}$") is halved, length of the cable segment 102 is doubled, or the initial pressure is doubled. Since a pressure difference over the duration of the injection is the parameter of interest, sensor repeatability is more important than absolute accuracy. A typical initial pressure for the smart receiver tank 160 is unknown since it is not typically recorded, but 50 mbar is likely a conservative estimate.

A second method of calculating the location of the fluid front 620 accounts for dissolved $CO_2$ and other inert gas. One potential issue to consider when determining the location of the fluid front 620 is the effect of $CO_2$ dissolved in the injection fluid 134 that escapes from the fluid front 620 as the fluid front 620 is exposed to lower pressure. This introduces more gas to the interior portion 189 of the smart receiver tank 160. In other words, the dissolved gas that exits the cable segment 102 and enters the fluid reservoir 166 may escape from the fluid reservoir 166 and enter the interior portion 189. The dissolved gas may escape into the interior portion 189 through the float valve 186, which is open as long as injection fluid 134 has not yet arrived at the fluid reservoir 166 and caused the float 180 to rise and close the float valve 186. It is difficult to determine exactly how much $CO_2$ escapes from the fluid front 620 into the interior portion 189 of the smart receiver tank 160, but a good starting point is to identify the upper bound (worst case). $CO_2$ solubility published for trifluoropropylmethyl siloxane at various pressures may be linearly interpolated to estimate the amount of dissolved $CO_2$ at typical iUPR injection pressure. Fluids that are primarily dimethoxysilanes are believed to have a $CO_2$ solubility that is lower than that of trifluoropropylmethyl siloxane, but comparable. Solubility data is given in Table 4 below.

TABLE 4

Solubility of Carbon Dioxide in Silicone Oil

| Total Pressure (pounds per square inch absolute ("psia")) | wt of $CO_2$ dissolved in 0.1495 lb of silicone oil, lb × $10^3$ | ratio of $CO_2$ wt to silicone oil wt, lb of $CO_2$/lb of silicone oil |
|---|---|---|
| 109.5 | 0.35 | 0.023 |
| 160.0 | 0.57 | 0.038 |
| 230.0 | 0.92 | 0.061 |
| 289.0 | 1.27* | 0.085 |
| 325.8 | 1.46 | 0.098 |
| 446.0 | 2.35 | 0.157 |
| 587.3 | 3.86 | 0.258 |
| 691.0 | 5.71 | 0.382 |
| 115.9 | 8.67 | 0.580 |
| 833.7 | 13.38 | 0.895 |

*Determined by an absorption measurement. All others were determined by desorbing $CO_2$ from the silicone oil Table 4 (above) lists experimental results reported by Gary D, Wedlake and Donald B. Robinson. An analysis of random error in these experiments indicates that the precision of the reported solubility is ±3%. The data, also shown in Table 4 above, have a limiting slope at 0.0 psia of $2.1 \times 10^{-4}$ lb of $CO_2$ $lb^{-1}$ of silicone $psia^{-1}$.

Using the same initial parameters from Table 2, the final pressure at the end of injection may be calculated assuming that the injection fluid 134 was fully saturated and released all $CO_2$ ahead of the fluid front 620 during the injection. This pressure is presented along with the final pressure assuming no effect from escaping $CO_2$ in Table 5.

TABLE 5

Dissolved CO2 effect, worst case

| Parameter | Value | Units | Value2 | Units2 |
|---|---|---|---|---|
| $CO_2$ sol. at 0 psia | 2.20E−03 | wt % | | |
| $CO_2$ sol. at 109.5 psia | 0.023 | wt % | | |
| Inj. Press. psig | 30 | psia | | |
| Inj. Press. psia | 44.7 | psig | | |
| Interp. $CO_2$ | 0.010691 | wt % | | |
| Injection progress | 100% | % | | |
| Fluid density | 1.25 | g/cc | | |
| Fluid vol in cable | 140 | cc | | |
| Fluid wt in cable | 175 | g | | |
| $CO_2$ in cable | 1.870918 | g | 0.042521 | mol |
| Total Volume | 1500 | cc | | |
| Pressure w/$CO_2$ | 815.95 | mbar | | |
| Pressure w/out | 54.67 | mbar | | |

In this worst-case example, the pressure difference during injection considering escaping $CO_2$ is 164 times greater than the pressure difference without. This would likely severely affect the accuracy of this system unless the rate of $CO_2$ escape were very predictable and could be reliably corrected for. The real performance of the method will fall between these best-case and worst-case bounds.

Since the single-ended first method for estimating injection progress described above may be prone to error from many sources, it may lack the desired reliability. If more accuracy is required, the second method of estimating the injection progress may be used, which relies on integrating the volumetric flow rate measured at the smart injection tank 130 with time and calculating the injection progress based on the known interstitial volume of a cable with known dimensions.

In other words, the number of moles of gas (represented by the variable "n") in the first and third internal volumes may be characterized as being a minimum number of moles and the controller 168 may adjust the location of the fluid front (represented by the variable "$I_{prog}$") by (a) estimating a maximum number of moles of dissolved gas exiting the injection fluid 134 and entering the first and third internal volumes during the injection, (b) determining an estimated number of moles based at least in part on the maximum number of moles and the minimum number of moles, (c) determining an adjusted pressure by adjusting the internal pressure inside the first and third internal volumes based at least in part on the estimated number of moles, and (d) adjusting the location of the fluid front 620 (represented by the variable "$I_{prog}$") based on the adjusted pressure before the location is transmitted to the external computing device for display thereby.

Emergency Shutoff

Figure 15:
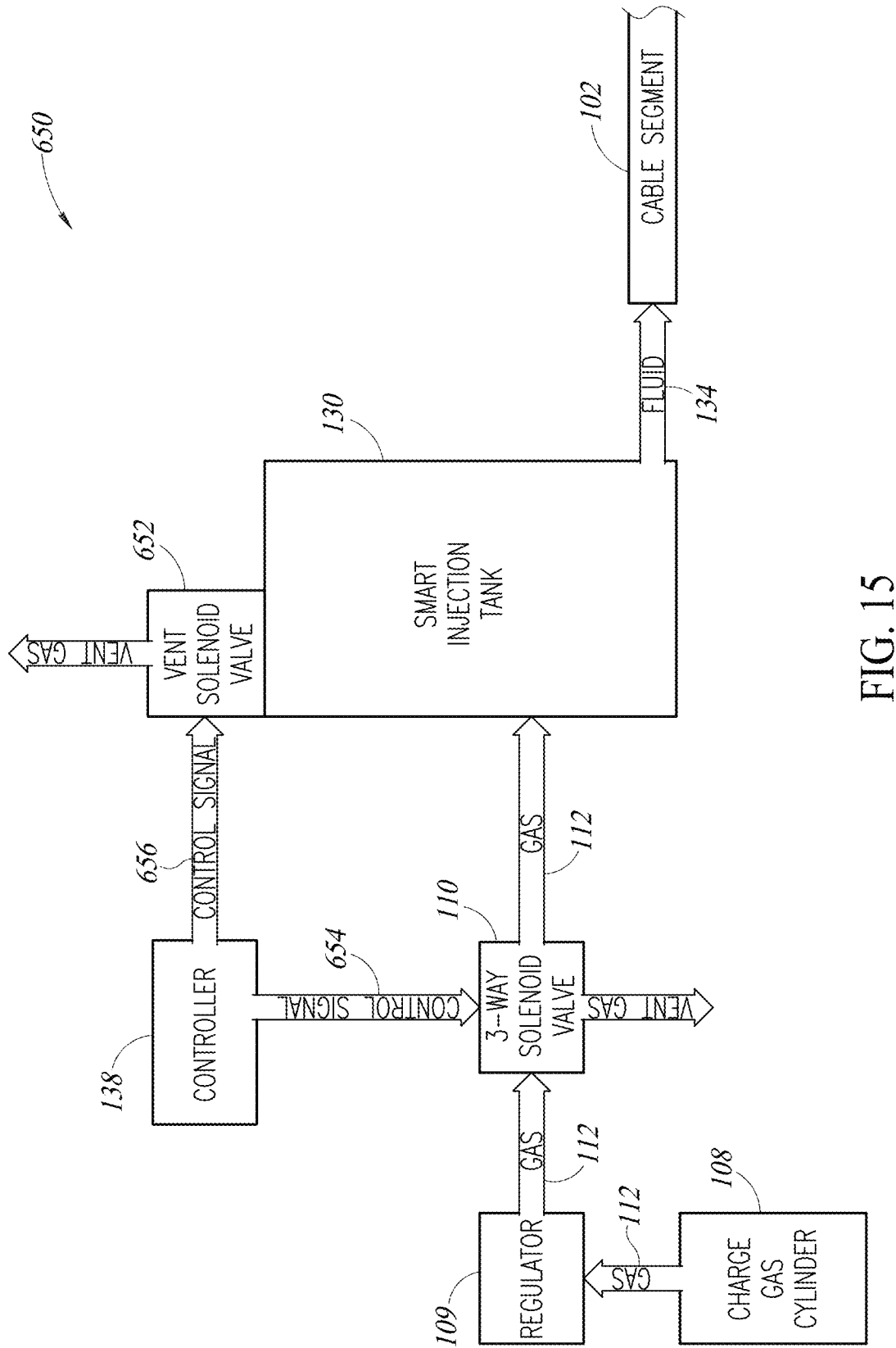
FIG. 15 is a block diagram of an embodiment of the smart injection tank of FIG. 2 that includes an emergency shutoff.

FIG. 15 illustrates an embodiment of the smart injection tank 130 that includes an emergency shutoff 650. In the embodiment illustrated in FIG. 15, the smart injection tank 130 is pressurized by the charge gas 112 provided by the charge gas cylinder 108 via the regulator 109 and the solenoid valve 110. The solenoid valve 110 may be implemented as a three-way solenoid valve. The emergency shutoff 650 may be used to stop the flow of the injection fluid 134 and/or relieve pressure from pressurized equipment, rendering it safe and halting the injection process. The emergency shutoff 650 may be connected to the controller 138, which is connected the sensor(s) of the sensor package 142 (see FIG. 2). The controller 138 may use sensor signals received from the sensor(s) to automatically actuate the emergency shutoff 650. Alternatively, the emergency shutoff 650 may be actuated manually. The emergency shutoff 650 may be actuated for a variety of reasons including one or more of the following reasons:

1. Equipment not positioned or attached correctly—For example, an accelerometer in the smart receiver tank 160 (e.g., configured as an iUPR receiver tank) may notify the controller 138 if the smart receiver tank 160 is not vertical, risking a malfunction of the float valve 186 (see FIG. 4). A flow rate sensor may be used to detect a higher than expected flow rate that may be indicative of a fluid leak due to a malfunction or incorrect attachment of the equipment to the cable segment 102.
2. Low fluid level—If the fluid level in the smart injection tank 130 is too low to complete the injection, the injection may be paused until more of the injection fluid 134 can be added rather than introducing the charge gas 112 to the cable segment 102, which would require the injection fluid 134 to be cleared and the process repeated from the start.
3. Manually—the injection could be paused based on a remote manual command for any reason.
4. High temperature—If the temperature in the transformer 104 (see FIG. 2) and/or the transformer 106 (see FIG. 2) rises above a threshold, the smart injection and/or receiver tanks 130 and 160 (e.g., implemented as iUPR tanks) may not be able to safely withstand the pressure, and the unusually high temperature may be indicative of a fire. In the case of a fire, pressurized equipment could pose a safety hazard to first responders.
5. Low temperature—Low temperature can negatively affect the injection by causing normally dissolved components of the injection fluid 134 to come out of solution, clog equipment, and provide less effective cable treatment. Cold temperatures have also been shown to cause leaks in some system seals. If the injection were paused until the equipment heated up to normal working temperatures, some of these risks can be mitigated.

Referring to FIG. 15, the emergency shutoff 650 may be implemented as two valves, the solenoid valve 110 (e.g., a L-port three-way valve) positioned between the regulator 109 and the smart injection tank 130 and a vent valve 652 attached to the smart injection tank 130. For example, the controller 138 may send a control signal 654 to the solenoid valve 110 that instructs the solenoid valve 110 to vent the charge gas 112 into the outside environment. The solenoid valve 110 can vent the contents of the compressed charge gas cylinder 108 into the outside environment through the regulator 109. Alternatively or additionally, the controller 138 may send a control signal 656 to the vent valve 652 that instructs the vent valve 652 to vent the charge gas 112 into the outside environment. The vent valve 652 can vent the charge gas 112 from inside the smart injection tank 130 to reduce the pressure within the smart injection tank 130. When the conditions are met to perform an emergency shutoff, one or both of the valves 110 and 652 are opened and one or both of the smart injection tank 130 and charge gas cylinder 108 are completely vented to atmosphere.

Alerts for Energized Tank

Referring to FIG. 2, one major risk to injection technicians (e.g., the injection technician 148) is exposure to injection equipment that has been energized by contact with primary or secondary conductors through a conductive path. Some components on the injection equipment are electrically conductive, so these components may present some additional hazard. The smart fluid injection system 100 may be configured to include an alarm or alert, which notifies the injection technician 148 by auditory, visual, or electronic means if the equipment has become energized and is above a threshold voltage, may improve worksite safety.

Notification of Minimum Approach Distance

OSHA has promulgated standards that specify a minimum approach distance that human workers (e.g., the injection technician 148) must be from energized equipment. These OSHA standards include a correction factor for altitudes above 3000 feet ("ft"), which increases the required minimum approach distance. Optionally, the smart injection tank 130, the smart receiving tank 160, and/or the server 146 of the smart fluid injection system 100 may be equipped with a means to determine altitude (e.g., using GPS location and a terrain database or a barometric altimeter), configured to automatically calculate the minimum approach distance, and configured to notify the injection technician 148 of the minimum approach distance (e.g., using short-range communication, described above).

Embodiment of Smart Receiver Tank

Figure 17:
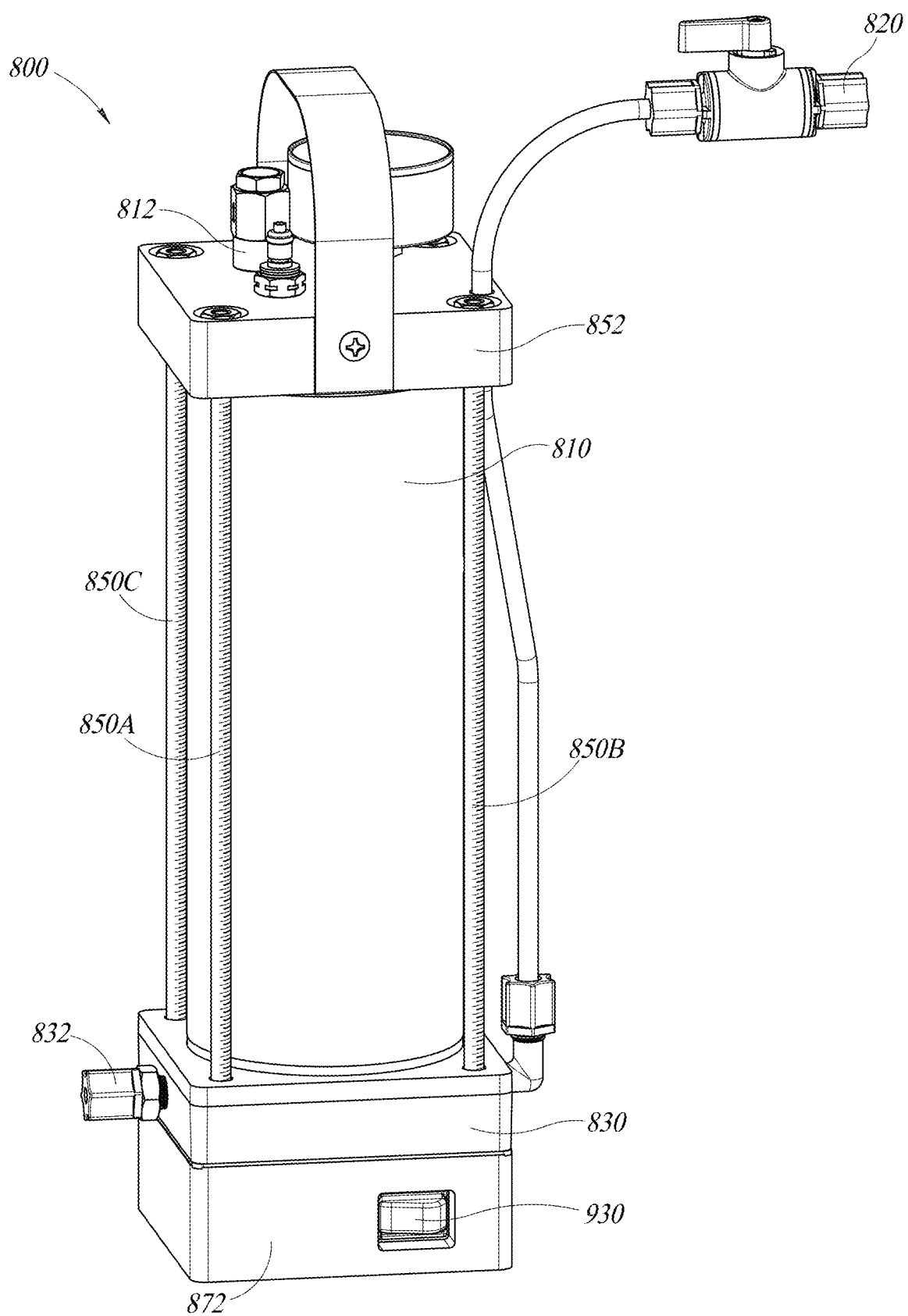
FIG. 17 is a perspective view of an embodiment of the smart receiver tank of FIG. 2.

FIG. 17 illustrates a smart receiver tank 800 that is an embodiment of the smart receiver tank 160 (see FIGS. 2, 4, 5, 7-11, 14, and 31). On the other hand, FIG. 16A illustrates the receiver tank 700, which may be used as the receiver tank in the setup of FIG. 1. For the purposes of clarity, the receiver tank 700 will be described as being an "original receiver tank" 700. The original receiver tank 700 is currently used to perform the injection process discussed above in the Background Section.

The original receiver tank 700 is placed at the second receiving end of the cable segment being rejuvenated and performs two major functions. First, the original receiver tank 700 increases the differential pressure across the cable segment by applying a vacuum to the second receiving end of the cable segment. An internal volume or vacuum portion 702 (see FIG. 16B) is defined inside an outer housing 710 of the original receiver tank 700 and is evacuated using a vacuum pump (not shown) before the injection is started. The vacuum pump is attached to a vacuum port 712.

Second, the original receiver tank 700 automatically stops fluid flow once the injection fluid has reached the original receiver tank 700. The injection fluid enters the original receiver tank 700 through a connection port 720, travels along a flow path 722 (see FIG. 16B), and enters the small fluid reservoir 724 (see FIG. 16B) inside the original receiver tank 700 through an aperture 726 (see FIG. 16B) that connects the flow path 722 and the fluid reservoir 724. Referring to FIG. 16B, in the embodiment illustrated, at least a portion of the flow path 722 travels through a base 730 of the original receiver tank 700. The injection fluid begins to fill the fluid reservoir 724, causing a float 734 to rise which closes a float valve 736 via a mechanical link 738, stopping fluid flow. Then, the original receiver tank 700 may be disconnected from the second injection termination (see FIG. 1) and recovered by an injection technician (not shown). Unfortunately, the injection technician must physically visit and observe the original receiver tank 700 to determine whether the injection fluid has reached the original receiver tank 700 and/or the float valve 736 is closed. This results in injection technicians repeatedly visiting receiver tanks, which may be located over large distances, to determine which have received the injection fluid and may be disconnected from the injection termination and used elsewhere.

The portion of the flow path 722 traveling through the base 730 may have an opening that may be plugged by a drain plug 732. Any injection fluid or other materials inside the fluid reservoir 724 may be drained therefrom through the opening when the drain plug 732 is removed.

Referring to FIG. 16A, the original receiver tank 700 includes threaded rods 750A-750D that fasten the major components of the original receiver tank 700 together. For example, the threaded rods 750A-750D couple the base 730 to a top plate 752 with the outer housing 710 being positioned between the base 730 and the top plate 752.

Referring to FIG. 17, the smart receiver tank 800 may be used in the setup of FIG. 1 instead and in place of the original receiver tank 700 (see FIG. 16A). Further, the smart receiver tank 800 may be a component of the smart fluid injection system 100 illustrated in FIG. 2 and the alternate embodiments of the smart fluid injection system described above, including the smart fluid injection systems 300, 400, 500, 530, 540, and 550 illustrated in FIGS. 5, 7, 8, 9, 10, and 11 respectively. Additionally, the smart receiver tank 800 may be configured to perform the methods described above as being performed by the smart receiver tank 160 (see FIGS. 2, 4, 5, 7-11, 14, and 31).

Figure 18:
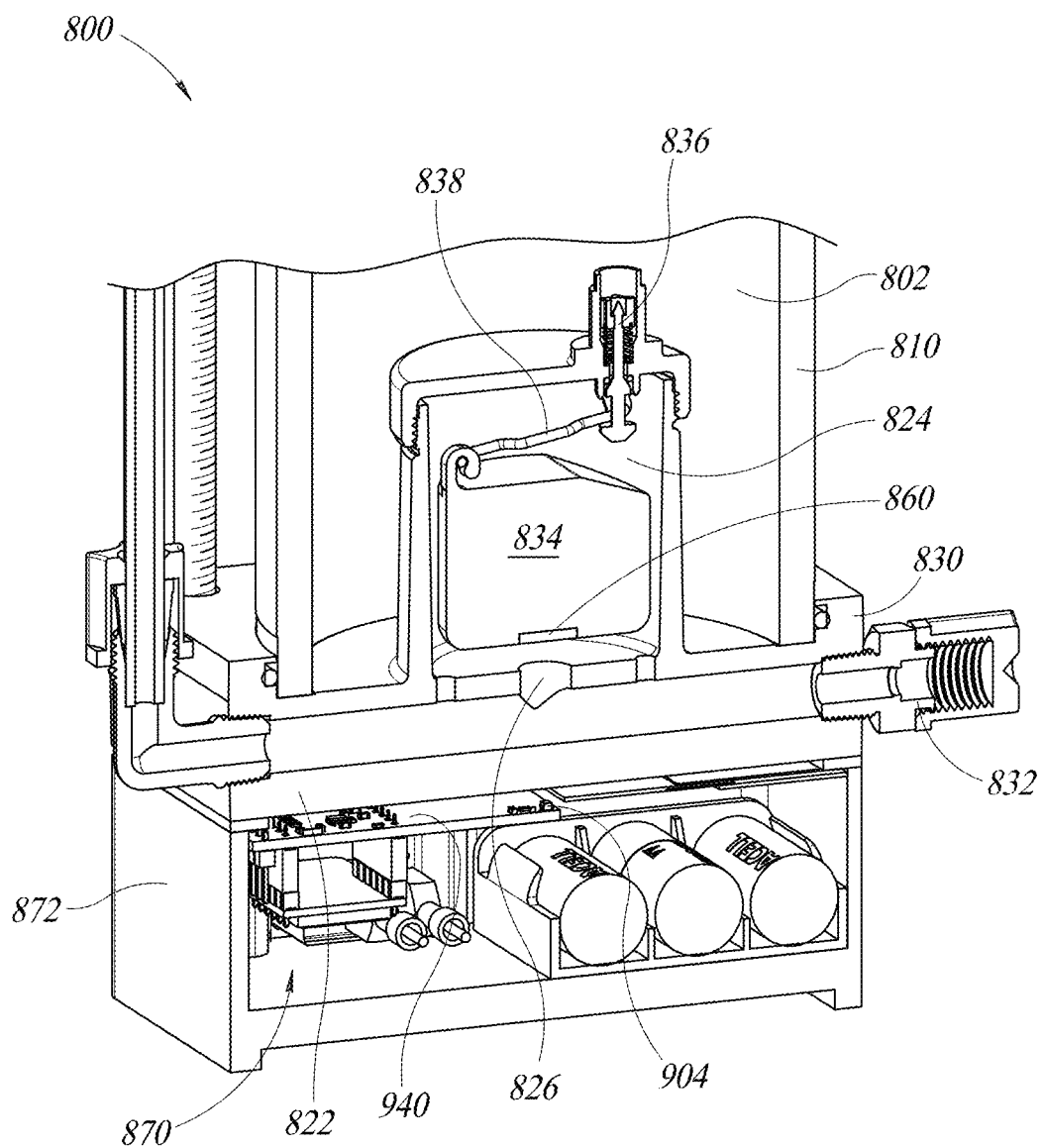
FIG. 18 is a cross-sectional view of the smart receiver tank of FIG. 17.

Referring to FIGS. 17 and 18, like the original receiver tank 700 (see FIGS. 16A and 16B), the smart receiver tank 800 includes an interior portion 802, an outer housing 810, an optional vacuum port 812, a connection port 820, a flow path 822, the fluid reservoir 824, an aperture 826, a base 830, a drain plug 832, a float 834, a float valve 836, a mechanical link 838, threaded rods 850A-850D, and a top plate 852. The components function in the same manner as their counterparts in the original receiver tank 700 (see FIGS. 16A and 16B). However, unlike the vacuum portion 702 (see FIG. 16B), the interior portion 802 is not necessarily under vacuum and embodiments in which the interior portion 802 has a higher internal pressure (e.g., atmospheric pressure) are within the scope of the present teachings. In embodiments in which the interior portion 802 is under vacuum, the interior portion 802 may be evacuated using a vacuum pump (not shown) before the injection is started. In such embodiments, the vacuum pump may be attached to the optional vacuum port 812. Together, the outer housing 810, the base 830, and the top plate 852 form a tank housing that defines the interior portion 802. The fluid reservoir 824 is positioned inside the interior portion 802.

Referring to FIG. 18, the smart receiver tank 800 also includes a permanent magnet 860 attached to the float 834, and (2) an electronics package 870. The permanent magnet 860 may be implemented as a small permanent magnet and may be attached to the bottom of the float 834. The electronics package 870 may be housed inside an enclosure 872 that is attached to the bottom of the base 830. By way of a non-limiting example, the base 830 may be constructed by a molding process. FIG. 22 is a simplified block diagram of the major electronic components included in the electronics package 870. Referring to FIG. 22, the electronics package 870 includes a controller 902, a Hall sensor 904, a communication module 906, a cellular modem 910, an analog to digital converter ("ADC") 914, and a voltage regulator 920. The electronics package 870 includes or is connected to the one or more batteries (e.g., a battery 922), one or more indicator light(s) 924, one or more light pipes 926 (see FIG. 21), an energy storage buffer 928 (e.g., a capacitor), and a power switch 930.

As mentioned above, referring to FIG. 18, the smart receiver tank 800 is an embodiment of the smart receiver tank 160 (see FIGS. 2, 4, 5, 7-11, 14, and 31). Referring to FIG. 2, the smart receiver tank 160 includes the fluid reservoir(s) 166, each instrumented with the controller 168, the actuator(s) 170, the sensor(s) 172, and the communication module 174. Referring to FIG. 18, the fluid reservoir 824 of the smart receiver tank 800 implements the fluid reservoir(s) 166 of the smart receiver tank 160 (see FIGS. 2, 4, 5, 7-11, 14, and 31). Additionally, the actuator(s) 170 of the smart receiver tank 160 is/are implemented in the smart receiver tank 800 as the float valve 836 or the combination of the float 834, the mechanical link 838, and the float valve 836 because the float valve 836 is actuated by the float 834 via the mechanical link 838 when the fluid reservoir 824 fills with the injection fluid 134 (see FIGS. 2, 4, 7-11, 14, and 15) that causes the float 834 to rise. Referring to FIG. 22, the controller 168 of the smart receiver tank 160 is implemented as the controller 902 in the smart receiver tank 800 and the sensor(s) 172 of the smart receiver tank 160 (see FIGS. 2, 4, 5, 7-11, 14, and 31) is/are implemented as the Hall sensor 904 in the smart receiver tank 800, and the communication module 174 of the smart receiver tank 160 is implemented as the communication module 906 in the smart receiver tank 800.

The electronics package 870 includes one or more fluid sensors. In the embodiment illustrated, the fluid sensor(s) is/are each implemented as a Hall Effect sensor (referred to as the Hall sensor 904). However, other types of sensors may be used. For example, a list of exemplary sensors that may be used at the smart receiver tank 160 is provided above and Table 1 lists other fluid sensing technologies that may also be used.

The cellular modem 910 is configured to communicate with the server 146 (see FIGS. 2, 5, 6, 23, and 31). In FIG. 22, the cellular modem 910 may be implemented as a LTE-M modem. Together, the cellular modem 910, ADC 914, and the controller 902 form the communication module 906. The ADC 914 receives sensor signals or output 916 from the Hall sensor 904. The ADC 914 converts the analog sensor output 916 received from the Hall sensor 904 to a digital signal 918 that may be processed by the controller 902.

As will be described below, the indicator light(s) 924 include a general indicator light 932 (see FIG. 21) and an optional power indicator light (not shown). While the smart receiver tank 800 may include multiple batteries, for ease of illustration, the smart receiver tank 800 will be described and illustrated as including the battery 922. In the embodiment illustrated, the voltage regulator 920 is connected between the battery 922 and the controller 902.

The smart receiver tank 800 may be implemented by modifying the original receiver tank 700 (see FIGS. 16A and 16B) to include the permanent magnet 860 attached to the float 834, and the electronics package 870. These modifications can be made to existing tanks, like the original receiver tank 700 (see FIGS. 16A and 16B), with new and/or used components.

State Diagram

Figure 22:
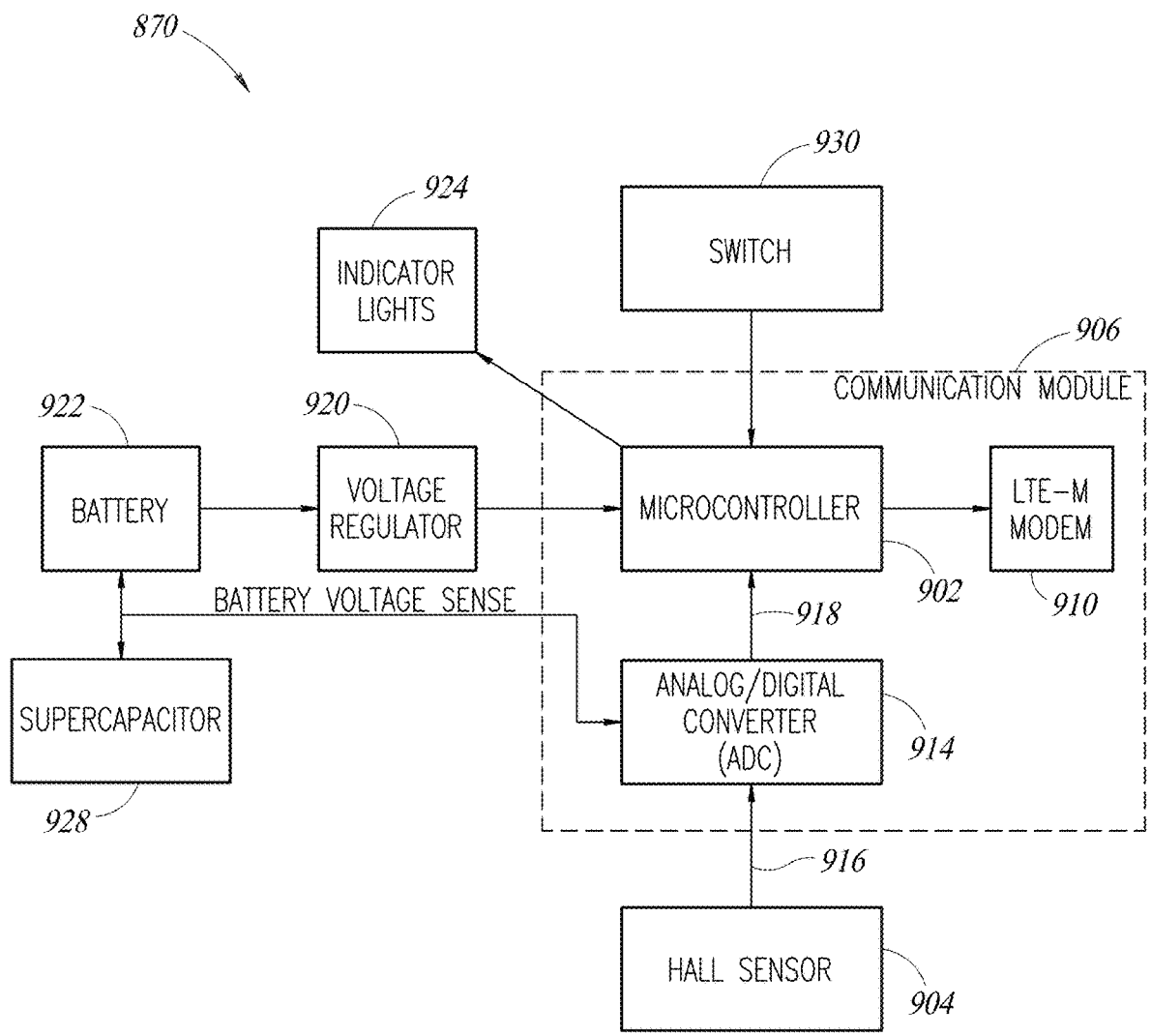
FIG. 22 is a block diagram of electronic components included in the electronics package of the smart receiver tank of FIG. 17.
Figure 23:
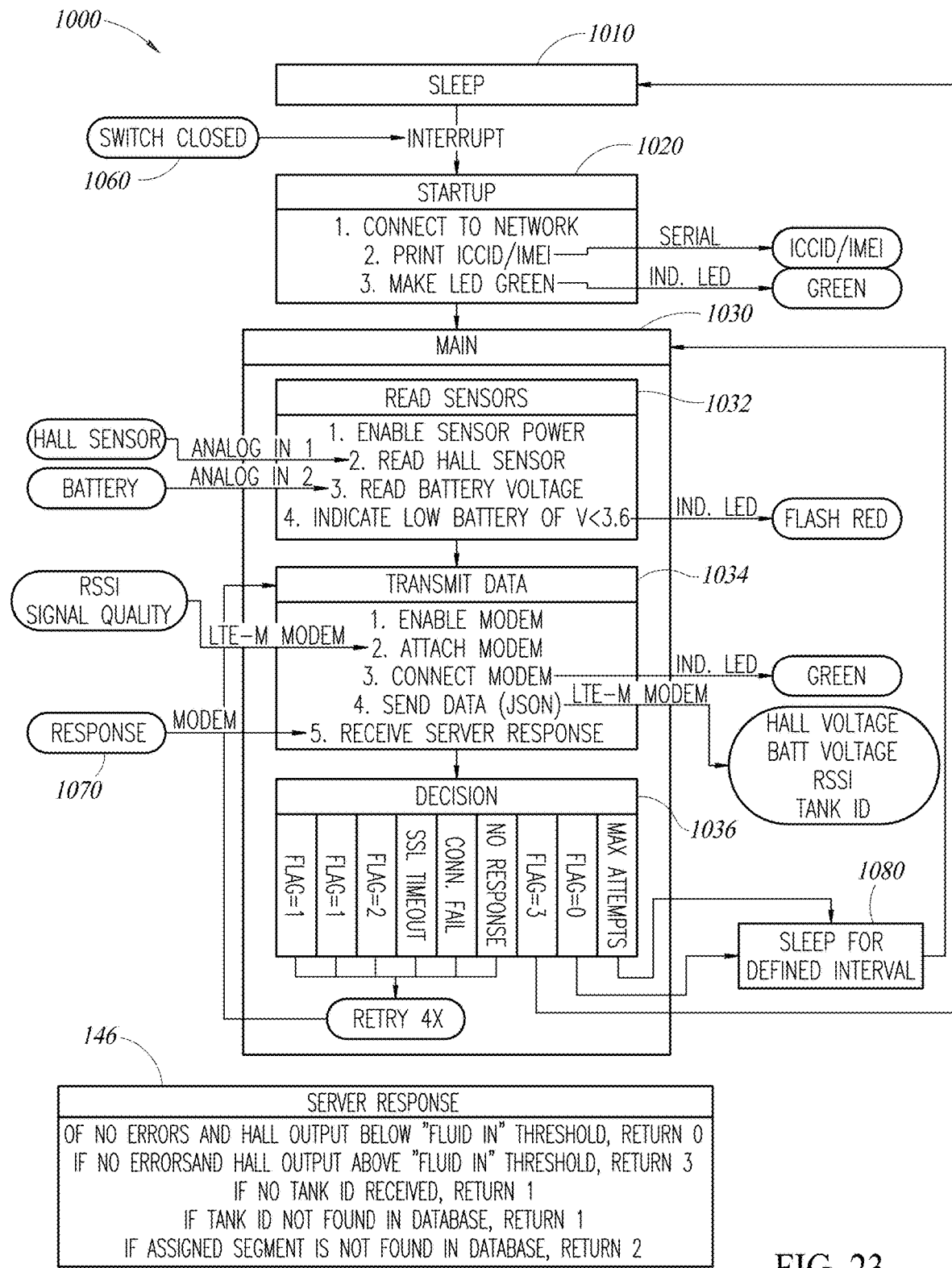
FIG. 23 is a state diagram showing a simplified map of inputs, outputs, decisions, and logic that takes place on a controller and within the firmware code of the smart receiver tank of FIG. 17.

Referring to FIG. 22, the electronics package 870 includes the controller 902 (e.g., a microcontroller) configured to execute firmware code. FIG. 23 is a state diagram 1000 showing a simplified map of inputs, outputs, decisions, and logic that takes place on the controller 902 (see FIG. 22) and within the firmware code. Referring to FIG. 23, the state diagram 1000 includes a sleep state 1010, a startup state 1020, and a main state 1030. The main state 1030 has three sub-states: a read sensors sub-state 1032, a transmit data sub-state 1034, and a decision sub-state 1036. The controller 902 (see FIG. 22) is configured to communicate with the external server 146.

The controller 902 (see FIG. 22) starts out in the sleep state 1010. At block 1060, a software switch is closed or turned on. By way of a non-limiting example, the software switch may be turned on when the power switch 930 (see FIG. 22) is turned on.

After the software switch is turned on, an interrupt is triggered in the controller 902 (see FIG. 22). Then, the controller 902 enters the startup state 1020. While in the startup state 1020, the controller 902 uses the cellular modem 910 (see FIG. 22) to connect to a cellular network (e.g., the network 122 illustrated in FIG. 2). The controller 902 may also change the general indicator light 932 (see FIG. 21) to a color (e.g., green) indicating that the cellular modem 910 (see FIG. 22) successfully connected to the cellular network.

Then, the controller 902 enters the main state 1030. When the controller 902 first enters the main state 1030, the controller 902 is in the read sensors sub-state 1032. While in the read sensors sub-state 1032, the controller 902 powers the Hall sensor 904 (see FIG. 22) and receives sensor output. The controller 902 may also obtain the voltage of one or more batteries (e.g., the battery 922 illustrated in FIG. 22) that power(s) the electronics package 870. The controller 902 may also change the general indicator light 932 (see FIG. 21) to a color (e.g., red) indicating that the voltage of the battery 922 (see FIGS. 22 and 27) is low when the controller 902 determines the voltage is below a voltage threshold value (e.g., 3.6 Volts). Optionally, the controller 902 may cause the general indicator light 932 (see FIG. 21) to flash when the voltage is below the voltage threshold value.

Next, the controller 902 enters the transmit data sub-state 1034. While in the transmit data sub-state 1034, the controller 902 transmits data, including the sensor output, to the server 146. The server 146 may be located remotely with respect the smart receiver tank 800. The server 146 receives the data and sends a response 1070 to the smart receiver tank 800. In the embodiment illustrated, the response 1070 includes a numerical value (identified as a "Flag" in FIG. 23). The response 1070 may indicate that the server 146 has determined that the injection fluid 134 (see FIGS. 2, 4, 7-11, 14, and 15) has not yet been received (e.g., Flag=0) by the smart receiver tank 800. Alternatively, the response 1070 may indicate that the server 146 has determined that the injection fluid 134 (see FIGS. 2, 4, 7-11, 14, and 15) has been received (e.g., Flag=3) by the smart receiver tank 800.

The smart receiver tank 800 receives the response 1070 and the controller 902 enters the decision sub-state 1036. In the decision sub-state 1036, the controller 902 makes a decision based on the response 1070. When the response 1070 indicates that the server 146 has determined that the injection fluid 134 (see FIGS. 2, 4, 7-11, 14, and 15) has not yet been received (e.g., Flag=0), the controller 902 decides to sleep for a predetermined interval (e.g., at block 1080). On the other hand, when the response 470 indicates that the external server computing device 450 has determined that the injection fluid has been received (e.g., Flag=3), the controller 902 decides to return to the sleep state 410.

When the server 146 determines that the injection fluid 134 (see FIGS. 2, 4, 7-11, 14, and 15) has been received, the server 146 sends a communication to a user (e.g., the injection technician 148 illustrated in FIGS. 2 and 5). Thus, the user need not physically visit the smart receiver tank 800 to determine that that the injection fluid 134 (see FIGS. 2, 4, 7-11, 14, and 15) has reached the smart receiver tank 800.

Figure 19:
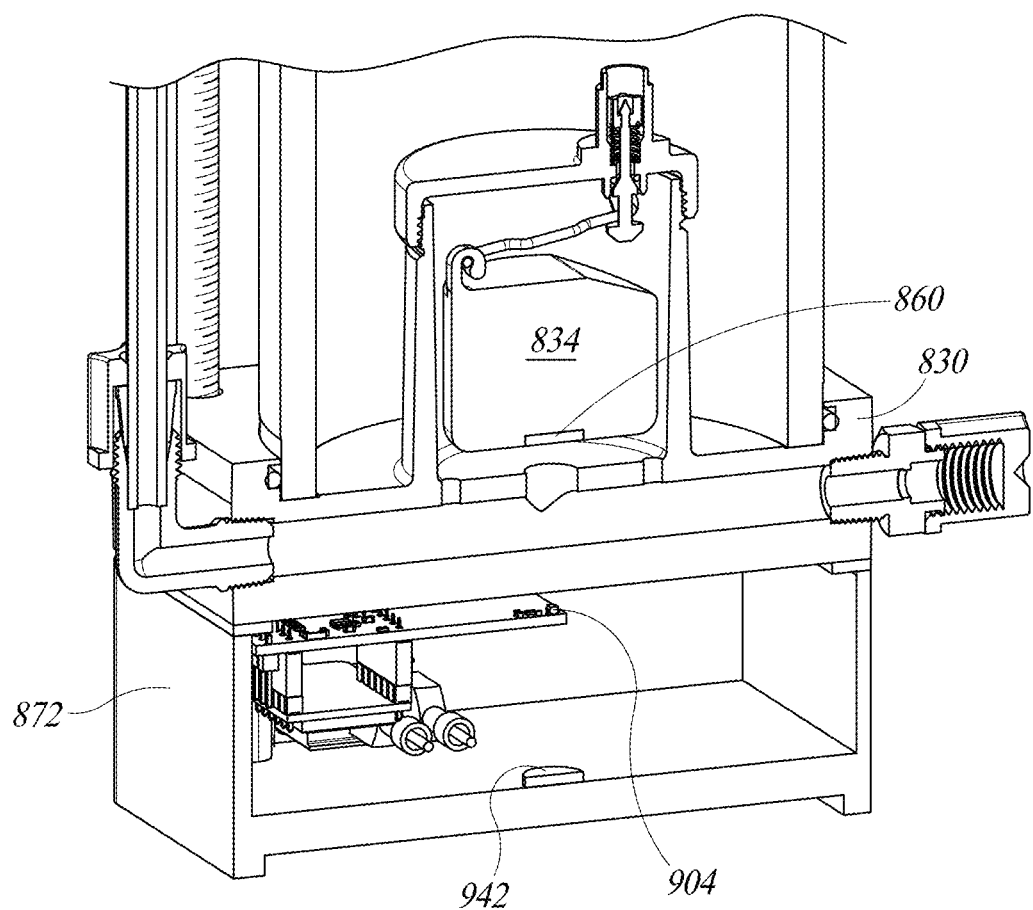
FIG. 19 is a cross-sectional view of an embodiment of the smart receiver tank of FIG. 17 that includes an auxiliary magnet.

In the embodiment illustrated in FIG. 18, the Hall sensor 904 uses the permanent magnet 860 mounted to the bottom of the float 834 connected to the float valve 836. The Hall sensor 904 may be implemented as a linear Hall effect sensor. The Hall sensor 904 is mounted to a printed circuit board ("PCB") 940 and positioned directly below and in-line with an axis of the permanent magnet 860 on the float 834. The sensor output 916 (see FIG. 22) of the Hall sensor 904 changes in proportion to the strength of the magnetic field that the Hall sensor 904 is experiencing, which changes based on the position of the float 834. The sensor output 916 (see FIG. 22) of the Hall sensor 904 is read using the ADC 914 (see FIG. 22). The strength and range of the magnetic field experienced by the Hall sensor 904 may be modulated using one or more of following three factors:

1. The geometry of the permanent magnet 860—magnets of larger diameter or thickness will generate stronger fields at an axial distance.
2. The composition of the permanent magnet 860— Neodymium magnets typically produce the strongest field, but other compositions such as ceramic or Samarium Cobalt can be used for thermal, cost, or manufacturing reasons.
3. The presence or absence of one or more auxiliary magnets—one or more additional or auxiliary magnets may be mounted in stationary locations relative to the permanent magnet 860 attached to the float 834. For example, referring to FIG. 19, an auxiliary magnet 942 can be mounted coaxially with the permanent magnet 860 on the opposite side of the Hall sensor 904 to enhance or oppose the field through the Hall sensor 904. Multiple float magnets could be arranged in a Halbach array or other configuration that enhances field strength on one side of the Halbach array while suppressing field strength on the other side of the Halbach array.

Referring to FIG. 18, the permanent magnet 860 may be implemented as an N42 grade magnet. During high temperature testing up to 75° C., it was discovered that the N42 grade magnet was strongly affected by the high temperature and experienced an irreversible loss of magnetism. Further, it was discovered that the geometry of the permanent magnet 860 affects its ability to withstand high temperatures. For example, the permanent magnet 860 may have a diameter of about ⅜ inches and a thickness of about 1/16 inches. While some N42 grade magnets with different geometries can withstand a temperature of 75° C., the magnet tested, which was an N42 grade magnet having a diameter of about ⅜ inches and a thickness of about 1/16 inches, could not.

To avoid these issues, the permanent magnet 860 may be implemented as an N42SH grade magnet that has a diameter of about ⅜ inches and a thickness of about 1/16 inches. The N42SH grade magnet has a composition that is able to withstand much higher temperatures, despite having the same geometry.

Other grade magnets (e.g., an N42 grade magnet) having a suitable geometry may be used to implement the permanent magnet 860. A permeance coefficient may be used to determine whether the permanent magnet 860 has a suitable geometry. The permeance coefficient is a geometric variable that describes how magnets with identical composition can behave differently when exposed to high temperatures. A magnet with a low permeance coefficient is typically short in the axis through which it is magnetized, and wide in perpendicular axes. Thus, a magnet that is a flat disk magnetized through its thickness will have a low permeance coefficient. On the other hand, a large permeance coefficient describes a magnet that is long in the axis through which the magnet is magnetized and short in the perpendicular axes. Thus, a magnet that is a long rod magnetized through its length will have a large permeance coefficient. Therefore, any magnet that does not permanently lose its magnetism at high temperatures (e.g., 75° C.) has a suitable combination of permanence coefficient, from its geometry, and composition may be used to implement the permanent magnet 260'. While all magnets having a diameter of about ⅜ inches and a thickness of about 1/16 inches will have the same permanence coefficient, the permanence coefficient is only one of the two factors that affect the ability of the magnet to withstand high temperatures, the other factor being the composition of the magnet.

By way of non-limiting examples, an N42SH grade magnet that has a diameter of about ⅜ inches and a thickness of about 1/16 inches has a satisfactory combination of a sufficiently large permeance coefficient and a suitable composition to withstand temperatures of 75° C., while an N42 grade magnet with the same geometry does not.

Enclosure

Referring to FIG. 17, the enclosure 872 is illustrated attached to the bottom of the base 830. The embodiment of the power switch 930 depicted in FIG. 18 may be operated manually by a user (e.g., the injection technician 148 illustrated in FIGS. 2 and 5).

Figure 20:
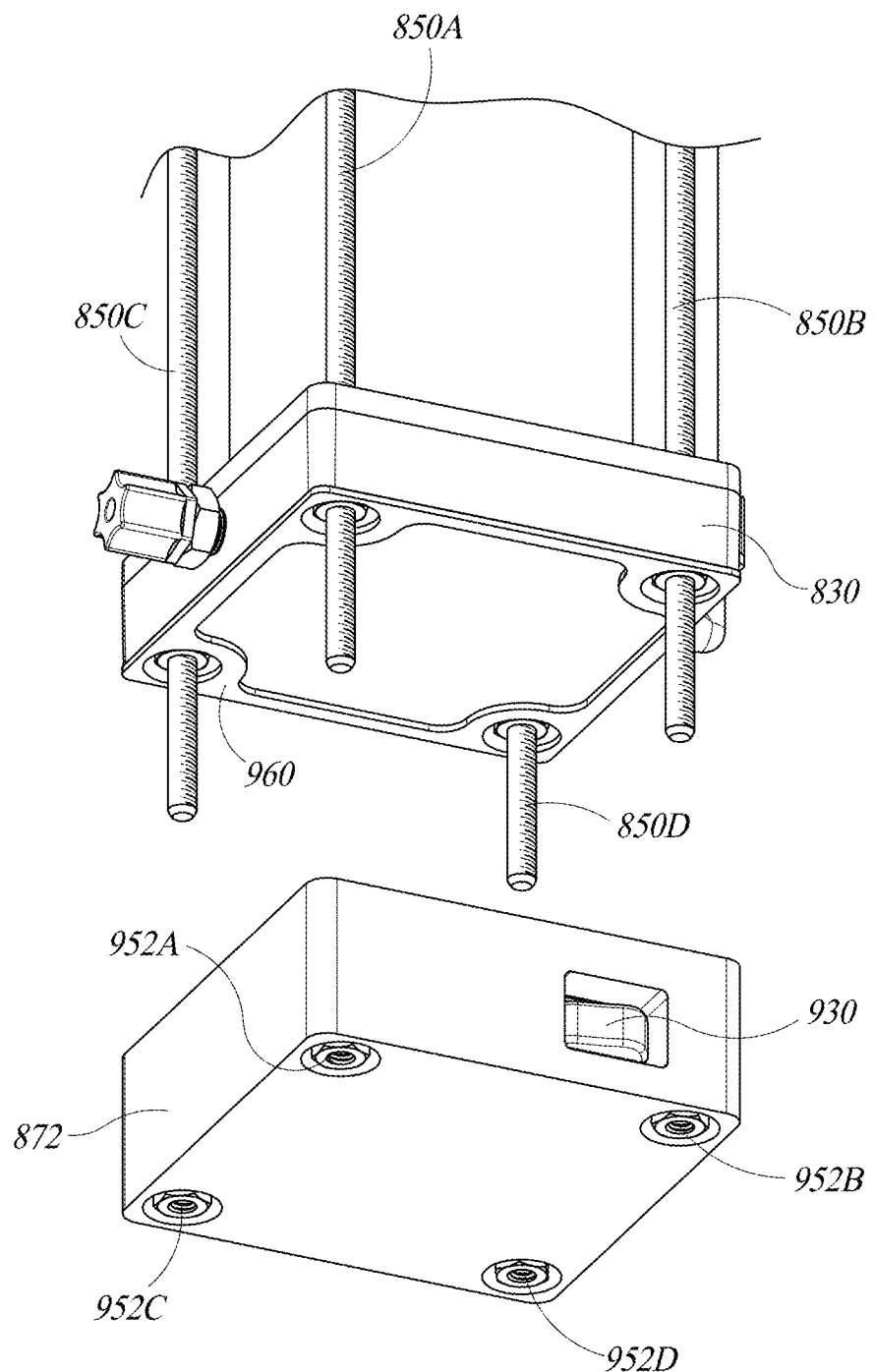
FIG. 20 is a partially exploded perspective view of a bottom of the smart receiver tank of FIG. 17.

Referring to FIG. 20, the enclosure 872 is intended to protect its contents (e.g., the electronics package 870) from moisture, dirt, and fluid contact. The threaded rods 850A-850D may extend downwardly beyond the base 830 and each be received inside a different through-hole 950 (see FIG. 21) formed in the enclosure 872. Threaded nuts 952A-952D may be threaded onto the ends of the threaded rods 250A'-250D', respectively, after they are received inside the through-holes 950 (see FIG. 21). The threaded nuts 952A-952D couple the enclosure 872 to the threaded rods 850A-850D, respectively, which extend through the base 830. Thus, the threaded rods 850A-850D may be used to fasten the enclosure 872 to the base 830. A gasket 960 may be compressed between the base 830 and the enclosure 872 to form a fluid tight seal therebetween.

The enclosure 872 may be configured to match the footprint of the base 730 (see FIGS. 16A and 16B) of the original receiver tank 700 (see FIG. 16A) allowing the enclosure 872 to be attached or retrofitted to the original receiver tank 700. In such embodiments, the threaded rods 750A-750D used to fasten the major components of the original receiver tank 700 may be replaced with longer threaded rods (like the threaded rods 850A-850D) that are used to fasten the enclosure 872 to the base 730 and create a fluid tight seal by compressing the gasket 960 (see FIG. 20) therebetween.

Figure 21:
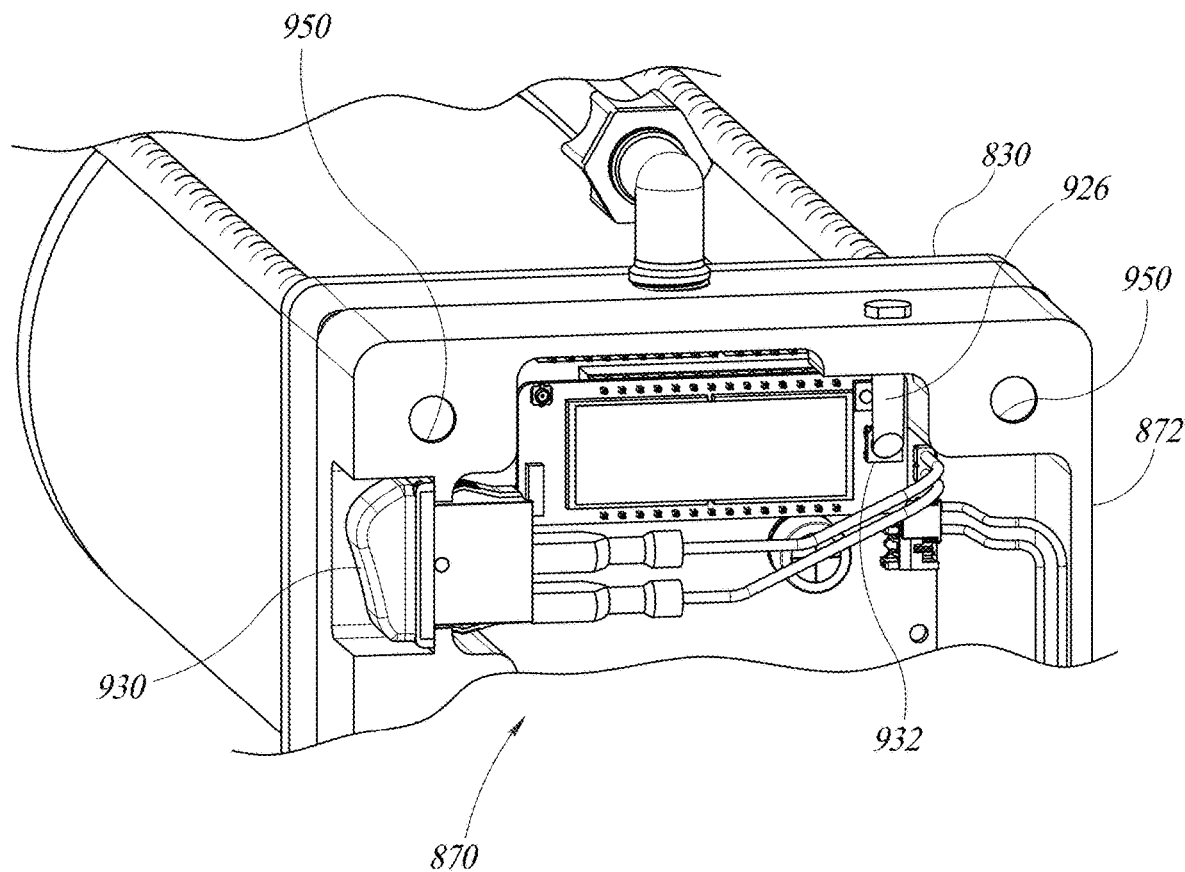
FIG. 21 is a cross-sectional view taken laterally through an enclosure of the smart receiver tank of FIG. 17 configured to house an electronics package.

Referring to FIG. 21, the enclosure 872 may be opaque and/or have opaque walls. In such embodiments, the transparent light pipe(s) 926 make(s) the indicator light(s) 924 (see FIG. 22) visible through the walls of the enclosure 872. The enclosure 872 may be constructed from high-density polyethylene ("HDPE"), which is compatible with cable rejuvenation fluids, is non-conductive to avoid the risk of generating a short when working around energized equipment, and has the appropriate mechanical properties such as durability, dimensional stability, and machinability. Other materials that may be used to construct the enclosure 872 include one or more of the following:

Polypropylene;
Acetal;
Ultra-high-molecular-weight polyethylene ("UHMWPE");
Nylon;
Polyethylene terephthalate ("PET");
Polyurethane;
Acrylic; and
Polyvinyl chloride ("PVC").

Software Switch

At block 1060 of FIG. 23, the software switch closes, which triggers the interrupt on the controller 902 (see FIG. 22). This provides flexibility since the response to the interrupt by the controller 902 is controlled by device firmware, which is configurable. In the embodiment illustrated in FIG. 23, the software switch triggers the interrupt on the controller 902 so that the controller 902 can be woken from the sleep state 1010, which may be a low power state. While the software switch has been described as being a software switch, other types of switches may be used. The software switch may also control power flowing to one or more of the components of the electronics package 870.

Referring to FIG. 22, the software switch includes the physical power switch 930, which is connected to an input pin (not shown) on the controller 902. When the power switch 930 is turned on by the injection technician 148 (see FIGS. 2 and 5), the power switch 930 triggers an interrupt on the controller 902 that wakes it from sleep and enters the program. It is referred to as a software switch because it acts via an input on the controller 902. Thus, the software switch could be configured to have multiple functions, rather than switching power directly.

Gasket

Referring to FIG. 20, the gasket 960 creates a seal between the enclosure 872 and the base 830 to prevent ingress of dust, spilled injection fluid, or moisture into the enclosure 872 where such materials could damage the electronics package 870 (see FIGS. 18, 21, 22, 27, and 28). The gasket 960 is soft and conformable so that it seals well to an uneven, scratched, or dirty surface. The gasket 960 may be constructed from one or more of the following materials:

Vinyl foam;
PVC foam;
Ethylene propylene diene monomer ("EPDM") rubber;
Polyethylene;
Polypropylene;
Nylon;
Fluorinated ethylene propylene ("FEP");
Ethylene propylene rubber ("EPR");
Butyl rubber;
Nitrile rubber (also referred to as Buna-N);
Neoprene (also referred to as polychloroprene or pc-rubber);
FKM (e.g., Viton); and
Silicone rubber.

Indicator Lights

As mentioned above, referring to FIG. 21, the enclosure 872 may be opaque and/or have opaque walls. The light pipe(s) 926 are each made from an optically clear material and are each positioned adjacent one of the indicator light(s)

924. The light pipe(s) 926 may include a different light pipe for the general indicator light 932 and the optional power indicator light (not shown). Each of the light pipe(s) 926 conducts the light generated by one of the indicator light(s) 924 outside the enclosure 872. Thus, this light is visible through the opaque enclosure 872 while the enclosure 872 maintains an environmental seal with the base 830.

The optional power indicator light (not shown) may be controlled by the power switch 930 and may be driven by an independent low power flashing circuit. The optional power indicator light (not shown) indicates when the electronics package 870 is powered on. The general indicator light 932 may be implemented as an RGB LED and is configured to indicate the state of the cellular connection with the server 146 (see FIGS. 2, 5, 6, 23, and 31) and the state of charge of the battery 922 (see FIGS. 22 and 27).

Energy Storage Buffer

Referring to FIG. 22, the energy storage buffer 928 may be placed in parallel with the battery 922 and sized such that the energy storage buffer 928 will supplement the current supplied from the battery 922. As shown in FIG. 22, the energy storage buffer 928 may be implemented as a capacitor, a supercapacitor, and the like. A supercapacitor is a high-capacity capacitor with a capacitance value much higher than other capacitors but with lower voltage limits. Supercapacitors are typically used in applications requiring repeated rapid charge/discharge cycles. A supercapacitor typically uses a liquid electrolyte and often stores energy using a combination of electrostatic and chemical energy storage. Thus, a supercapacitor may share characteristics with both a typical capacitor and a typical battery. However, a supercapacitor may be configured to achieve a volumetric energy density and/or a specific energy about 100 times that of typical capacitors. Specific energy is an amount of energy that can be stored in the capacitor divided by the mass of the capacitor and volumetric energy density is amount of energy can be stored in a capacitor divided by the volume of the capacitor. By way of a non-limiting example, the energy storage buffer 928 may be implemented as a supercapacitor having a specific energy of 1 Wh/kg. By way of a non-limiting example, the energy storage buffer 928 may be implemented as an electrochemical, double-layer, series-connected SuperCapacitor module (e.g., having a specific energy of 1 Wh/kg).

Figure 24:
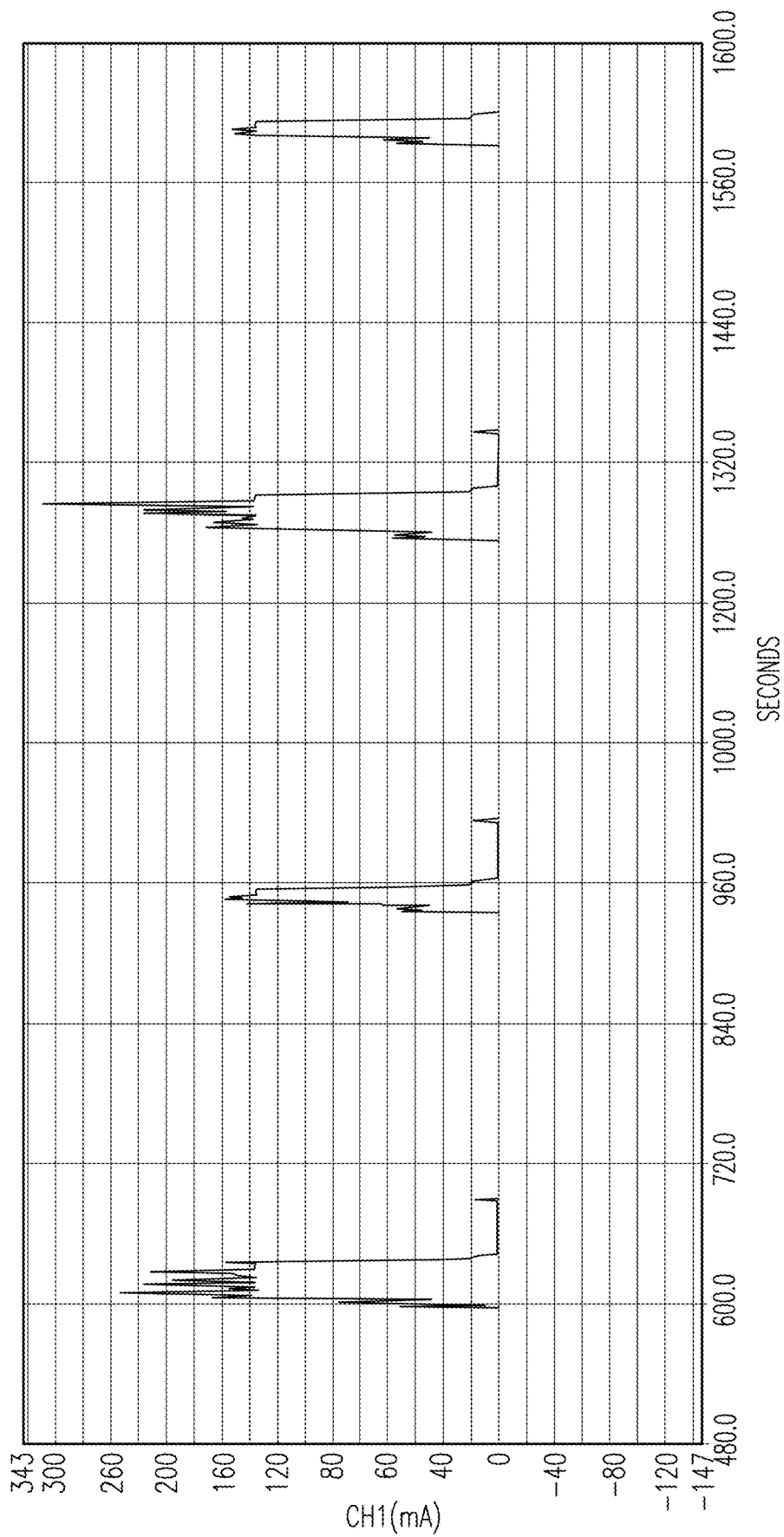
FIG. 24 is a graph of power used during four different transmissions by a cellular modem that is included in the electronics package of the smart receiver tank of FIG. 17.

As the battery 922 becomes depleted, its internal resistance increases and its ability to source current decreases even as the cell voltage remains above the minimum for the power regulation circuitry (e.g., the voltage regulator 920). The cellular modem 910 requires a minimum current (e.g., up to 340 mA) for a short period during transmission, so the battery 922 could be depleted to a lower state of charge that would not provide the minimum current to the cellular modem 910 during transmission. A properly sized capacitor is able to supply the full charge required for a typical transmission while only dropping the voltage by a fraction of a volt, but even smaller capacitors will help by reducing the peak current draw demanded of the battery 922. In other words, the energy storage buffer 928 (e.g., a capacitor) is configured to provide current to the cellular modem 910 during transmission when the battery 922 is low. FIG. 24 depicts power used by the cellular modem 910 (see FIG. 22) during four different transmissions. In FIG. 24, the cellular modem 910 is drawing approximately 180 mA for around 40 seconds, or about 7.2 coulombs of charge. This means that a 15 Farad capacitor is able to supply all of the charge needed for the transmission while dropping the voltage by only 0.5 volts. Thus, in this example, the energy storage buffer 928 (e.g., capacitor) may be implemented as a 15 Farad capacitor. The energy storage buffer 928 can be slowly charged by the battery 922 during the long sleep period between transmissions.

Antenna Placement

Figure 25:
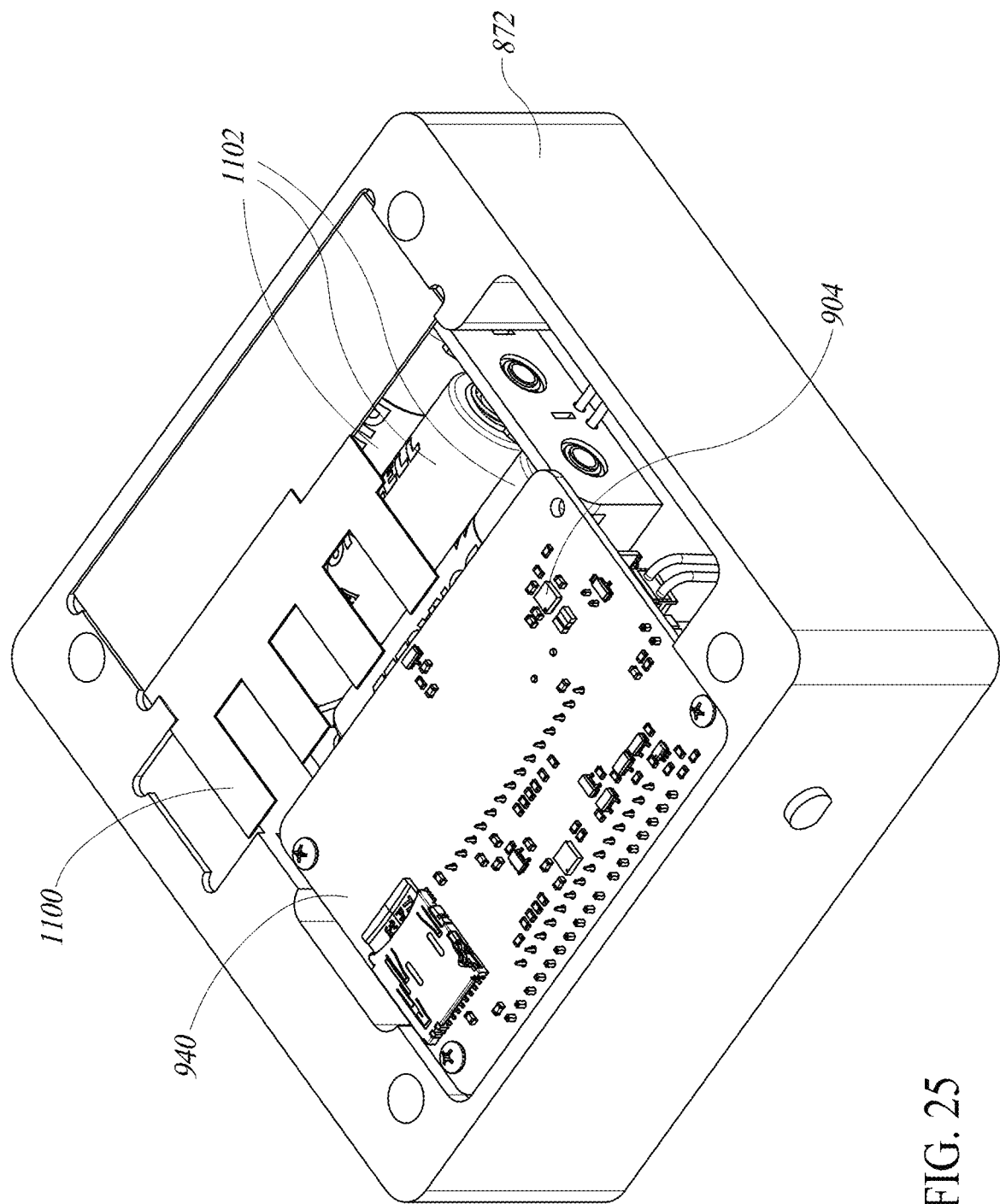
FIG. 25 is a perspective view of the enclosure of the smart receiver tank of FIG. 17 with an antenna positioned above batteries in a first orientation.
Figure 26:
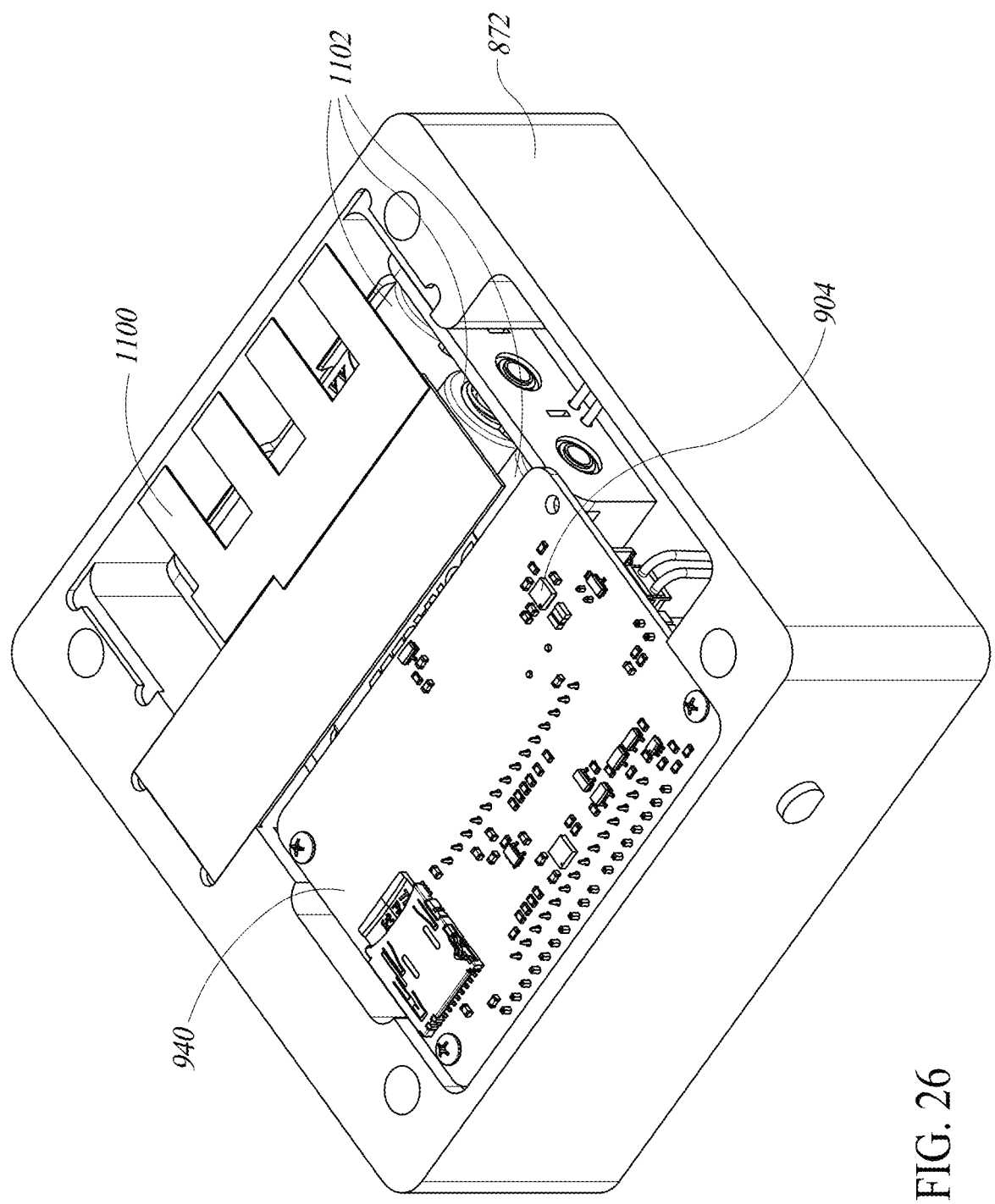
FIG. 26 is a perspective view of the enclosure of the smart receiver tank of FIG. 17 with the antenna positioned above the batteries in a second orientation.

FIGS. 25 and 26 depict two example placements of an antenna 1100 in the smart receiver tank 800 (see FIGS. 17, 18, 27, and 28). The antenna 1100 may be an implementation of the LoRa antenna 157B (see FIG. 3) and/or the cellular antenna 158B (see FIG. 3). The physical placement of the antenna 1100 has a significant influence on the strength and quality of a connection, such the connections made over links B and C of FIG. 5. Referring to FIGS. 25 and 26, antenna placement is physically constrained by the practical size of the electronics enclosure 872, which is intended to have the same footprint as the base 830 (see FIGS. 17-21, 27, and 28). The antenna placements shown in FIGS. 25 and 26 have demonstrated through testing to perform similarly to an antenna that is unobstructed in free space. In particular, the placement of the antenna 1100 on top of the battery 922 (see FIGS. 22 and 27) may provide satisfactory performance. In FIGS. 25 and 26, the battery 922 has been implemented as batteries 1102. In FIGS. 25 and 26 in addition to being placed above the battery 922, the antenna 1100 is also positioned alongside and in a coplanar orientation with the PCB 940. Other antenna placement locations, such as under the battery 922 (see FIGS. 22 and 27) or under the PCB 940 may exhibit reduced performance due to attenuation from other components in the electronics enclosure 872, such as the PCB 940 or one or more batteries 1102. Other antenna placement options are possible, but may be less preferable due to mechanical or practical difficulties.

Embodiment of Smart Receiver Tank: Internal Mounted on Top

Figure 27:
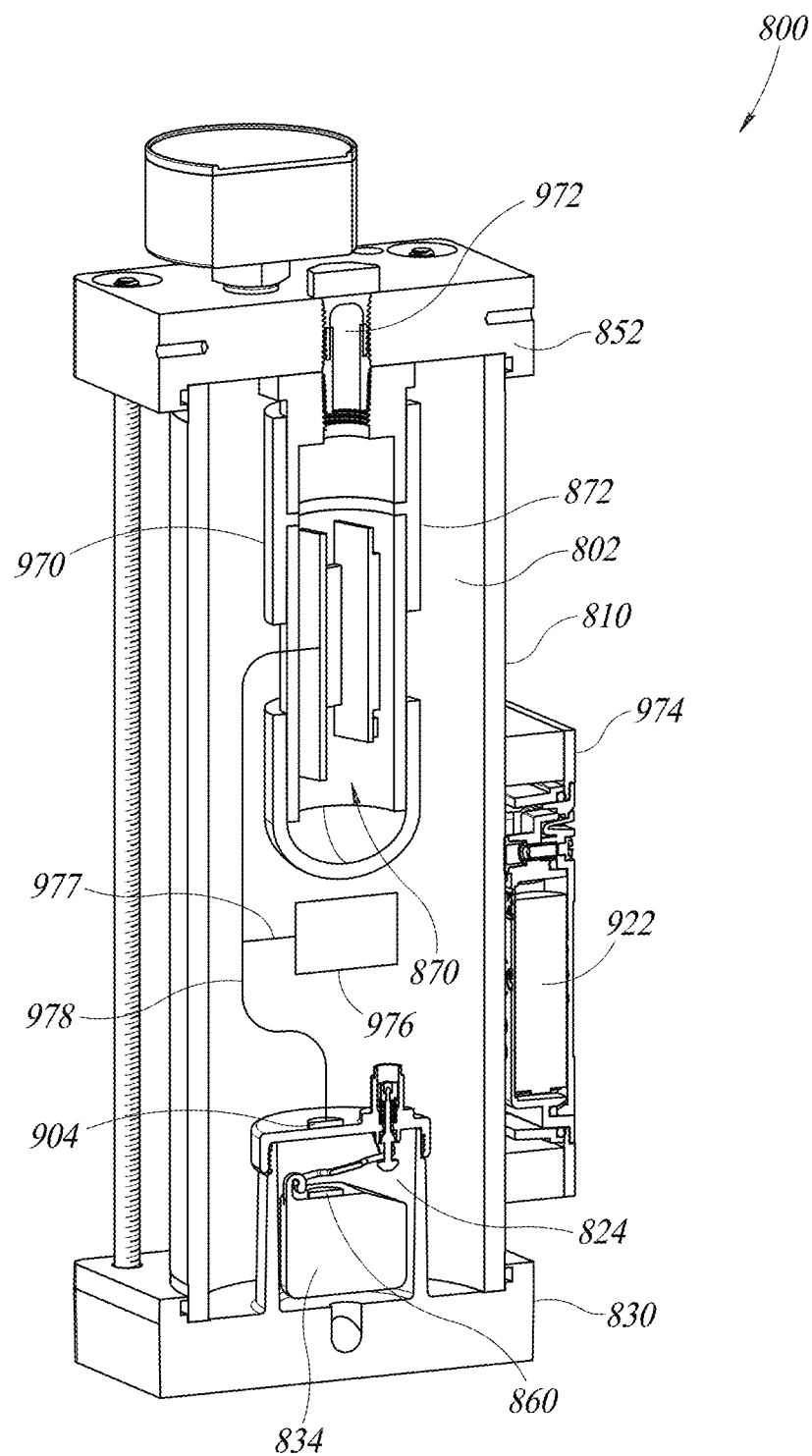
FIG. 27 is a cross-sectional view of an alternate embodiment of a smart receiver tank.

FIG. 27 illustrates an alternate embodiment of the smart receiver tank 800. For the sake of brevity, only components of this embodiment that differ from those of the embodiment illustrated in FIGS. 17 and 18 and described above will be described in detail with respect to the embodiment illustrated in FIG. 27. In this embodiment, the enclosure 872 is mounted to the top plate 852 of the smart receiver tank 800 and houses the electronics package 870. The enclosure 872 may be implemented as a pipe 970 with standard fittings. The enclosure 872 extends into the interior portion 802 defined by the outer housing 810 of the smart receiver tank 800. The enclosure 872 offers some protection from any fluid that may enter the interior portion 802 of the smart receiver tank 800. The embodiment illustrated includes a pass-through 972 and an external battery pack 974. The pass-through 972 allows the external battery pack 974 to be connected (e.g., by one or more wires) to the electronics package 870. The battery 922 is positioned inside the external battery pack 974 and connected (e.g., by the one or more wires) to the controller 902 as illustrated in FIG. 22. The voltage regulator 920 (see FIG. 22) may be positioned in the enclosure 872 or the external battery pack 974.

A barometer 976 (also illustrated in FIG. 4 as the barometer 184) that measures the internal pressure (e.g., vacuum) inside the interior portion 802 of the smart receiver tank 800 may be installed in the interior portion 802 and connected (e.g., wirelessly or by one or more wires 977) to the electronics package 870 inside the enclosure 872.

In this embodiment, the permanent magnet 860 may be mounted on a top side of the float 834 and the Hall sensor 904 may be mounted on a top outside surface of the fluid reservoir 824. The Hall sensor 904 may be connected to the ADC 914 (see FIG. 22) wirelessly or by one or more wires 978.

Alternate Embodiment of Smart Receiver Tank: Internal Bulkhead

Figure 28:
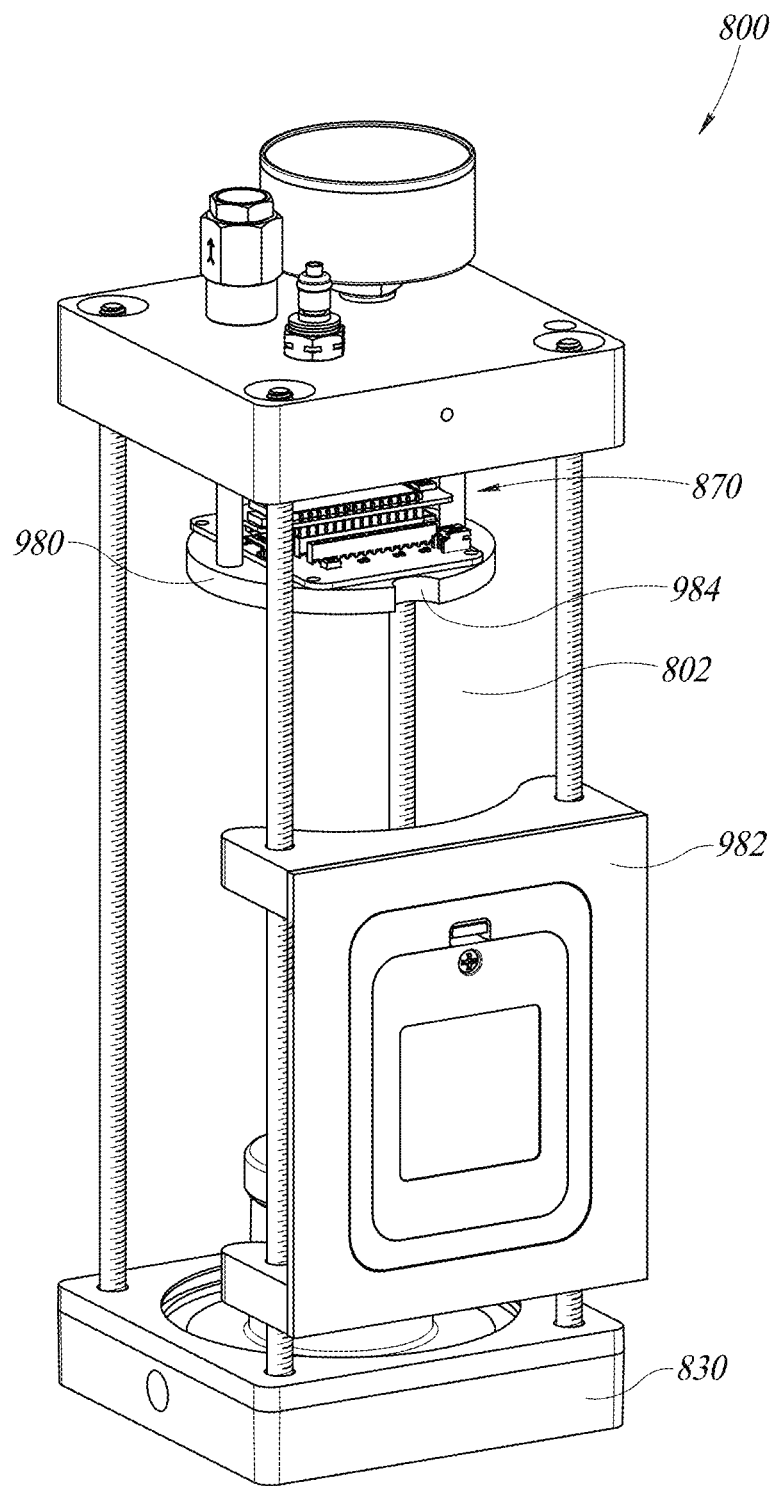
FIG. 28 is a cross-sectional view of another alternate embodiment of a smart receiver tank.

FIG. 28 illustrates an alternate embodiment of the smart receiver tank 800. For the sake of brevity, only components of this embodiment that differ from those of the embodiment illustrated in FIGS. 17 and 18 and described above will be described in detail with respect to the embodiment illustrated in FIG. 28. The outer housing 810 has been omitted from FIG. 28 to provide a better view of a bulkhead 980 that may have a circular or disk-like shape. In this embodiment, the electronics package 870 is attached to the bulkhead 980, which is mounted inside the interior portion 802 of the smart receiver tank 800. The bulkhead 980 provides a robust mounting point and reduces the chances of stray injection fluid contacting the electronics package 870. A periphery of the bulkhead 980 may have a shape that corresponds to an inner shape defined by an inner surface of the outer housing 810 (see FIGS. 17, 18, 27, and 28). The bulkhead 980 may include one or more apertures (e.g., slots, notches, and the like) or through-holes 984 configured to allow pressure to equalize across the bulkhead 980. In such embodiments, a barometer (like the barometer 976 illustrated in FIG. 27) may be easily included in the electronics package 870. The barometer may be used to estimate the injection time or injection duration. The bulkhead 980 may provide at least partial protection for the electronics package 870 from the injection fluid 134.

The battery 922 (see FIGS. 22 and 27) may be mounted externally so that the battery 922 can be replaced, and a pass-through, like the pass-through 972 (see FIG. 27), may be used to route power wires between the electronics package 870 and the battery 922. In FIG. 28, the battery 922 (see FIGS. 22 and 27) is positioned inside an external battery pack 982 substantially identical to the external battery pack 974 (see FIG. 27). The battery 922 (see FIGS. 22 and 27) is connected (e.g., by one or more wires) to the controller 902 as illustrated in FIG. 22. The voltage regulator 920 (see FIG. 22) may be positioned in the external battery pack 982.

A barometer (like the barometer 976 illustrated in FIG. 27) that measures the internal pressure inside the interior portion 802 of the smart receiver tank 800 may be installed in the interior portion 802 and connected (e.g., wirelessly or by one or more wires) to the electronics package 870.

Like in the embodiment illustrate in FIG. 27, the permanent magnet 860 may be mounted on the top side of the float 834 and the Hall sensor 904 may be mounted on the top outside surface of the fluid reservoir 824. The Hall sensor 904 may be connected to the ADC 914 (see FIG. 22) wirelessly or by one or more wires 978.

Cellular Connection Strategy

As illustrated in FIG. 3, the communication module 144 of the smart injection tank 130 (see FIGS. 2, 5, 7-11, 14, and 15) may use a cellular modem (e.g., the cellular modem 159) intended for IoT applications to communicate with a cellular network (e.g., the network 122 illustrated in FIG. 2). Referring to FIG. 5, the cellular modem component of the smart injection tank 130 goes through a series of steps to connect to the cellular network and to the remote server 146, which receives data from the smart injection tank 130. For example, the smart injection tank 130 may perform the following connection process, which allows the smart injection tank 130 to communicate with the server 146 via the cellular network:

1. The microcontroller 150 (see FIG. 3) of the smart injection tank 130 collects data from device sensors (e.g., in the sensor package 142 illustrated in FIGS. 2 and 3);
2. The smart injection tank 130 enables the cellular modem 159 (see FIG. 3);
3. The cellular modem attaches to the cellular network and receives network metrics, such as a Received Signal Strength Indicator ("RSSI");
4. The cellular modem connects to the cellular network;
5. The microcontroller 150 commands the cellular modem to send data using Hypertext Transfer Protocol ("HTTP") and Secure Sockets Layer ("SSL") to the remote server 146;
6. The server 146 sends a response to the smart injection tank 130 based on the data received from the smart injection tank 130; and
7. The microcontroller 150 of the smart injection tank 130 acts on the response received from the remote server 146.

The steps above may be grouped into three portions: attach, connect, and transmit. The attach portion (referred to below as an "attach step") includes steps 2 and 3 of the connection process above. The connect portion includes step 4 of the connection process above. The transmit portion includes step 5 of the connection process above. Some of the steps are associated with timeout delays. For example, the attach step may be associated with an attach timeout delay that specifies a maximum amount of time that may elapse from the beginning of step 2 to the smart injection tank 130 receiving the network metric(s) (e.g., the RSSI) in step 3. If the attach timeout delay elapses before the network metric(s) is/are received, the connection process fails. Another example of a timeout delay includes a server response timeout delay that specifies a maximum amount of time that may elapse between when the smart injection tank 130 sends the data to the remote server 146 (at the end of step 5) and when the smart injection tank 130 receives the response from the remote server 146 (in step 7). If the server response timeout delay elapses before the response is received from the remote server 146, the connection process fails.

In most urban and suburban locations, the above connection process works as expected, but it has been observed through field testing that the connection process can be hampered by poor quality and/or strength of the cellular signal. The RSSI is an available measurement of signal strength, but there is currently no way to measure signal quality, which is sometimes not related to signal strength but can affect the reliability of a transmission.

Figure 29:
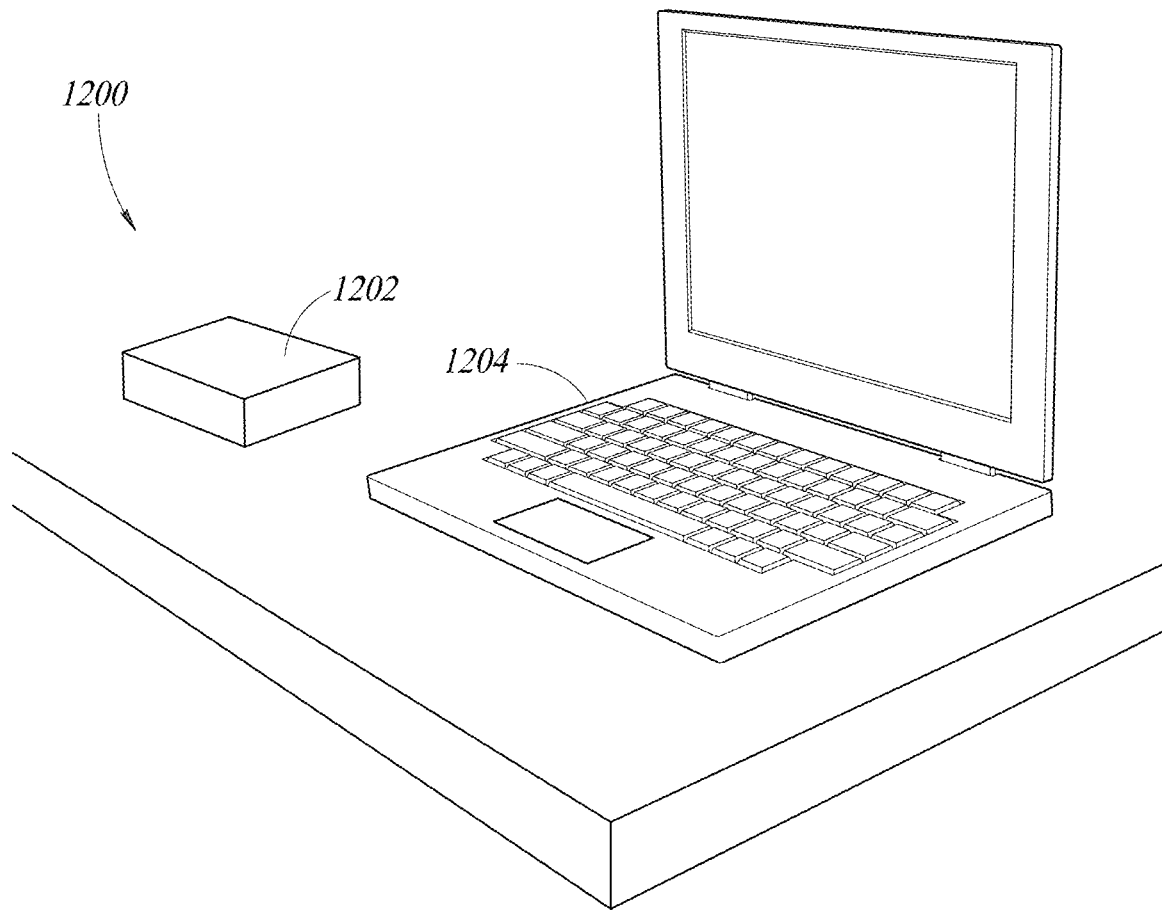
FIG. 29 is a perspective view of a Connectivity Testing Unit.

Referring to FIG. 29, a Connectivity Testing Unit ("CTU") 1200 may be used to collect data on the time associated with at least some of the steps outlined above. Previously, no data had been collected and used to determine a connection strategy. For example, an appropriate timeout delay had not been determined for the attach step (which includes steps 1-3 of the connection process above). By way of another non-limiting example, a number of attempts to connect to make before giving up had not been determined.

The CTU 1200 includes a housing 1202 that houses custom firmware and hardware identical to that used in the smart receiver tank 800 (see FIGS. 17, 18, 27, and 28) and housed in the enclosure 872 (see FIGS. 17-21, 25, and 26). For example, the CTU 1200 includes a dedicated controller (like the controller 902 illustrated in FIG. 22), and a cellular modem (like the cellular modem 910 illustrated in FIG. 22) that connects to the cellular network (e.g., a LTE-M network) by performing the same connection process provided above. The dedicated controller of the CTU 1200 may be may be substantially identical to the controller 138 (see FIGS. 2 and 3) of the smart injection tank 130 (see FIGS. 2, 5, 7-11, 14, and 15) and the cellular modem of the CTU 1200 may be substantially identical to the cellular modem of the smart injection tank 130.

The dedicated controller executes the custom firmware which causes the CTU 1200 to conduct a study. In other words, the dedicated controller is configured to execute the custom firmware, which performs the task of collecting measurement data. The study includes repeatedly trying to attach to the cellular network and potentially receiving a response from the server 146 (see FIGS. 2, 5, 6, 23, and 31). In FIG. 29, a computing device 1204 may be configured to communicate with the CTU 1200. Data collected by the CTU 1200 may be communicated to the computing device 1204, which may display and/or store the data. Each time, the timeout constants for one or more of the steps in the connection process are modified (e.g., extended) and the custom firmware logs the time elapsed during execution of each step in the connection process, along with other diagnostic data. Once the CTU 1200 connects to the cellular network successfully or the connection process fails due to a timeout, the custom firmware causes the CTU 1200 to create a log, disconnect, and repeat the connection process automatically. This allows many samples to be collected in a relatively short period of time. The CTU 1200 is portable and can be used in many locations.

In other words, the CTU 1200 may be physically transported to a particular location and used to conduct a study of that area. Then, the results of the study are used to determine values used by the smart injection tank 130 (see FIGS. 2, 5, 7-11, 14, and 15) to connect to the cellular network and communicate with the remote server 146 (see FIGS. 2, 5, 6, 23, and 31). The CTU 1200 may be configured to automatically set the corresponding values of the smart injection tank 130 based on the results of the study. In this manner, the CTU 1200 may be used to determine the connection strategy used by the smart injection tank 130. The CTU 1200 may be used in a similar fashion to determine a connection strategy used by the smart receiver tank 160 (see FIGS. 2, 4, 5, 7-11, 14, and 31).

Figure 30A:
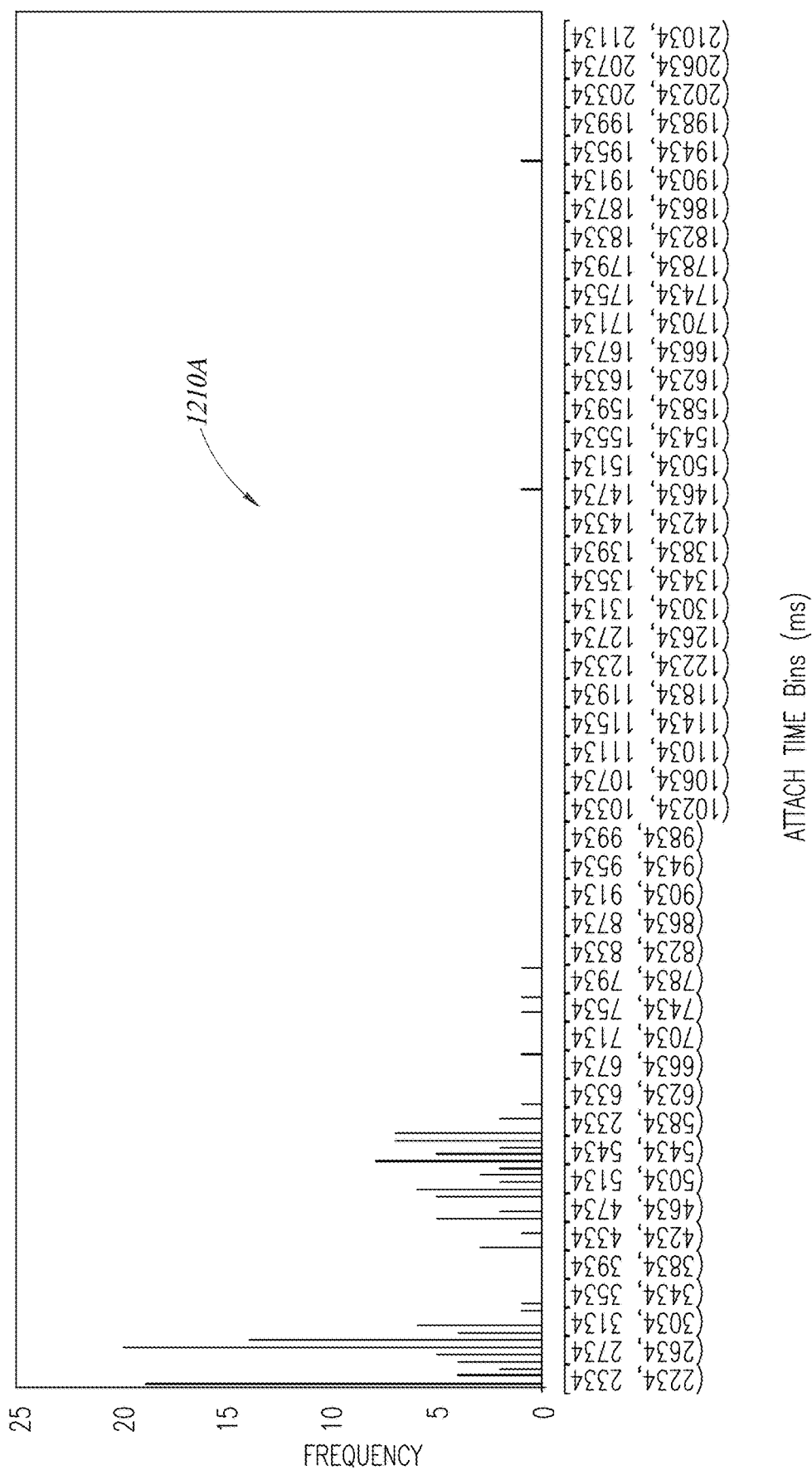
FIG. 30A is a histogram of occurrences of a cellular modem successfully connecting to a cellular network and receiving a valid response from a remote server based on an amount of attach timeout delay.
Figure 30B:
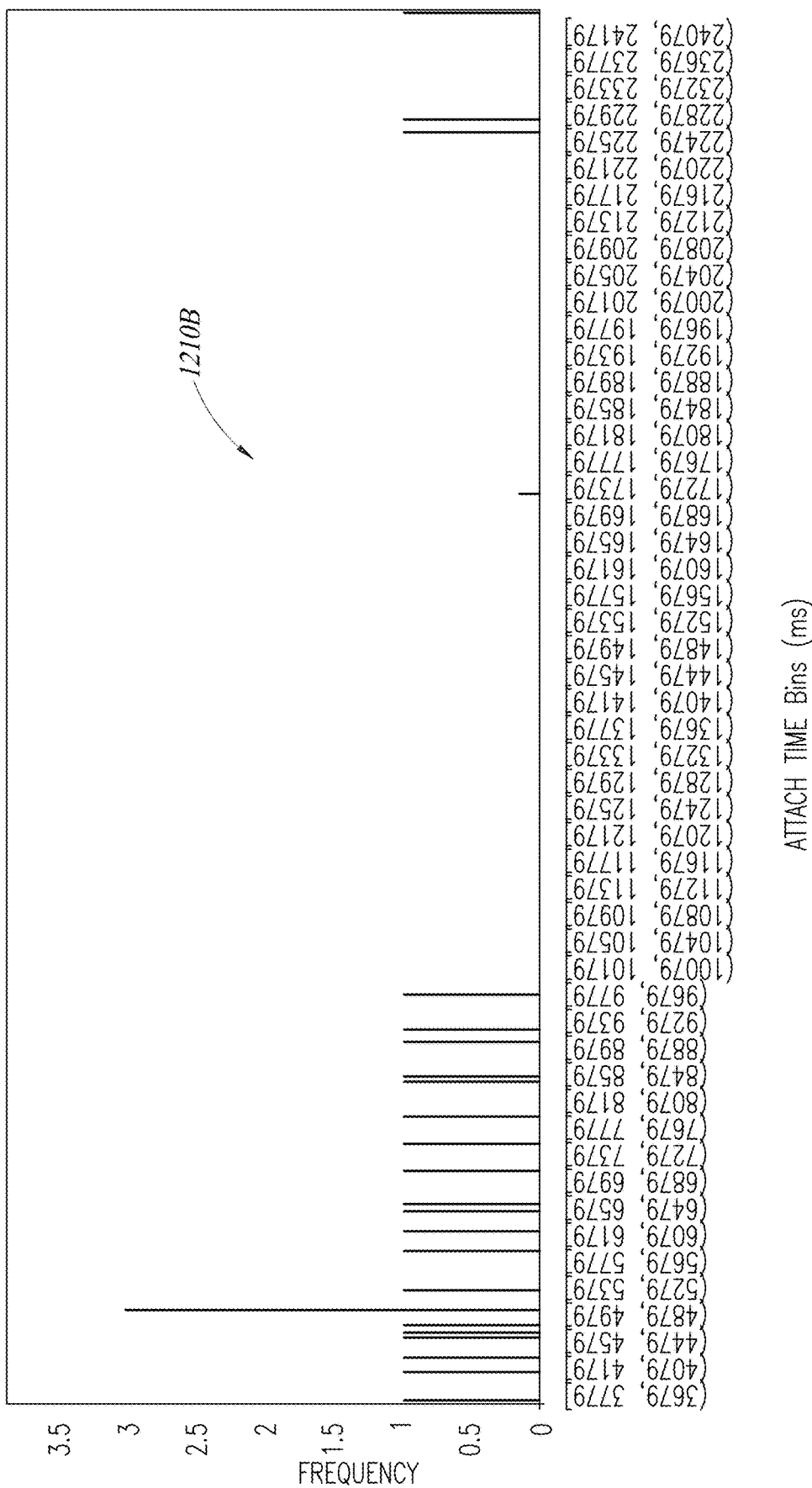
FIG. 30B is a histogram of occurrences of the cellular modem successfully attaching to the cellular network but not receiving a valid response from the remote server based on an amount of attach timeout delay.
Figure 30C:
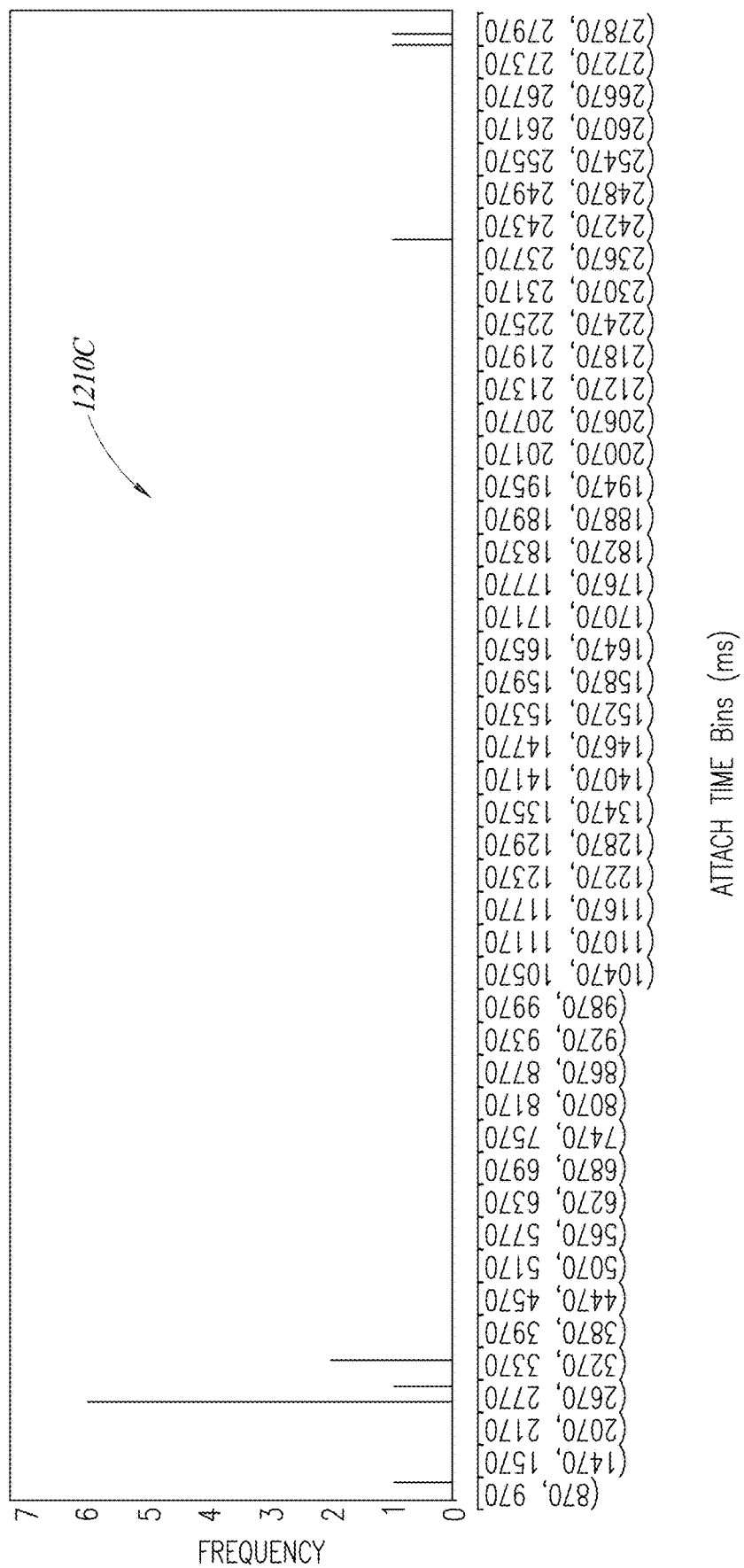
FIG. 30C is a histogram of occurrences of the cellular modem being unable to successfully attach to the cellular network and not receiving a valid response from the remote server based on an amount of attach timeout delay.

FIGS. 30A-30C are histograms 1210A-1210C, respectively, that show results of studies conducted in several locations with varying coverage by the cellular network. These studies may be used to determine an appropriate timeout for the attach step of the connection process (above), as well as whether a large number of connection attempts generally results in a successful connection in areas with poor cellular signal quality. The study data could also be further analyzed and used to develop more complicated connection strategies.

Referring to FIG. 30A, the histogram 1210A illustrates occurrences of the cellular modem successfully connecting to the cellular network and receiving a valid response from the remote server 146 (see FIGS. 2, 5, 6, 23, and 31) based on an amount of attach timeout delay. As explained above, the attach timeout delay is the maximum amount of time allotted for the attach step of the connection process. In the histogram 1210A, the x-axis depicts attach timeout delay bins measured in milliseconds and the y-axis is frequency of successful connections. The histogram 1210A highlights the importance of having an appropriate attach timeout delay. The attach timeout delay currently being used is 4 seconds (or 4000 ms). As can be seen in the histogram 1210A, the attach timeout delay of 4000 ms captures only approximately half of the successful connection attempts that are possible when the attach timeout delay is very long. Extending the attach timeout delay to 10 seconds (or 10,000 ms) allows nearly all of the successful connections to occur. Referring to FIG. 3, increasing the attach timeout delay to a much longer duration than 10 seconds will cause more power to be drawn from the power supply 155 (e.g., batteries) of the smart injection tank 130 while the likelihood of achieving successful connections is very unlikely. In other words, the determination of a satisfactory attach timeout delay may include balancing increased power demands and the likelihood of making a successful connection. In the example shown in FIG. 30A, an attach timeout delay of 10 seconds yields satisfactory results.

Referring to FIG. 30B, the histogram 1210B illustrates occurrences of the cellular modem successfully attaching to the cellular network but not receiving a valid response from the remote server based on an amount of attach timeout delay. In other words, the cellular modem reported a successful connection and a valid RSSI could be measured, but no response was received from the server 146 (see FIGS. 2, 5, 6, 23, and 31). Thus, referring to FIG. 5, the connection process failed due to the server response timeout delay that elapsed while the smart injection tank 130 waited for the responses from the server 146. This most commonly happens in areas where the cellular network provides a poor quality cellular signal. Referring to FIG. 30B, in the histogram 1210B, the x-axis is attach timeout delay bins measured in milliseconds and the y-axis is frequency of successful connections without receiving a response from the server.

The histogram 1210B of FIG. 30B shows that an attach timeout delay of 10 seconds (or 10,000 ms) also works well when a poor quality or low strength cellular signal is causing problems with the server response. While the longer attach timeout delay does not help the server response, it is clear from the histogram 1210B that the attach timeout delay of 10 seconds is not hampering the ability of the cellular modem to attach to the cellular network.

Referring to FIG. 30C, the histogram 1210C illustrates occurrences of the cellular modem being unable to successfully attach to the cellular network and not receiving a valid response from the remote server 146 (see FIGS. 2, 5, 6, 23, and 31) based on an amount of attach timeout delay. In other words, the quality or strength of the cellular signal was poor enough that the cellular modem was not able to measure a valid RSSI, even though the cellular modem may have reported attaching successfully. Thus, the connection process failed due to the attach timeout delay that elapsed while the smart injection tank 130 (see FIGS. 2, 5, 7-11, 14, and 15) attempted to attach to the cellular network. In the histogram 1210C, the quality or strength of the cellular connection is low enough that there is likely not much benefit from a longer attach timeout delay (e.g., 10 seconds), and improvements will rely more on error handling.

The data of the histograms 1210A-1210C shows that the attach timeout delay should be lengthened from 4 seconds to 10 seconds, and this improvement satisfactorily balances the reliability of attaching to the cellular network and battery power used. In this manner, the connection strategy may be improved based on the data recorded by the CTU 1200.

Repeater Device

Figure 31:
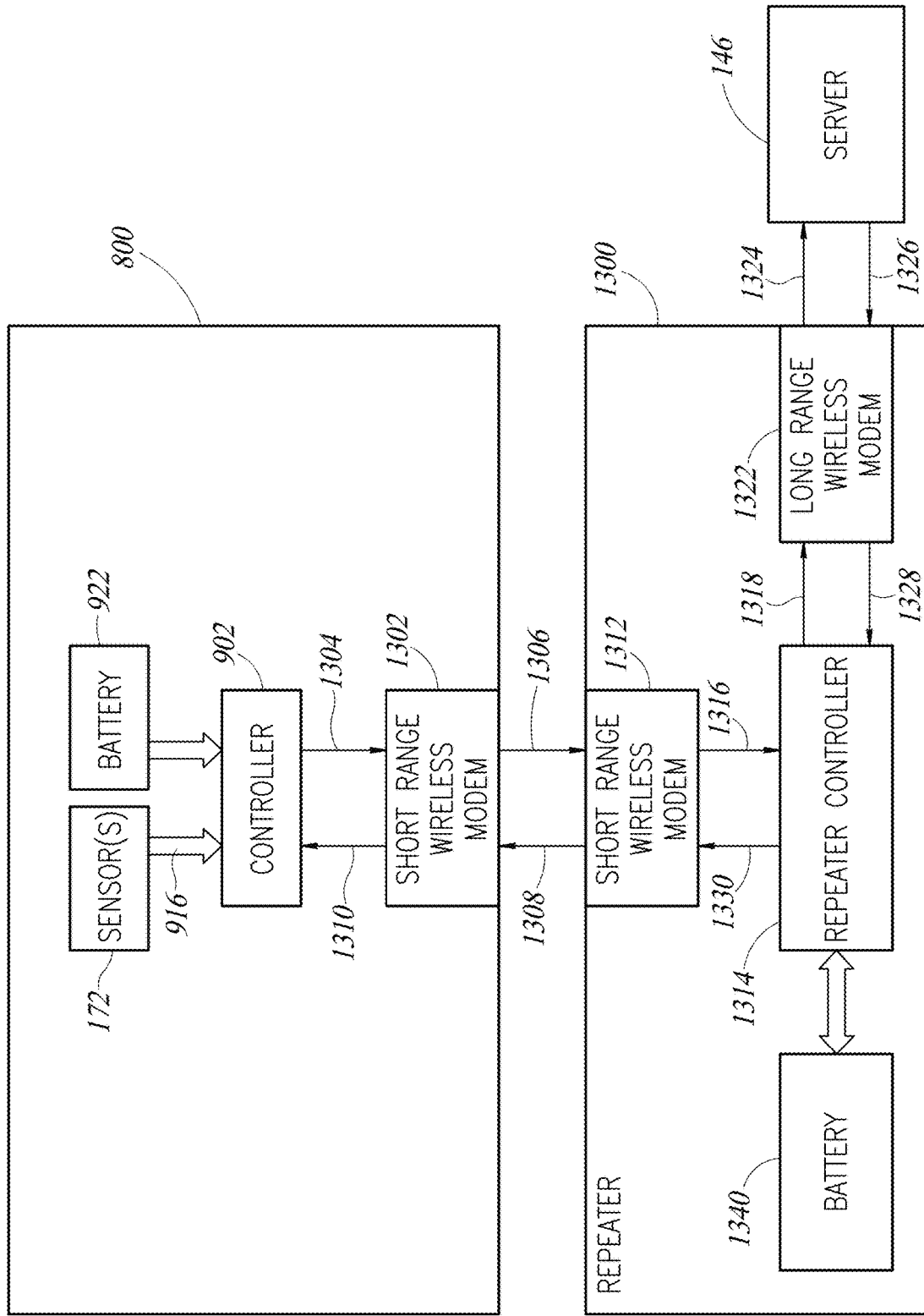
FIG. 31 is a block diagram of a repeater device facilitating communication between a server and the smart receiver tank of FIG. 17.

FIG. 31 illustrates a repeater device 1300 configured facilitate communication between the server 146 and the smart injection tank 130 and/or between the server 146 and the smart receiver tank 160. For ease of illustration, FIG. 31 depicts the repeater device 1300 being used with the smart receiver tank 800. Referring to FIG. 22, the ADC 914 and the voltage regulator 920 have been omitted from FIG. 31.

In the embodiment illustrated in FIG. 31, the smart receiver tank 800 includes a short range wireless modem 1302 configured to transmit messages to and from the controller 902. The controller 902 is configured to receive the sensor output 916 from one or more sensors (e.g., the Hall sensor 904 illustrated in FIG. 22) and formulate messages 1304 to the server 146 based at least in part on the sensor output 916. For example, the message 1304 may inform the server 164 that the injection fluid 134 has reached the smart receiver tank 800. The controller 902 forwards the messages 1304 to the short range wireless modem 1302. The short range wireless modem 1302 is configured to receive the messages 1304 from the controller 902 and transmit the messages 1304 as messages 1306 to the repeater device 1300. The short range wireless modem 1302 is also configured to receive messages 1308 from the repeater device 1300 and forward the messages 1308 as messages 1310 to the controller 902. The messages 1306 and 1308 may include sensor data (e.g., the sensor output 916) and/or commands.

The repeater device 1300 includes a short range wireless first modem 1312 configured to transmit messages to and from the short range wireless modem 1302. For example, the first modem 1312 is configured to receive the messages 1306 sent by the short range wireless modem 1302 and to transmit the messages 1308 to the short range wireless modem 1302. The first modem 1312 is also configured to transmit messages to and from a repeater controller 1314. For example, the first modem 1312 is configured to transmit the messages 1306 to the repeater controller 1314 as the messages 1316.

The repeater controller 1314 is configured to manage the storage or transmission of data to and from the repeater device 1300. The repeater controller 1314 is configured to boost the signal strength of the messages 1316 and forward the messages 1316 as messages 1318 to a long range wireless second modem 1322. The second modem 1322 is configured to forward the messages 1318 as messages 1324 to the server 146. The second modem 1322 is also configured to receive messages 1326 from the server 146 and forward the messages 1326 as messages 1328 to the repeater controller 1314. The repeater controller 1314 is configured to receive the messages 1328 and forward the messages 1328 as messages 1330 to the first modem 1312. The first modem 1312 is configured to receive the messages 1330 and forward the messages 1330 as the messages 1308 to the short range wireless modem 1302.

The repeater device 1300 includes an independent power source such as one or more batteries 1340 that provide power to the repeater controller 1314, the first modem 1312, and the second modem 1322.

The repeater device 1300 may be used to transmit a signal using a different wireless technology or higher power than is available on the smart injection tank 130 and/or the smart receiver tank 160. The repeater device 1300 may be used when a barrier is present that inhibits the transmission of a long range wireless signal (e.g., of the type transmitting the messages 1324 and 1326), but allows a usable amount of a short range wireless signal to pass therethrough (e.g., of the type transmitting the messages 1306 and 1308).

Computing Device

Figure 32:
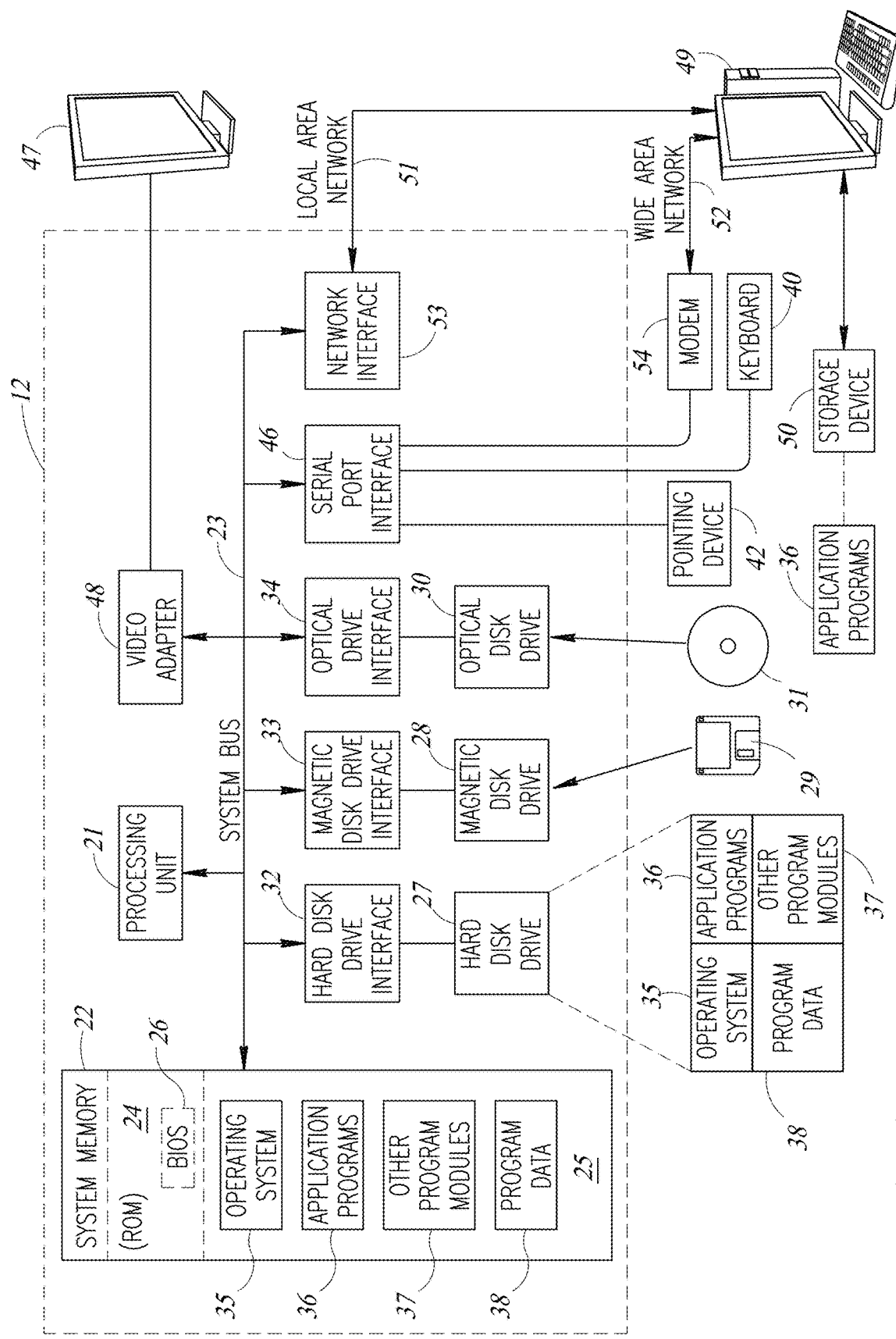
FIG. 32 is a diagram of a hardware environment and an operating environment in which the computing devices of the smart fluid injection system of FIG. 2 may be implemented.

FIG. 32 is a diagram of hardware and an operating environment in conjunction with which implementations of the one or more computing devices of the smart fluid injection system 100 (see FIGS. 2 and 14) may be practiced. The description of FIG. 32 is intended to provide a brief, general description of suitable computer hardware and a suitable computing environment in which implementations may be practiced. Implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 32 includes a general-purpose computing device in the form of the computing device 12. Each of the computing devices of FIG. 2 (including the server 146 and the local computing device 147) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like. The computing device 12 may be a conventional computer, a distributed computer, or any other type of computer.

The computing device 12 includes the system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively.

The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 32 include a local-area network (LAN) 51 and a wide-area network (WAN) 52. Such networking environments are commonplace in offices, enterprise-wide computer networks, intranets and the Internet. The network 122 (see FIG. 2) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A method of estimating progression of an injection fluid toward a receiving end of a cable segment during injection of the injection fluid into a feed end of the cable segment, a fluid front forming in the cable segment after the injection of the injection fluid has begun, the method comprising:
   obtaining, by a controller of a receiver tank, a first volume of the receiver tank connected to the receiving end of the cable segment;
   obtaining, by the controller, a second volume of the cable segment, the first volume being in fluid communication with a third volume of a portion of the cable segment ahead of the fluid front;
   obtaining, by the controller, an internal pressure inside the first and third volumes;
   obtaining, by the controller, a minimum number of moles of gas in the first and third volumes;
   calculating, by the controller, a location of the fluid front as a function of the first volume, the second volume, the internal pressure, and the minimum number of moles of gas;
   estimating, by the controller, a maximum number of moles of dissolved gas exiting the injection fluid and entering the first and third volumes during the injection;
   determining, by the controller, an estimated number of moles based at least in part on the maximum number of moles and the minimum number of moles;
   determining, by the controller, an adjusted pressure by adjusting the internal pressure inside the first and third volumes based at least in part on the estimated number of moles;
   adjusting, by the controller, the location of the fluid front based on the adjusted pressure; and
   transmitting, by the controller, the location to an external computing device for display thereby after the location is adjusted.

2. The method of claim 1, wherein the location of the fluid front is calculated as a percentage of the second volume of the cable segment using a following formula:

$$I_{prog}=100*(1-((nRT)/P-V_{tank})/V_{cable}),$$

wherein a variable "$I_{prog}$" represents the location of the fluid front as a percentage of the second volume of the cable segment,
   a variable "$V_{tank}$" represents the first volume,
   a variable "$V_{cable}$" represents the second volume,
   a variable "n" represents the minimum number of moles of gas in the first and third volumes,
   a variable "R" represents a gas constant,
   a variable "T" represents temperature, and
   a variable "P" represents the internal pressure inside the first and third volumes.

3. The method of claim 1, further comprising:
   estimating, by the controller, an injection progress based on the location of the fluid front within the cable segment; and
   transmitting, by the controller, the injection progress to the external computing device for display thereby.

4. The method of claim 1, wherein the receiver tank comprises a barometer configured to measure the internal pressure and provide the internal pressure to the controller.

5. A receiver tank for use with a cable segment into which an injection fluid has been injected, a fluid front forming in the cable segment after injection of the injection fluid has begun, the cable segment comprising a second volume, the receiver tank comprising:
   a first volume to be in fluid communication with a third volume of a portion of the cable segment ahead of the fluid front; and
   a controller to obtain the first volume, the second volume, an internal pressure inside the first and third volumes, and a minimum number of moles of gas in the first and third volumes, the controller to determine a location of the fluid front based at least in part on the first volume, the second volume, the internal pressure, and the minimum number of moles of gas, the controller to estimate a maximum number of moles of dissolved gas exiting the injection fluid and entering the first and third volumes during the injection, the controller to determine an estimated number of moles based at least in part on the maximum number of moles and the minimum number of moles, the controller to determine an adjusted pressure by adjusting the internal pressure inside the first and third volumes based at least in part on the estimated number of moles, and the controller to adjust the location of the fluid front based on the adjusted pressure.

6. The receiver tank of claim 5, wherein the controller is to transmit the location to an external computing device for display thereby after the location is adjusted.

7. The receiver tank of claim 5, wherein the controller is to determine the location of the fluid front as a percentage of the second volume of the cable segment using a following formula:

$$I_{prog}=100*(1-((nRT)/P-V_{tank})/V_{cable}),$$

wherein a variable "$I_{prog}$" represents the location of the fluid front as a percentage of the second volume of the cable segment,
a variable "$V_{tank}$" represents the first volume,
a variable "$V_{cable}$" represents the second volume,
a variable "n" represents the minimum number of moles of gas in the first and third volumes,
a variable "R" represents a gas constant,
a variable "T" represents temperature, and
a variable "P" represents the internal pressure inside the first and third volumes.

8. The receiver tank of claim 5, wherein the controller is to estimate an injection progress based on the location of the fluid front within the cable segment.

9. The receiver tank of claim 8, wherein the controller is to transmit the injection progress to an external computing device for display thereby.

10. The receiver tank of claim 5, wherein the receiver tank comprises at least one pressure sensor to measure the internal pressure and provide the internal pressure to the controller.

11. The receiver tank of claim 10, wherein the at least one pressure sensor comprises a barometer.

12. The receiver tank of claim 5, further comprising:
a fluid reservoir defining the first volume;
at least one battery to supply power to the controller; and
an enclosure positioned under the fluid reservoir, the enclosure housing the at least one battery and the controller.

13. The receiver tank of claim 5, further comprising:
an antenna to transmit the location to an external computing device for display thereby after the location is adjusted;
a fluid reservoir defining the first volume;
at least one battery to supply power to the controller; and
an enclosure positioned under the fluid reservoir, the enclosure housing the at least one battery and the controller, the antenna being positioned above the at least one battery and below the fluid reservoir.

14. The receiver tank of claim 5, further comprising:
a tank housing that houses a fluid reservoir that defines the first volume;
an enclosure housing the controller; and
a fluid-tight gasket positioned between the tank housing and the enclosure.

15. The receiver tank of claim 5, further comprising:
an enclosure housing the controller;
an indicator light housed inside enclosure and configured to generate light in response to a command received from the controller; and
a light pipe positioned to receive the light generated by the indicator light, the light pipe extending through the enclosure and conducting the light therethrough so the light is visible outside the enclosure.

16. The receiver tank of claim 5, further comprising:
at least one sensor to detect an amount of the injection fluid received from the cable segment;
a communication module, the controller to automatically instruct the communication module to transmit an alert to an external computing device when the at least one sensor indicates a predetermined amount of the injection fluid has been received;
at least one battery configured to supply electrical current to the communication module; and
an energy storage buffer configured to supplement the electrical current supplied by the at least one battery when the communication module is transmitting the alert to the external computing device.

17. The receiver tank of claim 5, further comprising:
a cellular module, the controller to communicate with an external computing device over a cellular network using the cellular module.

18. The receiver tank of claim 17, wherein the cellular module is to communicate in accordance with a standard comprising at least one of Long-Term Evolution Machine Type Communication ("LTE-M") and Narrowband Internet of Things ("NB-IoT").

19. The receiver tank of claim 5, further comprising:
at least one sensor to detect that a portion of the injection fluid has been received from the cable segment.

20. The receiver tank of claim 19, wherein the at least one sensor comprises at least one of an optical bubble sensor, a resistance sensor, a capacitive sensor, a magnet sensor, an inductive sensor, or an optical sensor.

21. The receiver tank of claim 19, wherein the at least one sensor is positioned to be in contact with the injection fluid after the receiver tank receives the injection fluid from the cable segment.

22. A system comprising:
an injection tank to inject an injection fluid into a cable segment, a fluid front to form in the cable segment after injection of the injection fluid has begun, the cable segment comprising a second volume; and
a receiver tank to be connected to the cable segment and comprising a first volume and a controller, the first volume to be in fluid communication with a third volume of a portion of the cable segment ahead of the fluid front, the controller to obtain the first volume, the second volume, an internal pressure inside the first and third volumes, and a minimum number of moles of gas in the first and third volumes, the controller to determine a location of the fluid front based at least in part on the first volume, the second volume, the internal pressure, and the minimum number of moles of gas, the controller to estimate a maximum number of moles of dissolved gas exiting the injection fluid and entering the first and third volumes during the injection, the controller to determine an estimated number of moles based at least in part on the maximum number of moles and the minimum number of moles, the controller to determine an adjusted pressure by adjusting the internal pressure inside the first and third volumes based at least in part on the estimated number of moles, and the controller to adjust the location of the fluid front based on the adjusted pressure.

23. The system of claim 22, wherein the controller is to transmit the location to an external computing device for display thereby after the location is adjusted.

24. The system of claim 23, wherein the controller is to transmit the location in a message signal, and the system further comprises:

a repeater device configured to receive the message signal, boost a signal strength of the message signal to produce a boosted signal, and transmit the boosted signal to the external computing device.

25. The system of claim 22, wherein the controller is to determine the location of the fluid front as a percentage of the second volume of the cable segment using a following formula:

$$I_{prog}=100*(1-((nRT)/P-V_{tank})/V_{cable}),$$

wherein a variable "$I_{prog}$" represents the location of the fluid front as a percentage of the second volume of the cable segment,
a variable "$V_{tank}$" represents the first volume,
a variable "$V_{cable}$" represents the second volume,
a variable "n" represents the minimum number of moles of gas in the first and third volumes,
a variable "R" represents a gas constant,
a variable "T" represents temperature, and
a variable "P" represents the internal pressure inside the first and third volumes.

26. The system of claim 22, wherein the controller is to estimate an injection progress based on the location of the fluid front within the cable segment.

27. The system of claim 26, wherein the controller is to transmit the injection progress to an external computing device for display thereby.

28. The system of claim 22, wherein the receiver tank comprises at least one pressure sensor to measure the internal pressure and provide the internal pressure to the controller.

29. The system of claim 28, wherein the at least one pressure sensor comprises a barometer.

30. The system of claim 22, wherein the receiver tank further comprises:
at least one sensor to detect that a portion of the injection fluid has been received from the cable segment and provide sensor data to the controller, the controller to transmit a command to the injection tank when the sensor data indicates a predetermined amount of the injection fluid has been received, the command instructing the injection tank to stop injecting the injection fluid into the cable segment.

31. The system of claim 30, wherein the controller is to transmit the command to the injection tank in accordance with a wireless technology standard comprising Bluetooth.

32. The system of claim 30, wherein the controller is to transmit the command to the injection tank using at least one of Long Range ("LoRa") wireless networking technology or Wi-Fi wireless networking technology.

33. The system of claim 22, wherein the receiver tank to communicate with a different receiver tank that is remote with respect to the receiver tank.

* * * * *